US012556872B2

(12) United States Patent
Andersson

(10) Patent No.: US 12,556,872 B2
(45) Date of Patent: Feb. 17, 2026

(54) ELECTROMAGNETIC TRANSDUCER WITH NEW SPECIFIC INTERFACE GEOMETRIES

(71) Applicant: Cochlear Limited, Macquarie University (AU)

(72) Inventor: Marcus Andersson, Mölnlycke (SE)

(73) Assignee: Cochlear Limited, Macquarie University (AU)

( * ) Notice: Subject to any disclaimer, the term of this patent is extended or adjusted under 35 U.S.C. 154(b) by 238 days.

(21) Appl. No.: 18/208,815

(22) Filed: Jun. 12, 2023

(65) Prior Publication Data

US 2023/0403520 A1 Dec. 14, 2023

Related U.S. Application Data

(63) Continuation of application No. 17/252,247, filed as application No. PCT/IB2019/056740 on Aug. 7, 2019, now Pat. No. 11,678,131.

(60) Provisional application No. 62/715,892, filed on Aug. 8, 2018.

(51) Int. Cl.
*H04R 1/02* (2006.01)
*H04R 25/00* (2006.01)

(52) U.S. Cl.
CPC ....... *H04R 25/606* (2013.01); *H04R 2460/13* (2013.01)

(58) Field of Classification Search
CPC .......................... H04R 25/606; H04R 2460/13
USPC .................................................... 381/87, 334
See application file for complete search history.

(56) References Cited

U.S. PATENT DOCUMENTS

| | | | | |
|---|---|---|---|---|
| 11,678,131 | B2 * | 6/2023 | Andersson | H04R 25/606 381/87 |
| 2004/0210103 | A1 | 10/2004 | Westerkull | |
| 2004/0264725 | A1 | 12/2004 | Madsen et al. | |
| 2005/0248158 | A1 | 11/2005 | Westerkull | |
| 2009/0245554 | A1 | 10/2009 | Parker | |
| 2009/0306458 | A1 | 12/2009 | Parker et al. | |
| 2010/0292529 | A1 | 11/2010 | Westerkull et al. | |
| 2012/0302823 | A1 | 11/2012 | Andersson et al. | |
| 2014/0016808 | A1 | 1/2014 | Cherukuri et al. | |
| 2014/0179985 | A1 | 6/2014 | Andersson | |
| 2015/0117689 | A1 | 4/2015 | Bergs et al. | |
| 2016/0198274 | A1 * | 7/2016 | Andersson | H04R 25/556 600/25 |

(Continued)

FOREIGN PATENT DOCUMENTS

| | | | |
|---|---|---|---|
| CN | 103310942 | A | 9/2013 |
| CN | 205678318 | U | 11/2016 |

OTHER PUBLICATIONS

International Search Report & Written Opinion for PCT/IB2019/056740, mailed Jan. 28, 2020.

(Continued)

*Primary Examiner* — Ammar T Hamid
(74) *Attorney, Agent, or Firm* — Pilloff Passino & Cosenza LLP; Martin J. Cosenza

(57) ABSTRACT

A device, comprising a coupling apparatus configured to couple to a male mating coupling component and also configured to couple to a female mating coupling component. In some embodiments, the coupling apparatus is configured to snap couple to a male mating coupling component and also configured to snap couple to a female mating coupling component.

20 Claims, 53 Drawing Sheets

(56) References Cited

U.S. PATENT DOCUMENTS

| | | | |
|---|---|---|---|
| 2018/0163907 | A1 | 6/2018 | Brugger et al. |
| 2021/0281960 | A1 | 9/2021 | Andersson |

OTHER PUBLICATIONS

Office action and Search Report for Chinese Patent Application No. 201980044770.7, dated Aug. 4, 2021.

Nubert, "Aktivlautsprecher Bedienungsanleitung Aufstellung Anschlusshinweise Technische Daten," Dec. 1, 2015, pp. 1-12, Retrieved from the Internet: URL:https://www.nubert.de/downloads/nupro_a-100.pdf [retrieved on Feb. 24, 2022].

Extended European search report for European Patent Application No. 19 848 677.1, mailed Mar. 9, 2022.

* cited by examiner

ELECTROMAGNETIC TRANSDUCER WITH NEW SPECIFIC INTERFACE GEOMETRIES

CROSS-REFERENCE TO RELATED APPLICATIONS

This application is a Continuation of U.S. patent application Ser. No. 17/252,247, filed Dec. 14, 2020, which is a National Stage of PCT/IB2019/056740, filed Aug. 7, 2019, which claims priority to U.S. Provisional Application No. 62/715,892, entitled ELECTROMAGNETIC TRANSDUCER WITH NEW SPECIFIC INTERFACE GEOMETRIES, filed on Aug. 8, 2018, naming Marcus Andersson of Mölnlycke, Sweden as an inventor, the entire contents of each application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses commonly referred to as bone conduction devices, convert a received sound into vibrations. The vibrations are transferred through the skull to the cochlea causing generation of nerve impulses, which result in the perception of the received sound. Bone conduction devices are suitable to treat a variety of types of hearing loss and may be suitable for individuals who cannot derive sufficient benefit from acoustic hearing aids, cochlear implants, etc., or for individuals who suffer from stuttering problems.

SUMMARY

In accordance with one aspect, there is a device, comprising a transducer and a coupling apparatus configured to couple to a male mating coupling component and also configured to couple to a female mating coupling component.

In another exemplary embodiment, there is a device, comprising a transducer and a coupling apparatus configured to couple to at least one of at least two different male couplings of substantially different sizes, at least two different female couplings of substantially different sizes, or at least one mechanical coupling and at least one magnetic coupling.

In another exemplary embodiment, there is a device, comprising a removable component of a bone conduction device, including a non-metallic connector apparatus configured to removably connect the removable component to a recipient skin penetrating apparatus, wherein the removable component of the bone conduction device has a metallic structure that is in direct contact with the skin penetrating apparatus when coupled to the skin penetrating apparatus for bone conduction.

In another exemplary embodiment, there is a method, comprising obtaining a removable component of a prosthesis, and attaching the removable component to a first support component of the prosthesis attached to a recipient, wherein during the action of attaching, the removable component is in a configuration such that it is readily attachable to a different type and/or substantially different size support component than the first support component if removed therefrom.

In another exemplary embodiment, there is a device, comprising a transducer and a coupling apparatus configured to couple to an abutment screw of a skin penetrating apparatus that has an abutment attached to a bone fixture via the abutment screw.

BRIEF DESCRIPTION OF THE DRAWINGS

Some embodiments are described below with reference to the attached drawings, in which.

DETAILED DESCRIPTION

Embodiments described herein will be typically directed to percutaneous bone conduction devices. However, it is noted that embodiments can also be utilized with respect to other types of devices that rely on the conduction of vibrations for therapeutic or otherwise utilitarian purposes, whether that vibration be originated via a transducer or originated in a body and conducted to the transducer. It is also noted that embodiments can also be utilized with respect to other types of prostheses that are unrelated to the conduction of vibration. By way of example only and not by way of limitation, some of the teachings detailed herein can be applied to artificial limbs or the like. Accordingly, any disclosure herein with respect to a bone conduction device corresponds to a disclosure of an alternate embodiment directed to a transducer that senses vibrations and/or a prosthesis that is removably coupled to a recipient.

Figure 1A:
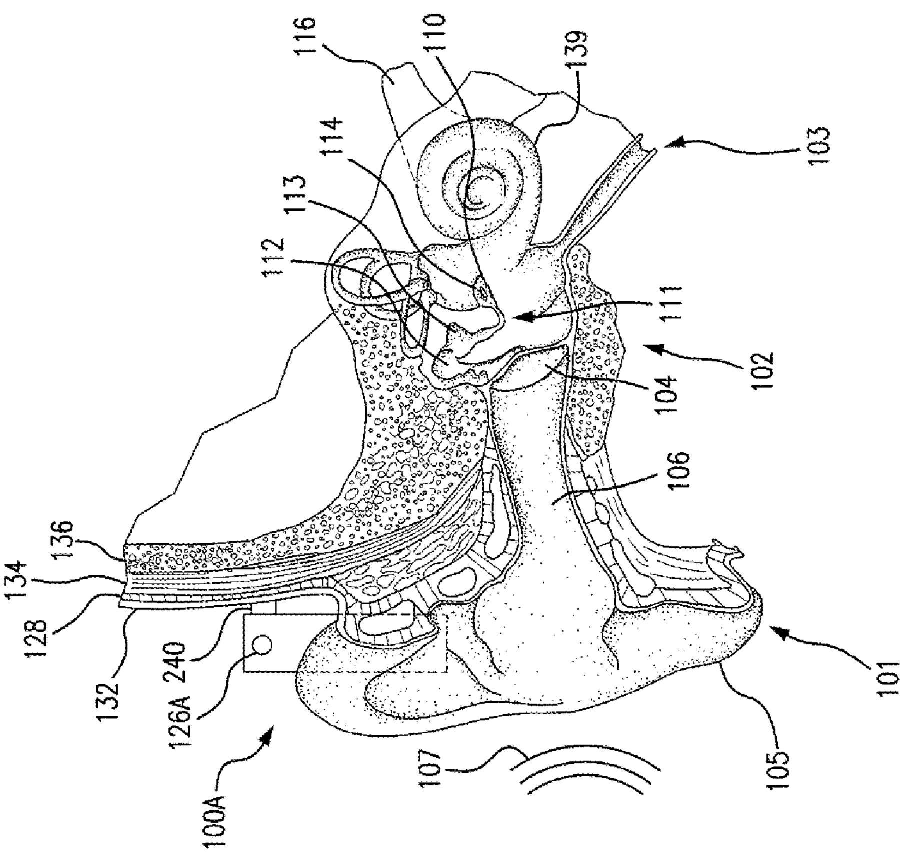
FIG. 1A is a perspective view of an exemplary bone conduction device in which at least some embodiments can be implemented.

FIG. 1A is a perspective view of a bone conduction device 100A in which embodiments may be implemented. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1A also illustrates the positioning of bone conduction device 100A relative to outer ear 101, middle ear 102 and inner ear 103 of a recipient of device 100. As shown, bone conduction device 100 is positioned behind outer ear 101 of the recipient and comprises a sound input element 126A to receive sound signals. Sound input element may comprise, for example, a microphone, telecoil, etc. In an exemplary embodiment, sound input element 126A may be located, for example, on or in bone conduction device 100A, or on a cable extending from bone conduction device 100A.

In an exemplary embodiment, bone conduction device 100A comprises an operationally removable component and a bone conduction implant. The operationally removable component is operationally releasably coupled to the bone conduction implant. By operationally releasably coupled, it is meant that it is releasable in such a manner that the recipient can relatively easily attach and remove the operationally removable component during normal use of the bone conduction device 100A. Such releasable coupling is accomplished via a coupling assembly of the operationally removable component and a corresponding mating apparatus of the bone conduction implant, as will be detailed below. This as contrasted with how the bone conduction implant is attached to the skull, as will also be detailed below. The operationally removable component includes a sound processor (not shown), a vibrating electromagnetic actuator and/or a vibrating piezoelectric actuator and/or other type of actuator (not shown—which are sometimes referred to herein as a species of the genus vibrator) and/or various other operational components, such as sound input device 126A. In this regard, the operationally removable component is sometimes referred to herein as a vibrator unit. More particularly, sound input device 126A (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

As illustrated, the operationally removable component of the bone conduction device 100A further includes a coupling assembly 240 configured to operationally removably attach the operationally removable component to a bone conduction implant (also referred to as an anchor system and/or a fixation system) which is implanted in the recipient. In the embodiment of FIG. 1, coupling assembly 240 is coupled to the bone conduction implant (not shown) implanted in the recipient in a manner that is further detailed below with respect to exemplary embodiments of the bone conduction implant. Briefly, an exemplary bone conduction implant may include a percutaneous abutment attached to a bone fixture via a screw, the bone fixture being fixed to the recipient's skull bone 136. The abutment extends from the bone fixture which is screwed into bone 136, through muscle 134, fat 128 and skin 232 so that the coupling assembly may be attached thereto. Such a percutaneous abutment provides an attachment location for the coupling assembly that facilitates efficient transmission of mechanical force.

It is noted that while many of the details of the embodiments presented herein are described with respect to a percutaneous bone conduction device, some or all of the teachings disclosed herein may be utilized in transcutaneous bone conduction devices and/or other devices that utilize a vibrating electromagnetic actuator. For example, embodiments include active transcutaneous bone conduction systems utilizing the electromagnetic actuators disclosed herein and variations thereof where at least one active component (e.g. the electromagnetic actuator) is implanted beneath the skin. Embodiments also include passive transcutaneous bone conduction systems utilizing the electromagnetic actuators disclosed herein and variations thereof where no active component (e.g., the electromagnetic actuator) is implanted beneath the skin (it is instead located in an external device), and the implantable part is, for instance a magnetic pressure plate. Some embodiments of the passive transcutaneous bone conduction systems are configured for use where the vibrator (located in an external device) containing the electromagnetic actuator is held in place by pressing the vibrator against the skin of the recipient. In an exemplary embodiment, an implantable holding assembly is implanted in the recipient that is configured to press the bone conduction device against the skin of the recipient. In other embodiments, the vibrator is held against the skin via a magnetic coupling (magnetic material and/or magnets being implanted in the recipient and the vibrator having a magnet and/or magnetic material to complete the magnetic circuit, thereby coupling the vibrator to the recipient).

Figure 1B:
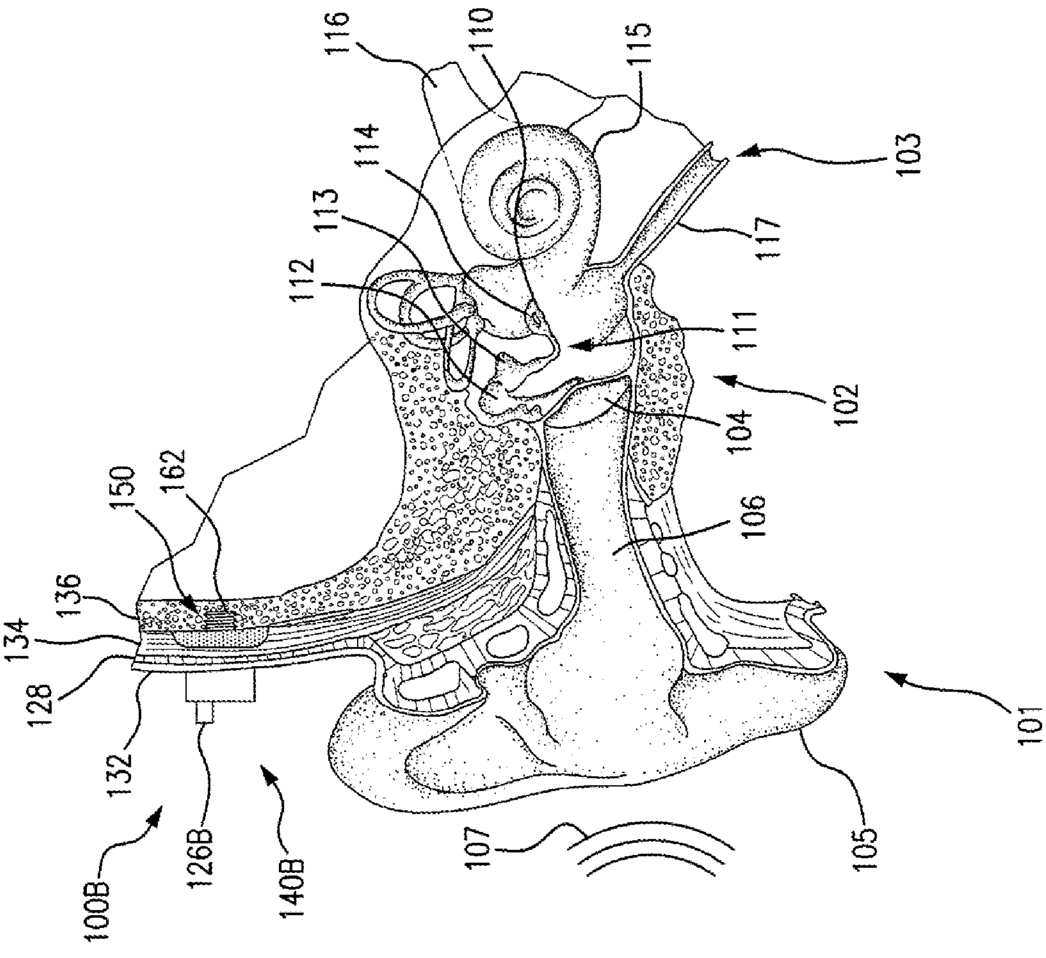
FIG. 1B is a perspective view of an alternate exemplary bone conduction device in which at least some embodiments can be implemented.

More specifically, FIG. 1B is a perspective view of a transcutaneous bone conduction device 100B in which embodiments can be implemented.

FIG. 1A also illustrates the positioning of bone conduction device 100B relative to outer ear 101, middle ear 102 and inner ear 103 of a recipient of device 100. As shown, bone conduction device 100B is positioned behind outer ear 101 of the recipient. Bone conduction device 100B comprises an external component 140B (corresponding to an operationally removable component) and implantable component 150. The bone conduction device 100B includes a sound input element 126B to receive sound signals. As with sound input element 126A, sound input element 126B may comprise, for example, a microphone, telecoil, etc. In an exemplary embodiment, sound input element 126B may be located, for example, on or in bone conduction device 100B, on a cable or tube extending from bone conduction device 100B, etc. Alternatively, sound input element 126B may be subcutaneously implanted in the recipient, or positioned in the recipient's ear. Sound input element 126B may also be a component that receives an electronic signal indicative of sound, such as, for example, from an external audio device. For example, sound input element 126B may receive a sound signal in the form of an electrical signal from an MP3 player electronically connected to sound input element 126B.

Bone conduction device 100B comprises a sound processor (not shown), an actuator (also not shown) and/or various other operational components. In operation, sound input device 126B converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1B, bone conduction device 100B can be a passive transcutaneous bone conduction device. That is, no active components, such as the actuator, are implanted beneath the recipient's skin 132. In such an arrangement, the active actuator is located in external component 140B, and implantable component 150 includes a magnetic plate, as will be discussed in greater detail below. The magnetic plate of the implantable component 150 vibrates in response to vibration transmitted through the skin, mechanically and/or via a magnetic field, that are generated by an external magnetic plate.

In another arrangement of FIG. 1B, bone conduction device 100B can be an active transcutaneous bone conduction device where at least one active component, such as the actuator, is implanted beneath the recipient's skin 132 and is thus part of the implantable component 150. As described below, in such an arrangement, external component 140B may comprise a sound processor and transmitter, while implantable component 150 may comprise a signal receiver and/or various other electronic circuits/devices.

Figure 2:
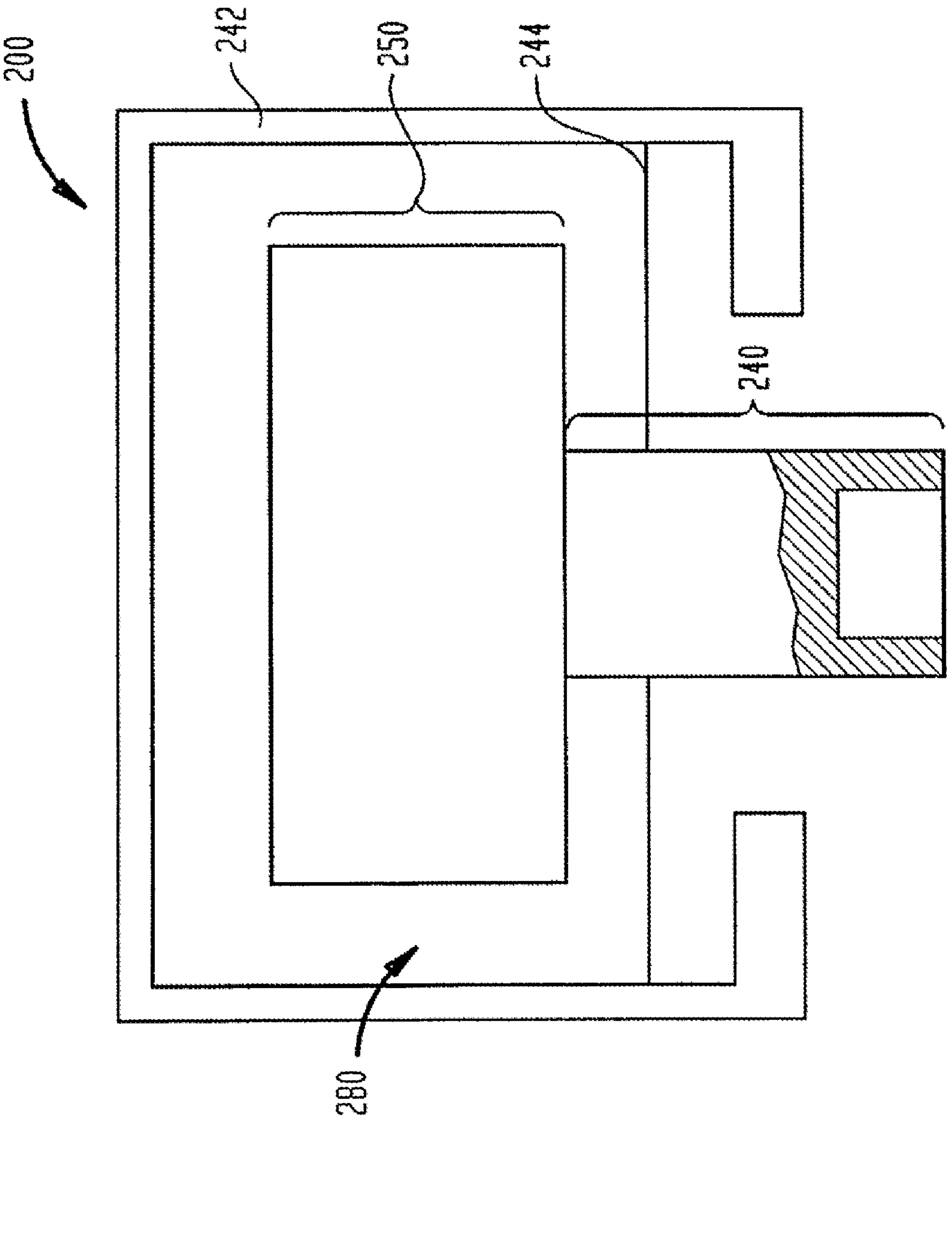
FIG. 2 is a schematic diagram conceptually illustrating an exemplary removable component of a percutaneous bone conduction device.

FIG. 2 is an embodiment of an operationally removable component of a bone conduction device 200 in accordance with an embodiment corresponding to that of FIG. 1A, illustrating use of a percutaneous bone conduction device. Removable component of bone conduction device 200, corresponding to, for example, the removable component of element 100A of FIG. 1A, and includes a housing 242, a vibrating electromagnetic actuator 250, a coupling assembly 240 that extends from housing 242 and is mechanically linked to vibrating electromagnetic actuator 250. Collectively, vibrating electromagnetic actuator 250 and coupling assembly 240 form a vibrating electromagnetic actuator-coupling assembly 280. Vibrating electromagnetic actuator-coupling assembly 280 is suspended in housing 242 by spring 244. In an exemplary embodiment, spring 244 is connected to coupling assembly 240, and vibrating electromagnetic actuator 250 is supported by coupling assembly 240. It is noted that while embodiments are detailed herein that utilize a spring, alternate embodiments can utilize other types of resilient elements. Accordingly, unless otherwise noted, disclosure of a spring herein also includes disclosure of any other type of resilient element that can be utilized to practice the respective embodiment and/or variations thereof.

Figure 3:
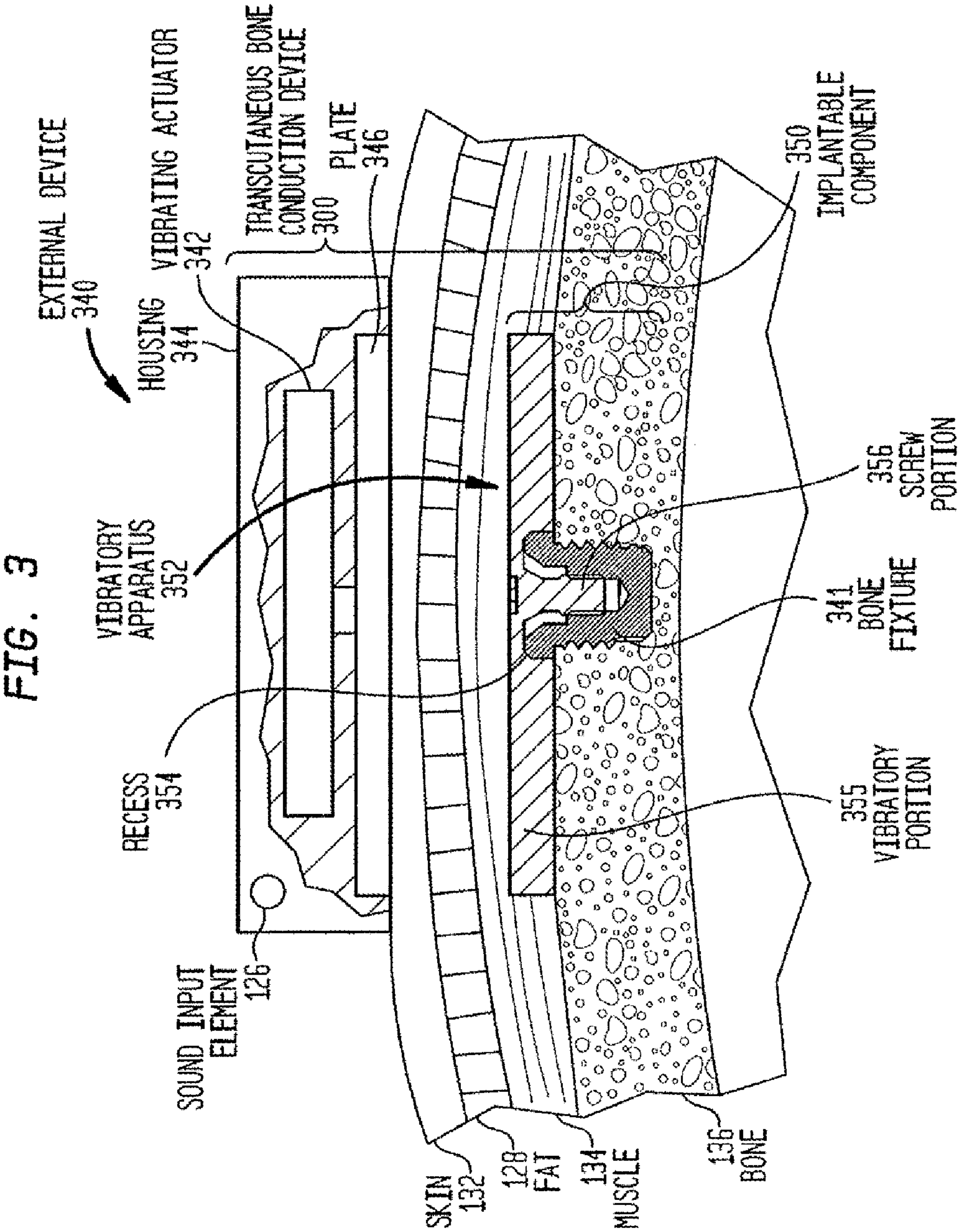
FIG. 3 is a schematic diagram conceptually illustrating a passive transcutaneous bone conduction device in accordance with at least some exemplary embodiments.

FIG. 3 depicts an exemplary embodiment of a transcutaneous bone conduction device 300 according to an embodiment that includes an external device 340 (corresponding to, for example, element 140B of FIG. 1B) and an implantable component 350 (corresponding to, for example, element 150 of FIG. 1B). The transcutaneous bone conduction device 300 of FIG. 3 is a passive transcutaneous bone conduction device in that a vibrating electromagnetic actuator 342 is located in the external device 340. Vibrating electromagnetic actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibrating electromagnetic actuator 342 is a device that converts electrical signals into vibration. In operation, sound input element 126 converts sound into electrical signals. Specifically, the transcutaneous bone conduction device 300 provides these electrical signals to vibrating electromagnetic actuator 342, or to a sound processor (not shown) that processes the electrical signals, and then provides those processed signals to vibrating electromagnetic actuator 342. The vibrating electromagnetic actuator 342 converts the electrical signals (processed or unprocessed) into vibrations. Because vibrating electromagnetic actuator 342 is mechanically coupled to plate 346, the vibrations are transferred from the vibrating electromagnetic actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibrating electromagnetic actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object such as an abutment as detailed herein with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

It is noted that with respect to the embodiments of FIGS. 2-3, each embodiment has a fixation component. With respect to FIG. 2, the fixation component is a recipient coupling in the form of coupling assembly 240. With respect to FIG. 3, the fixation component is a component (details not specifically shown) of the pressure plate 346.

As will be further detailed below, various teachings detailed herein and/or variations thereof can be applicable to the various embodiments of FIGS. 2-3 and/or variations thereof. In an exemplary embodiment, the various teachings detailed herein and/or variations thereof can be applied to the various embodiments of FIGS. 2-3 to obtain a hearing prosthesis where a vibrating electromagnetic actuator is in vibrational communication with a fixation component such that vibrations generated by the vibrating electromagnetic actuator in response to a sound captured by sound capture devices of the various embodiments are ultimately transmitted to bone of a recipient in a manner that at least effectively evokes hearing percept. By "effectively evokes a hearing percept," it is meant that the vibrations are such that a typical human between 18 years old and 40 years old having a fully functioning cochlea receiving such vibrations, where the vibrations communicate speech, would be able to understand the speech communicated by those vibrations in a manner sufficient to carry on a conversation provided that those adult humans are fluent in the language forming the basis of the speech. That said, it is noted that embodiments can also effectively evoke a hearing percept in humans younger than 18 years old and older than 40 years old and/or with humans without a fully functioning cochlea and/or in humans that are not completely fluent in the language forming the basis of the speech. In other words, the aforementioned population of 18 to 40 year olds is provided by way of example and not by way of limitation.

Some exemplary features of the vibrating electromagnetic actuator usable in some embodiments of the bone conduction devices detailed herein and/or variations thereof will now be described in terms of an operationally removable component of the bone conduction device used in the context of the percutaneous bone conduction device of FIG. 1A. It is noted that any and/or all of these features and/or variations thereof may be utilized in transcutaneous bone conduction devices and/or other types of prostheses and/or medical devices and/or other devices. It is further noted that while embodiments detailed herein are often referred to in terms of the electromagnetic transducer being an actuator, is to be understood that any of these teachings, unless otherwise specifically noted, are equally applicable to electromagnetic transducers that receive vibration and output a signal resulting from the received vibrations.

Figure 4A:
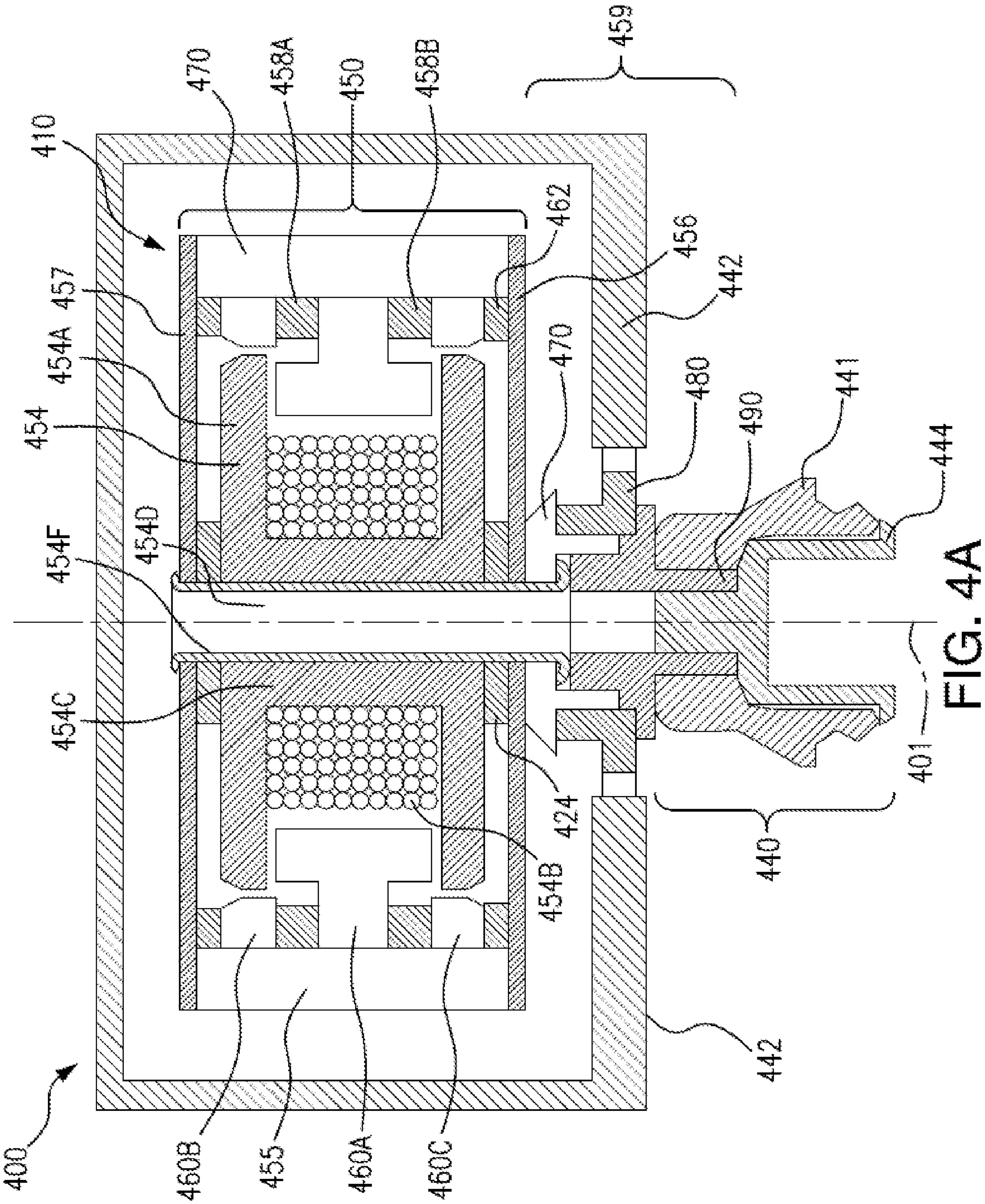
FIG. 4A is a cross-sectional view of an example of a removable component of the bone conduction device of FIG. 2.

FIG. 4A is a cross-sectional view of an operationally removable component of a bone conduction device 400 which can correspond to operationally removable component of bone conduction device 200 of FIG. 2. Removable component of bone conduction device 400 includes a vibrating electromagnetic actuator-coupling assembly 410, which can correspond to vibrating electromagnetic actuator-coupling assembly 280 detailed above. The vibrating electromagnetic actuator-coupling assembly 410 includes a vibrating electromagnetic transducer 450 in the form of an actuator, and a coupling assembly 440. Coupling assembly 440 includes a coupling 441, which is mounted on an extension assembly 459 (discussed in greater detail below), and sleeve 444 (a protective sleeve—utilitarian features of the sleeve 444 are described below). As can be seen from FIG. 4A, in this exemplary embodiment, the coupling assembly 440 is not a monolithic component. For example, sleeve 544 is a separate component from coupling 541.

The extension assembly 459 comprises three separate components. In interface component 470, a stop component 480, and a fastener 490. Briefly, the interface component 470 enables the latter two components to interface with the transducer. Stop component 480 is configured to prevent the transducer from rotating too much relative to the housing 442. Fastener 490 is configured to hold the stop component 480 onto the interface component 470, and also provide a seat/fastening apparatus for the coupling 441. It is noted that in an exemplary embodiment, any or all of these components can be done away with and instead the bobbin 454 can include an extension, which extension can be a monolithic component thereof, that extends all the way to the coupling 441. Alternatively, in an exemplary embodiment, a rod can extend from inside the bobbin to the coupling 441. Alternatively, the component 454F can be configured to extend all the way to the coupling 441. The coupling of course in at least some exemplary embodiments can be attached to any of these components to enable and otherwise establish rigid attachment between the coupling 441 and the transducer. Still, embodiments will be described with respect to these three components located between the transducer and the coupling 441.

Also shown in FIG. 4A, the removable component 400 includes a housing 442, which can correspond to housing 242 of FIG. 2. The spring (which can correspond to spring 244 of FIG. 2) supporting the vibrating electromagnetic actuator-coupling assembly 410 in the housing 442 is not shown for clarity, but would extend inside the housing 442 horizontally (with respect to the frame of reference of FIG. 4A) from the extension assembly 459 to the vertical housing wall. It is noted that while portions of extension assembly 459 are depicted in FIG. 4A as overlapping portions of housing 442, during rest, these components do not contact each other in at least some embodiments. The overlapping in FIG. 4A is a result of the fact that the components are shown in cross-sectional view in a single plane. Additional details of this feature of the embodiment of FIG. 4A are discussed below.

As illustrated in FIG. 4A, vibrating electromagnetic actuator 450 includes a bobbin assembly 454 and a counterweight assembly 455. As illustrated, bobbin assembly 454 includes a bobbin 454A and a coil 454B that is wrapped around a core 454C of bobbin 454A. The actuator 450 also includes a pipe rivet 454F that passes through the holes of the actuator 450 and fixes the extension assembly 459 to the electromagnetic transducer 450. As can be seen, the rivet 454F includes a head (upper part) and a flared portion (lower part) that secures the electromagnetic transducer 450 to the extension assembly 459. In this regard, these components correspond to the traditional components of a pipe rivet. In an exemplary embodiment, the rivet 454F is slip-fit or interference-fit into the space passing through bobbin, although other types of fit, such as a clearance-fit, can be utilized. Any type of fit that will enable the teachings detailed herein and/or the variations thereof to be practiced can be utilized in at least some embodiments. In an exemplary embodiment, the rivet is made of the same or similar material, at least from a magnetic permeability sense, as that of the bobbin body 454A.

In an exemplary embodiment, an embryonic rivet has one or both ends that is/are straight (not flared). During assembly, the rivet is fit through all of the pertinent holes of the electromagnetic transducer 450, and fit through the hole in the extension assembly 459 (at the top), and a flaring mandrel is used to flare the rivet to the configuration depicted in FIG. 4A, thus positively retaining at least the interfacing portion of the extension assembly 459 to the electromagnetic transducer 450. Other embodiments can utilize another type of configuration in place of the rivet 454F (e.g., a bolt and nut arrangement, etc.).

It is noted that unless otherwise specified, the electromagnetic transducers detailed herein are radially symmetrical.

Figure 4B:
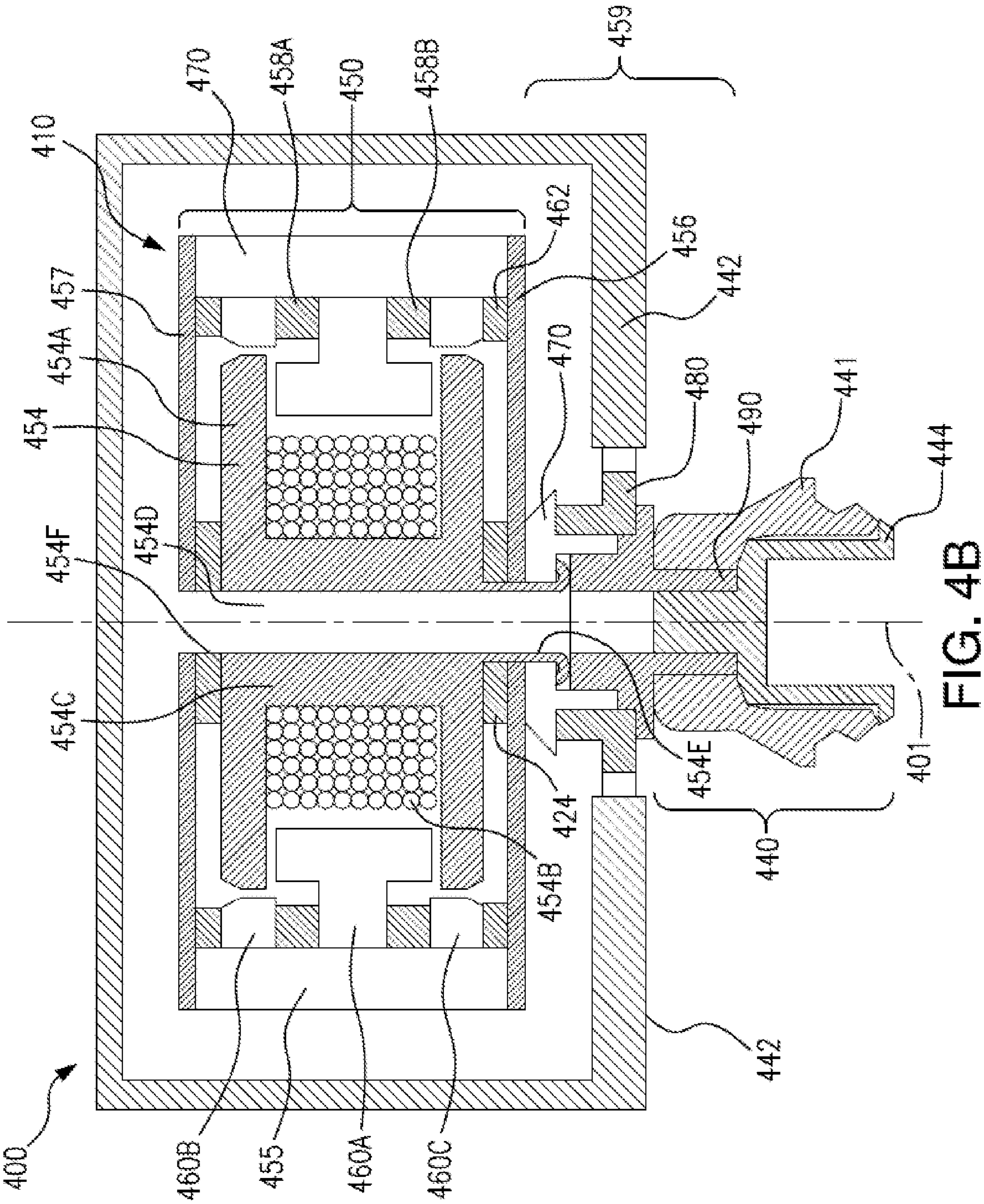
FIG. 4B is a cross-sectional view of another example of a removable component of the bone conduction device of FIG. 2.

FIG. 4B depicts an alternate embodiment of a removable component of a bone conduction device 400, which corresponds to the removable component 400 of FIG. 4A, with the exception that the holes though the bobbin 454, springs 456 and 457 and spacers 424 are smaller that of FIG. 4A, and the bobbin includes include extension 454E that extends through the spacer 424, instead of pipe rivet 454F. Bobbin extension 454E, which extends through the hole in spring 456 and interfaces with the extension assembly 559 (more on this below). In the exemplary embodiment, the distal end of the bobbin extension 454E includes a flared portion that secures the electromagnetic transducer 450 to the extension assembly 459. In an exemplary embodiment, the embryonic bobbin 554A has a bobbin extension 454E (also an embryonic component) that is straight (not flared). During assembly, the embryonic bobbin extension 454E is fit through the hole in the extension assembly 459 (at the top), and a flaring mandrel is used to flare the bobbin extension 454E to the configuration depicted in FIG. 4A, thus positively retaining at least the interfacing portion of the extension assembly 459 to the electromagnetic transducer 450. Again, it is briefly noted that extension four 540 can extend all the way to coupling 441, and coupling 441 can be directly connected to that extension. As will be detailed herein, in other embodiments, rods and the like can be coupled to the inside of the bobbin and/or to the extension (e.g., inside of the extension) so as to transmit vibrations via the metallic structure from the bobbin to the skin penetrating apparatus as will be described in greater detail below.

Counterweight assembly 455 includes springs 456 and 457, permanent magnets 458A and 458B, yokes 460A, 460B and 460C, spacers 462, and counterweight mass 470. Spacers 462 provide a connective support between spring 456 and the other elements of counterweight assembly 455 just detailed, although it is noted that in some embodiments, these spacers are not present, and the spring is connected only to the counterweight mass 470, while in other embodiments, the spring is only connected to the spacers. Springs 456 and 457 connect bobbin assembly 454 via spacers 422 and 424 to the rest of counterweight assembly 455, and permit counterweight assembly 455 to move relative to bobbin assembly 554 upon interaction of a dynamic magnetic flux, produced by coil 454B. The static magnetic flux is produced by permanent magnets 458A and 458B of counterweight assembly 455. In this regard, counterweight assembly 455 is a static magnetic field generator, where the permanent magnets 458A and 458B are arranged such that their respective south poles face each other and their respective north poles face away from each other. It is noted that in other embodiments, the respective south poles may face away from each other and the respective north poles may face each other.

Coil 454B, in particular, may be energized with an alternating current to create the dynamic magnetic flux about coil 454B. In an exemplary embodiment, bobbin 454A is made of a soft iron. The iron of bobbin 454A is conducive to the establishment of a magnetic conduction path for the dynamic magnetic flux. In an exemplary embodiment, the yokes of the counterweight assembly 455 are made of soft iron also conducive to the establishment of a magnetic conduction path for the static magnetic flux.

It is noted that the electromagnetic actuator of FIG. 4A is a balanced actuator. In alternate configuration a balanced actuator can be achieved by adding additional axial air gaps above and below the outside of bobbin 454B (and in some variations thereof, the radial air gaps are not present due to the addition of the additional axial air gaps). In such an alternate configuration, the yokes 460B and 460C are reconfigured to extend up and over the outside of bobbin 454B (the geometry of the permanent magnets 458A and 458B and/or the yoke 460A might also be reconfigured to achieve utility of the actuator).

It is further noted that in alternative embodiments, the teachings detailed herein and/or variations thereof can be applicable to unbalanced electromagnetic actuators, at least with respect to a bobbin thereof through which a dynamic magnetic flux passes.

As can be seen from FIGS. 4A and 4B, the vibrating electromagnetic transducer 450 includes a passage passing all the way therethrough. (In order to better convey the concepts of the teachings herein, the "background lines" of the cross-sectional views are not always depicted in the figures. It is to be understood that in at least the case of a radially symmetric transducer according to the embodiment of FIGS. 4A and 4B, components such as springs 456 and 457, the bobbin 454, etc., extend about the longitudinal axis of the transducer. It was determined that depicting such background lines would distract from the concepts of the teachings herein.) More particularly, the bobbin 454A includes space therein, in the form of bore 454D that passes all the way therethrough, including through bobbin extension 454E in the case of the embodiment of FIG. 4B. This space constitutes a passage through the bobbin 454A, which passage is in the from a space inside the transducer (inside the bobbin body 454A) to the sleeve 441. Also, as can be seen, this space extends through extension assembly 459. Also, spacers 462 and 424 and springs 456 and 457 have a space in the form of a bore that passes all the way therethrough. These spaces constitute a passage through the spacers and through the springs.

Still with reference to FIGS. 4A and 4B, it can be seen that there is a passage from the space within the bobbin 454A to the connection apparatus 440. It is noted that while the space and the passage are one and the same, in an alternate embodiment, the passage can be different from the space (such as, for example, in an embodiment where the extension assembly 459 is a separate component from the bobbin 454A (e.g., the bobbin 454A and the extension assembly 459 are not monolithic components, as is depicted in FIGS. 4A and 4B), etc.).

Still with reference to FIGS. 4A and 4B, it can be seen that a connection apparatus in the form of coupling assembly 440, is in fixed relationship to the bobbin assembly 454 in general, and the bobbin 454A in particular. In the embodiment depicted in FIG. 4A, the coupling assembly is configured to transfer vibrational energy from the vibrating electromagnetic actuator 450 that is transferred into the extension assembly 459 to an abutment implanted in a recipient (discussed in greater detail below). As noted above, while embodiments detailed herein are directed towards an actuator, other embodiments are directed towards a transducer that receives vibrational energy, and transducers that vibrational energy into electrical output (e.g. the opposite of the actuator). Accordingly, exemplary embodiments include a connection apparatus in fixed relationship to the bobbin configured to transfer vibrational energy to and/or from an electromagnetic transducer. It is noted that in an exemplary embodiment, such a transducer can correspond exactly to or otherwise be similar to the embodiment of FIGS. 4A and 4B.

The embodiment of FIG. 4A depicts intervening component (extension assembly 459) between the coupling assembly 440 and the bobbin assembly 454, such that the coupling assembly 440 is indirectly fixed to the bobbin assembly 454. Accordingly, the coupling assembly 440 indirectly transfers vibrational energy to or from the electromagnetic transducer 450. In an alternate embodiment, the coupling assembly 440 can be directly fixed to bobbin assembly 454. Accordingly, in such an arrangement, coupling assembly 440 transfers vibrational energy directly to or from the electromagnetic transducer 450. Along these lines, while the extension assembly is depicted as being a separate component from the electromagnetic transducer 450, in an alternate embodiment, the bobbin extension can be monolithic with the bobbin 454A, as noted above. Any device, system, or method that can establish a fixed relationship between the bobbin assembly and/or a component of the bobbin assembly and the coupling assembly and/or a component of the coupling assembly can be utilized in at least some embodiments.

Figure 5A:
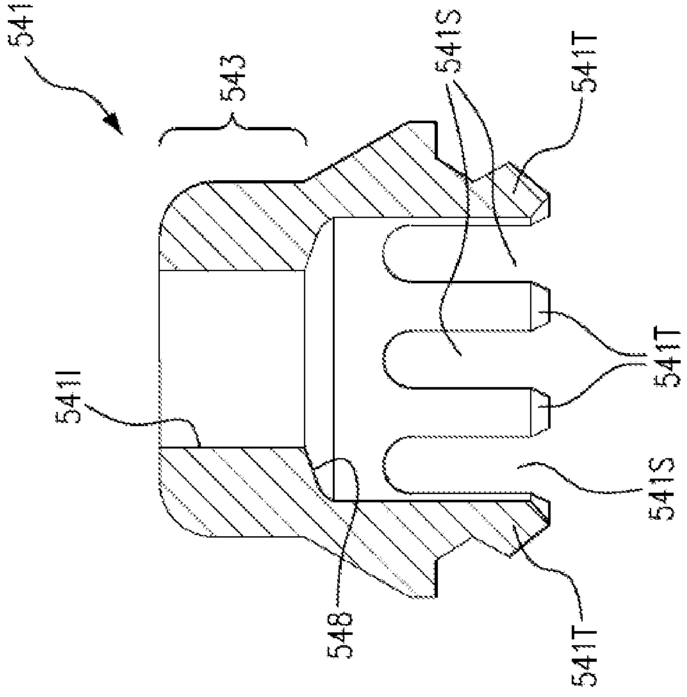
FIG. 5A is a cross-sectional view of a component of FIGS. 4A and 4B.
Figure 5B:
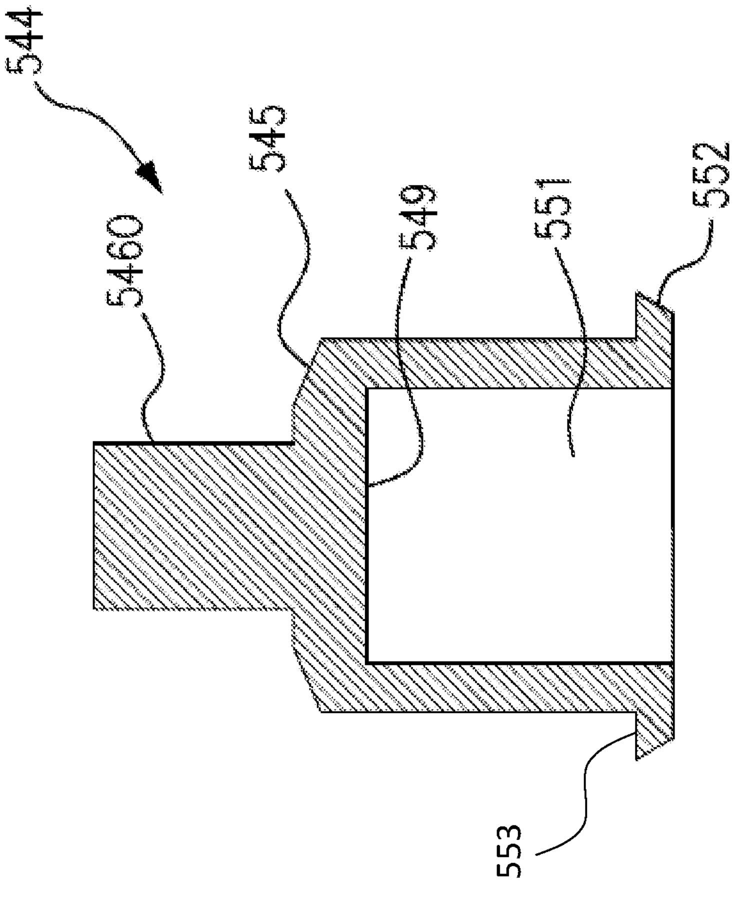
FIG. 5B is a cross-sectional view of another component of FIGS. 4A and 4B.

FIG. 5A depicts an exemplary embodiment of a coupling 541, where coupling 541 corresponds to coupling 441 of FIGS. 4A and 4B). Coupling 541 is slip fit onto fastener 490. That is, in the absence of positive retention of coupling 541 to fastener 4590, such as via sleeve 444, coupling 541 easily slides off the fastener 490. That said, as can be seen in the embodiments of FIGS. 4A and 4B, coupling 441 (coupling 541 of FIG. 5A) is positively retained to fastener 490. FIG. 5B depicts exemplary details of sleeve 544, which can correspond to sleeve 444. In some embodiments, sleeve 444/544 includes a screw driver receptacle (flat or Phillips or other type) or a wrench receptacle (e.g., Allen wrench). In an exemplary embodiment, with reference to FIG. 5B, driver receptacle can be located at surface 549 of sleeve 544. In this regard, in an exemplary embodiment, a screwdriver can be fitted into the opening 551 (female portion) of the sleeve 544 to access the driver receptacle at surface 549. By applying a torque to the screwdriver, which torque is reacted against by the receptacle at surface 549, the sleeve 544 is screwed into fastener 590. In an alternative embodiment, instead of or in addition to receptacles, a wrench stud (e.g., hex head protrusion) is included with the sleeve 544, which wrench stud can be located at surface 549. Any device, system, and/or method that can enable mechanical advantage to be applied to the sleeve 544 to enable the sleeve to be threaded into the faster 590 can be utilized in at least some embodiments.

As mentioned above, embodiments include portions of the bobbin, such as the bobbin extension, that extend all the way to coupling 541. The bobbin extension can be configured and/or other components can be utilized to rigidly secure the coupling 541 to the bobbin extension. Still further, a component that extends directly from the transducer to the coupling 541 can be utilized and the coupling can be directly attached thereto. Any arrangement of supporting the couplings detailed herein can be utilized in at least some exemplary embodiments.

In an exemplary embodiment, at least a part of the inside surface of the extension/fastener 459 forms a cylindrical surface that is threaded to receive a corresponding outer cylindrical surface 5460 of sleeve 544 (see FIG. 5B, where sleeve 544 corresponds to sleeve 444 of FIGS. 4A and 4B), surface 5460 also being threaded (discussed in greater detail below).

Thus, in this regard, sleeve 544 includes shoulder 545 which extends outward away from longitudinal axis 601 in all directions thereabouts. In the embodiment of FIGS. 4A and 4B, shoulder 545 forms a seat that interfaces with coupling 441 and prevents coupling 441 from moving in the longitudinal direction away fastener 490. More particularly, surface 5460 can be threaded. These threads correspond to threads inside extension 490 in some embodiments. When these two components are threaded together, a jackscrew effect exists such that as sleeve 544 is screwed into fastener 490, shoulder 545 pushes against the bottom surface 548 of coupling, effectively clamping coupling 541 between sleeve 544 and the bottom surface of projection 592 of fastener 590. It is noted that the aforementioned jackscrew effect is but in exemplary embodiment. In an alternative embodiment, where, for example, a press fit arrangement is utilized with respect to the retention of coupling 541 relative to fastener 490, there might be no jack screw effect.

Accordingly, in an exemplary embodiment, there is a bone conduction device according to any of the teachings detailed herein and/or variations thereof that includes a transducer such as the electromagnetic transducer 410 of the embodiments of FIGS. 4A and/or 4B or any other type of transducer they can be utilized to practice the teachings detailed herein and/or variations thereof. The bone conduction device further includes a connection assembly in fixed relationship with the transducer. The connection assembly is configured to connect the bone conduction device to another component configured to directly and/or indirectly interface with the recipient of the bone conduction device. Examples of such connection are detailed below with respect to FIGS. 6 and 7. Briefly, however, an exemplary embodiment of such a connection assembly is the coupling 441 snap coupled to abutment 620 (or another type of skin penetrating apparatus) as detailed in FIG. 6.

By way of example only and not by way of limitation, the connection assembly can include the coupling 441 and sleeve 444 of the embodiments of FIGS. 4A and/or 4B, etc. As detailed above, the connection assembly is configured to transfer vibrational energy directly or indirectly to and/or from the transducer. In this regard, the embodiments of FIGS. 4A and 4B, utilizing the extension assembly 459, are examples of embodiments that indirectly transfer vibrational energy to and/or from the transducer 450 in view of the fact that the extension assembly 459 is interposed between and mechanically connects the coupling 441 to the electromagnetic transducer 450. Conversely, in embodiments where the coupling 441 directly abuts the electromagnetic transducer 450, there is, at least in part direct transfer of vibrational energy to and/or from the transducer (it is at least in part) because a scenario can exist where there is also a path of indirect transmission of vibrational energy, such as through a component that extends from the electromagnetic transducer 450 to the coupling 441 (e.g. a bolt fastening the two components together etc.).

In an exemplary embodiment, a component of the connection assembly, such as by way of example the coupling 441, is actively held by positive retention to the bone conduction device by another component of the connection assembly, such as by way of example the sleeve 444. By "actively held by positive retention," it is meant that the other component of the connection assembly provides the retention of the component to the device such that in the absence of that another component, the component would not be positively retained to the bone conduction device. By way of example only and not by way of limitation, if the coupling 441 is slip fit onto the faster 490, the sleeve 444 actively holds the coupling 441 to the bone conduction device by positive retention. Conversely by way of example only and not by way of limitation, if the coupling 441 is threaded to the faster 490 and/or otherwise interference fitted to the faster 490 such that the bone conduction device could be effectively utilized to evoke a hearing percept without positive retention by another device (e.g. the sleeve 444), there would be no active holding by positive retention by the coupling 441 because the coupling 441 holds itself to the bone conduction device and permits the bone conduction device to effectively evoke a hearing percept. Put another way, if the coupling 441 can be held to the bone conduction device in the absence of the sleeve 444, and the bone conduction device can effectively be used to evoke a hearing percept, and there is no other component that provides positive retention to the coupling 441, there is no active holding by positive retention of the coupling 441 by second device, even though the coupling 441 is indeed held by positive retention (the threads, but the threads but this is done by the coupling 441 itself).

Still further, in an exemplary embodiment, still with respect to the embodiments of these figures, the removable component of the bone conduction devices is configured such that a new coupling 441 can be installed onto the remainder of the removable component of the bone conduction device after the old coupling 441 is removed, and the coupling 441 can be actively positively retained to the remainder the device via the attachment of sleeve 444 to the remainder of the removable component of the bone conduction device (a new sleeve 444 or the old sleeve 444 can be utilized in at least some embodiments).

That is, in an exemplary embodiment, the coupling 441 can be removed from the faster 490 with the fastener 490 attached to the interface component 470 and/or the stop apparatus 480 while the interface component 470 and/or stop apparatus 480 is in fixed relationship to the electromagnetic transducer and is in mechanical coupling relationship with the housing 442. This is also the case in some other embodiments that do not utilize this assembly, but instead utilized some of the other component tree to support the coupling, at least in some exemplary embodiments.

Figure 6:
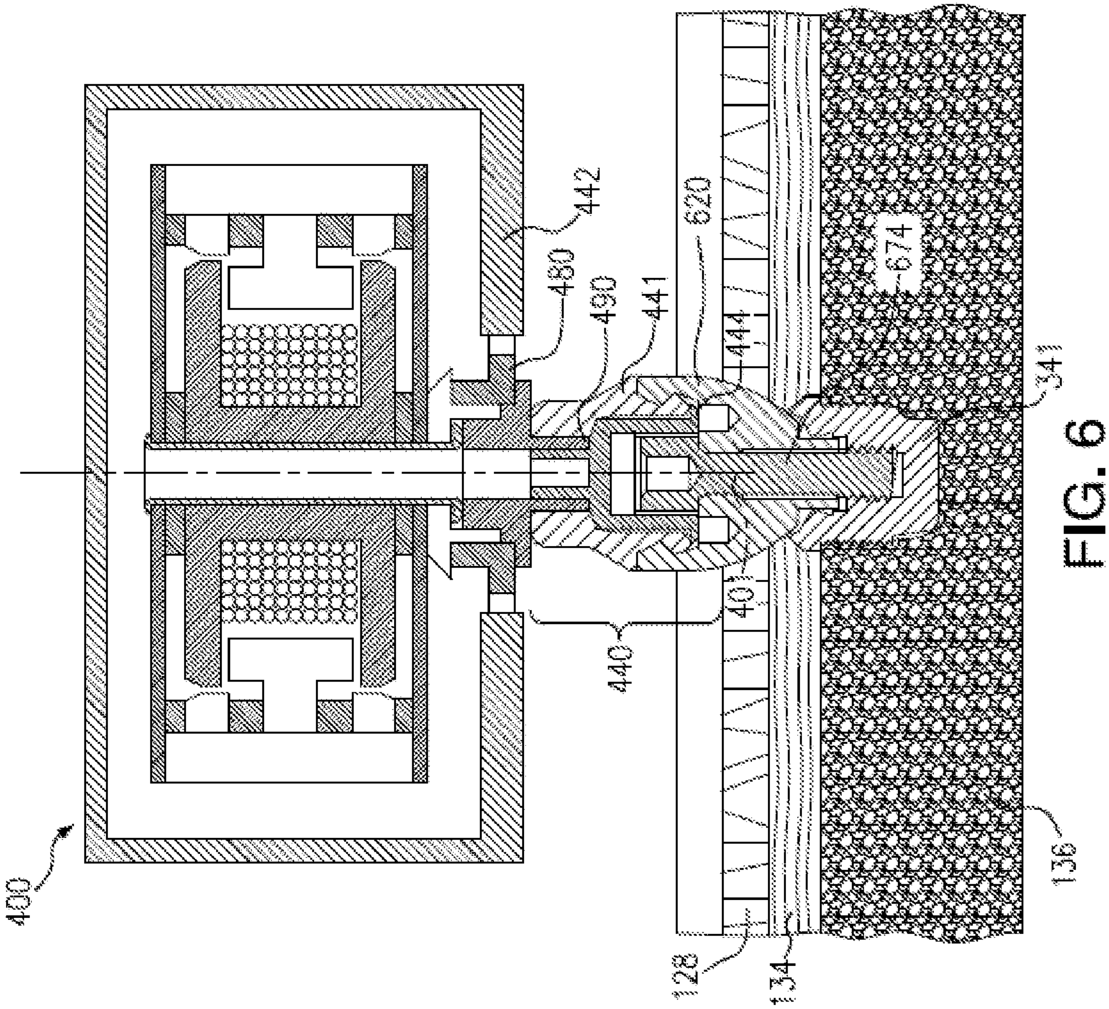
FIG. 6 is a schematic diagram illustrating connection of the removable component of FIG. 4A to and implanted abutment.

FIG. 6 depicts use of the embodiment of FIGS. 4A and 4B to provide vibrational energy into bone 136 of a recipient via vibrating electromagnetic actuator-coupling assembly 410. More particularly, FIG. 6 shows the coupling assembly 440 snap-coupled to abutment 620, which is secured to bone fixture 341 via abutment screw 674 (all of which can be made from titanium/titanium alloys, in whole or in substantial part). In operation, vibrational energy generated by the vibrating electromagnetic transducer 450 travels down bobbin extension 459 into the coupling assembly 540, including coupling 540, and then from coupling assembly 540 to the abutment 620 and then into bone fixture 341 and then into bone 136. In an exemplary embodiment, the vibrational communication effectively evokes a hearing percept. Accordingly, the electromagnetic transducer 450 of the bone conduction device (elements 400 in combination with elements 620, 274 and 341) is an electromagnetic actuator. However, as noted above, in alternate embodiments, electromagnetic transducer 450 receives vibrations from a recipient or the like.

In an exemplary embodiment, the abutment is a generally concave component having a hollow portion at a top thereof into which the coupling assembly 440 fits (with reference to FIG. 5A, teeth 541T of the coupling assembly 540 fit into the hollow portion). The hollow portion has an overhanging portion at the end of the abutment around which teeth 541T of the coupling extend to snap-fit to the abutment. While an exemplary embodiment of the abutment entails a challis shaped outer profile, other embodiments can be substantially cylindrical or hour-glass shaped, etc.

It is noted that while the embodiment of the coupling assembly 440 detailed herein is directed to a snap-fit arrangement, in an alternate embodiment, a magnetic coupling can be used. Alternatively, a screw fitting can be used. In some embodiments, the coupling assembly 440 corresponds to a female component and the abutment corresponds to a male component, in some alternate embodiments, this is reversed. Any device, system or method that can enable coupling of the removable component to an implanted prosthesis can be utilized in at least some embodiments providing that the teachings detailed herein and/or variations thereof can be practiced.

As noted above, an exemplary embodiment of the removable component of the bone conduction device 400 includes a protective sleeve 444 that is part of the coupling assembly 440. In this regard, coupling 441 is a male portion of a snap coupling that fits into the female portion of abutment 620, as can be seen in FIG. 6.

Referring back to FIG. 5A, the outer circumference of coupling 441 has spaces 541S between teeth 541T at the bottom portion thereof (i.e. the side that faces the abutment 620) in a manner analogous to the spaces between human teeth, albeit the width of the spaces is larger in proportion to the width of the teeth as compared to that of a human. During attachment of the bone conduction device to the abutment 620, the potential exists for misalignment between the abutment 620 and the coupling 441/541 such that the outer wall that establishes the female portion of the abutment 620 can enter one or more of the spaces 541S between the teeth 541T of the coupling 441/541 (analogous to the top of a paper cup (albeit a thin paper cup) passing into the space between two human teeth). In some embodiments, this could have a deleterious result (e.g., teeth might be broken off if the components are moved in a lateral direction during this misalignment (which is not an entirely implausible scenario, as percutaneous bone conduction devices are typically attached to a recipient behind the ear, and thus the recipient cannot see the attachment), etc.).

With reference to FIG. 5B, sleeve 444/544 is a solid sleeve with a portion 552 that juts out in the lateral direction such that it is positioned between the very bottom portion of coupling 541 and the abutment 620. The portion 552 that juts out, because it is continuous about the radial axis/axis 601 (e.g., no spaces, unlike the teeth) prevents the wall forming the female portion of the abutment 620 from entering between the teeth of the coupling 441/541. (This is analogous to, for example, placing a soft plastic piece generally shaped in the form of a "U" against the tips of a set of human bottom or top teeth. Nothing moving in the longitudinal direction of the teeth can get into the space between the teeth because it will first hit the "U" shaped plastic.) In this regard, the removable component of the bone conduction device 400 includes a connection apparatus 440 that in turn includes a protective sleeve 444 configured to limit a number of interface regimes of the connection apparatus with the abutment 620. In an exemplary embodiment, this is the case at least with respect to those that would otherwise exist in the absence of the protective sleeve 444 (e.g. in the absence of the sleeve, the wall of the abutment could fit into the space between the teeth of coupling 441—with the sleeve, the wall of the abutment cannot fit into the space between the teeth of coupling 441).

That said, in some other embodiments, this feature of the sleeve that prevents the abutment from entering the space of the teeth is not necessarily present. Indeed, in some embodiments, the sleeve 444 is configured to simply provide the positive retention of the coupling 441 to the remainder of the removable component.

Figure 7:
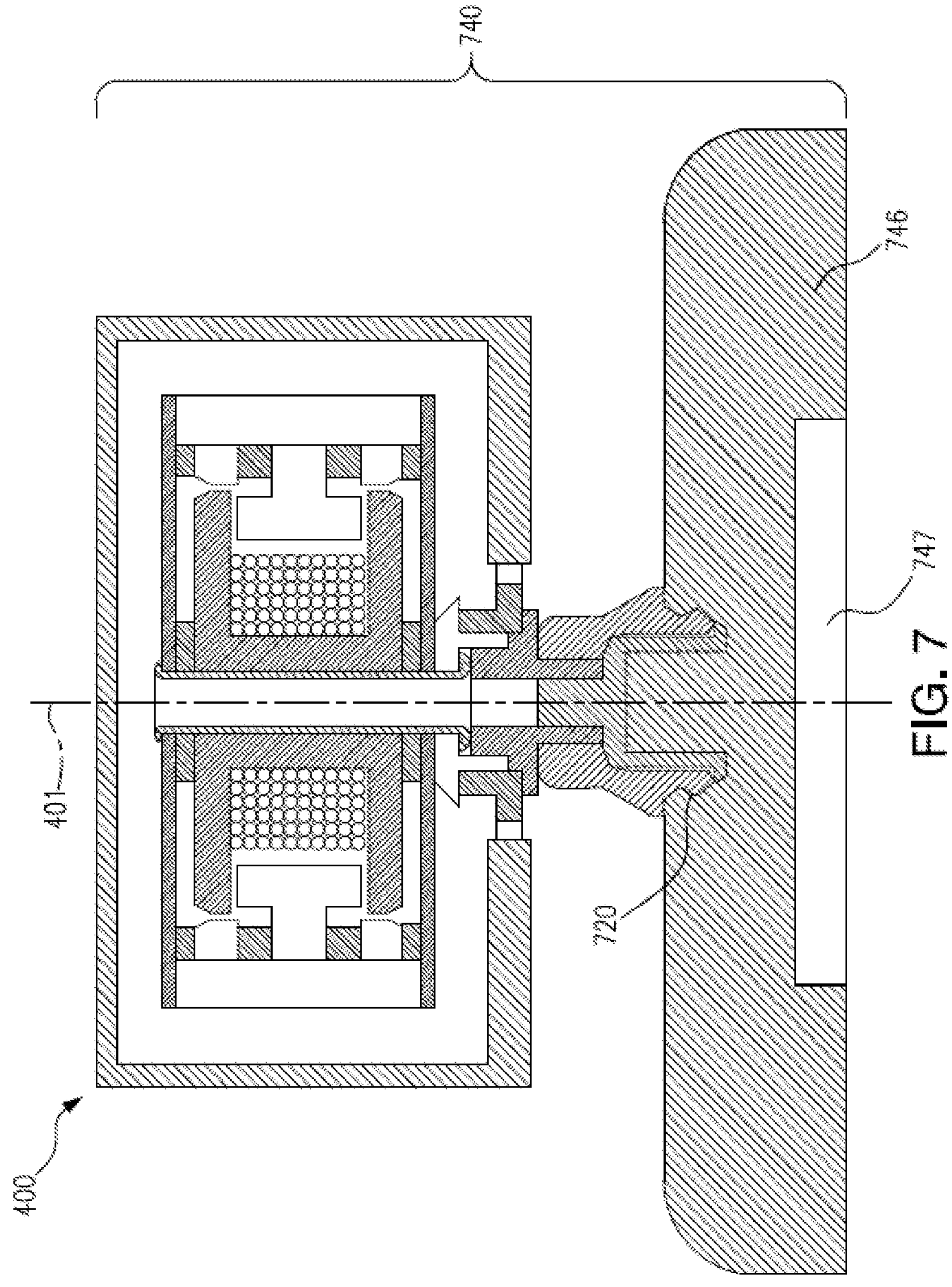
FIG. 7 is a cross-sectional view of an example of the external component of the embodiment of FIG. 3.

While the embodiments detailed herein up to this point have tended to focus on percutaneous bone conduction devices, variations of these embodiments are applicable to passive transcutaneous bone conduction devices. In this regard, the fixation regimes and methods described herein and/or variations thereof are applicable to fixation of an electromagnetic transducer to a pressure plate of a passive transcutaneous bone conduction device, such as the plate 346 of FIG. 3, where a vibrating electromagnetic actuator 342 is the electromagnetic transducer. This can be the case in an exemplary embodiment where such connection results in an interface between the given electromagnetic vibrator and the plate 346 that is sufficient to establish a vibrational communication path such that, providing a suitable interface between the plate 346 and the vibratory portion 355, the vibrational communication effectively evokes a hearing percept. In an exemplary embodiment, the plate can have a component analogous to or the same as the portions of the fixture 341 that interface with the bone conduction device 400 detailed above or variations thereof. Along these lines, FIG. 7 depicts an exemplary embodiment of an external component 740 of a passive transcutaneous bone conduction device according to that of FIG. 3. As can be seen, device 400 of FIGS. 4A and 4B is attached to a plate 746 (corresponding to plate 346 of FIG. 3) via receptacle 720 of plate 746, where receptacle 720 corresponds to the interior of abutment 620 of FIG. 6. In an exemplary embodiment, receptacle 720 is a monolithic component of plate 746, whereas in an alternate embodiment, it is a separate component. Indeed, in an exemplary embodiment, it can correspond to, in part or in whole, abutment 620.

Plate 746 includes magnet 747, which corresponds to the magnet of external device 340 of FIG. 3. In an alternate embodiment, all or substantially all of plate 746 is a magnet.

It is briefly noted that herein, the phrase "teeth" will be used. As used herein, any disclosure of teeth includes a disclosure of a single tooth, unless otherwise noted, providing that the art enables such, and visa-versa. Also, as used herein, "teeth" encompasses both the singular and the plural, unless otherwise noted. The phrase "single tooth" corresponds to one tooth, and the phrase "plurality of teeth" correspond to two or more teeth. As seen above, in at least some exemplary embodiments, the removable component of the bone conduction assembly includes a coupling assembly 440 configured as a male portion that interfaces with an abutment 620 configured as a female portion of the ultimate coupling established between the two. In an exemplary embodiment, there can be utilitarian value with respect to also enabling the coupling assembly 442 attach to an abutment that is configured as a male portion, and thus enabling the coupling assembly 442 to have a female coupling, in addition to maintaining the male coupling functionality of the removable component of the hearing prosthesis 400.

Figure 8:
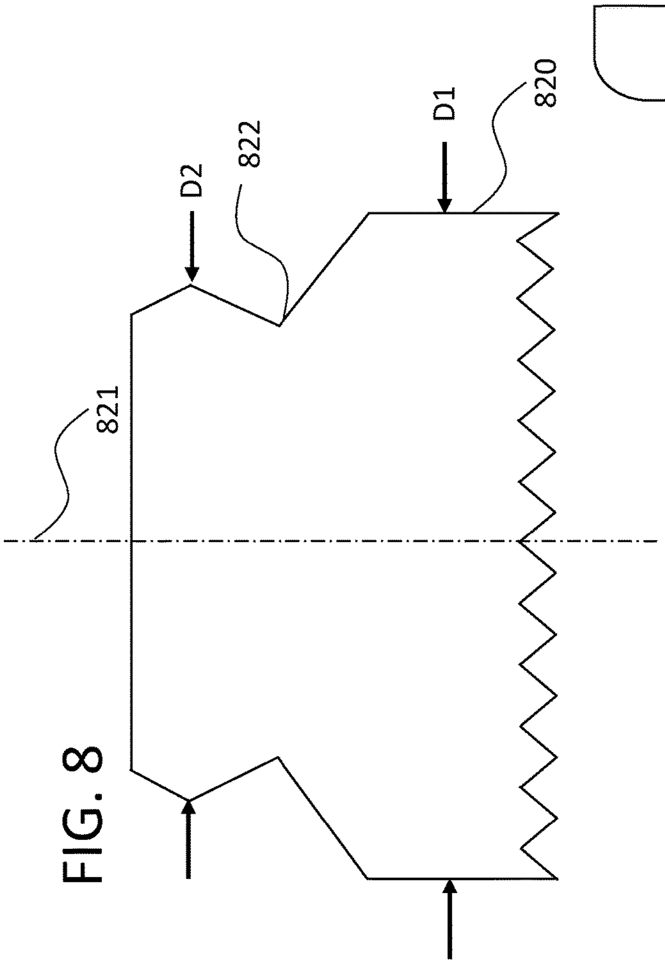
FIG. 8 is an exemplary embodiment of an abutment.

FIG. 8 presents an exemplary side view of an exemplary abutment 820 that has a male portion configured for snap coupling. In an exemplary embodiment, the abutment 820 is rotationally symmetric about the longitudinal axis, while in other embodiments, this need not necessarily be the case. The abutment can be circular in cross-section, oval in cross-section and/or otherwise noncircular in cross-section (which cross-sections are taken on a plane normal to the longitudinal axis and/or on a plane parallel to the tangent plane of the local surface of the skin where the abutment 820 extends through the skin (or, more accurately, the tangent plane of the local extrapolated surface of the skin—the surface that would be there if the abutment 820 was not piercing the skin). Note that this is also the case with respect to the abutment 620 detailed above and/or any other embodiments of the embodiments detailed herein unless otherwise noted.

Briefly it is noted that in an exemplary embodiment, the maximum outer diameter of the abutment 820, at least with respect to the locations above the skin, and/or at least with respect to the locations above the midpoint within the skin, and/or at least locations with respect to the locations above 1, 2, 3, or 4 millimeters above the surface of the skull, is depicted as diameter D1. In an exemplary embodiment, diameter D1 is measured on a plane normal to the longitudinal axis 821 and/or on the plane parallel to the tangent plane to the local skin, extrapolated or otherwise. In an exemplary embodiment, D1 is the largest diameter at any location between the exterior end/the coupling end of the abutment 821 and a location 3, 4, 5, 6, 7, 8, 9, 10, 11, 12, 13, 14, 15, 16, 17, 18, 19, or 20 mm therefrom (and thus could be the largest diameter anywhere). That said, in an exemplary embodiment, D1 is the largest diameter at any of those locations other than that associated with the coupling features (e.g., the features associated with recess 822). Thus, D1 is the largest diameter at any location between the coupling of the abutment and a location 3, 4, 5, 6, 7, 8, 9, 10, 11, 12, 13, 14, 15, 16, 17, 18, 19, or mm therefrom. Note also that while these values and features have been directed towards the abutment, in some embodiments, these are applicable to any of the components of the skin penetrating apparatus, whether it is the abutment, the abutment screw, etc. indeed, as will be described below, there are embodiments where the abutment screw is utilized as the abutment, and what otherwise would be considered to be the abutment is instead a non-directly abutting component vis-à-vis the removable component. In an exemplary embodiment D1 is less than, greater than and/or equal to 1, 2, 3, 4, 5, 6, 7, 8, 9, 10, 11, 12, 13, 14, 15, 16, 17, 18, 19, 20, 21, 22, 23, 24, and 25 mm and/or can be any value or range of values therebetween in 0.01 mm (5.52 mm, 8.88 mm, 2.01 mm to 8.06 mm, etc.).

It is also noted that in at least some exemplary embodiments, there can be a diameter D2 of the coupling of the skin penetrating apparatus. In an exemplary embodiment, D2 can be the largest diameter of the abutment. In an exemplary embodiment, D2 can be larger than D1. In an exemplary embodiment D2 is less than, greater than, and/or equal to 1, 2, 3, 4, 5, 6, 7, 8, 9, 10, 11, 12, 13, 14, 15, 16, 17, 18, 19, 20, 21, 22, 23, 24, and 25 mm and/or can be any value or range of values therebetween in 0.01 mm (5.52 mm, 8.88 mm, 2.01 mm to 8.06 mm, etc.).

Figure 9:
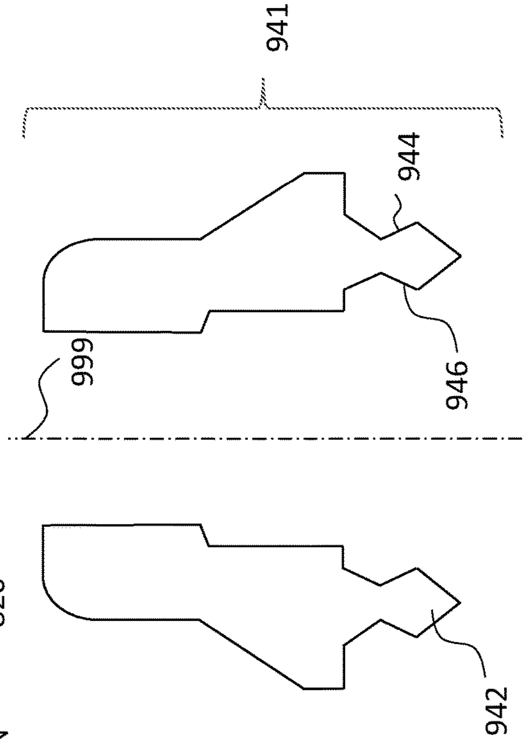
FIG. 9 is a cross-sectional view of an exemplary coupling according to an exemplary embodiment without back lines.

As can be seen, abutment 820 includes a recessed section 822, again, which can be rotationally symmetric about axis 821, that provides the recess for the teeth of the snap coupling component(s) of the removable component of the external device. In this regard, FIG. 9 depicts an exemplary coupling 941 which can correspond to coupling 441 detailed above. It is briefly noted that the view in FIG. 9 is presented without backdrop/back lines. In this regard, it can be considered a cross-sectional view taken on a plane parallel to and lying on the longitudinal axis of the coupling 941, where everything in the background has been removed for clarity. Thus, only two teeth 942 are shown (whereas in the FIG. 5A, four (4) teeth are shown)). In an exemplary embodiment, if FIG. 9 was drawn utilizing the same standards as FIG. 5A, two more additional teeth, etc., would be shown. This is the case with almost all of the views of the couplings detailed from here on in. In this regard, any disclosure of a coupling of a cross-section comparable to that seen in FIG. 9 also corresponds to a disclosure of a coupling having the features of FIG. 5A where those features are modified to correspond to the particular feature at issue with respect to the given drawling at issue.

Figure 10A:
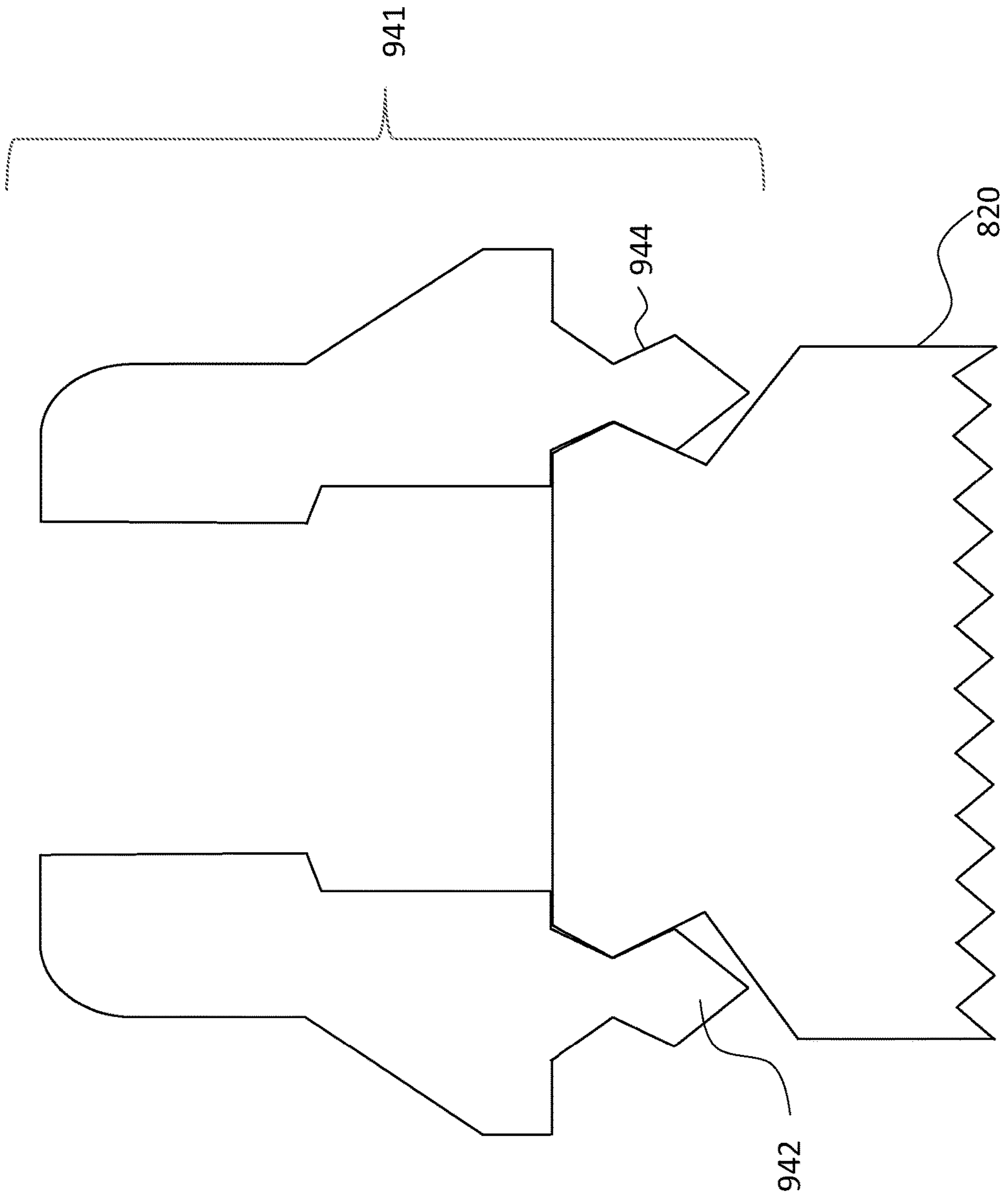
FIG. 10A depicts coupling of the coupling the FIG. 9 with the abutment of FIG. 8.
Figure 10B:
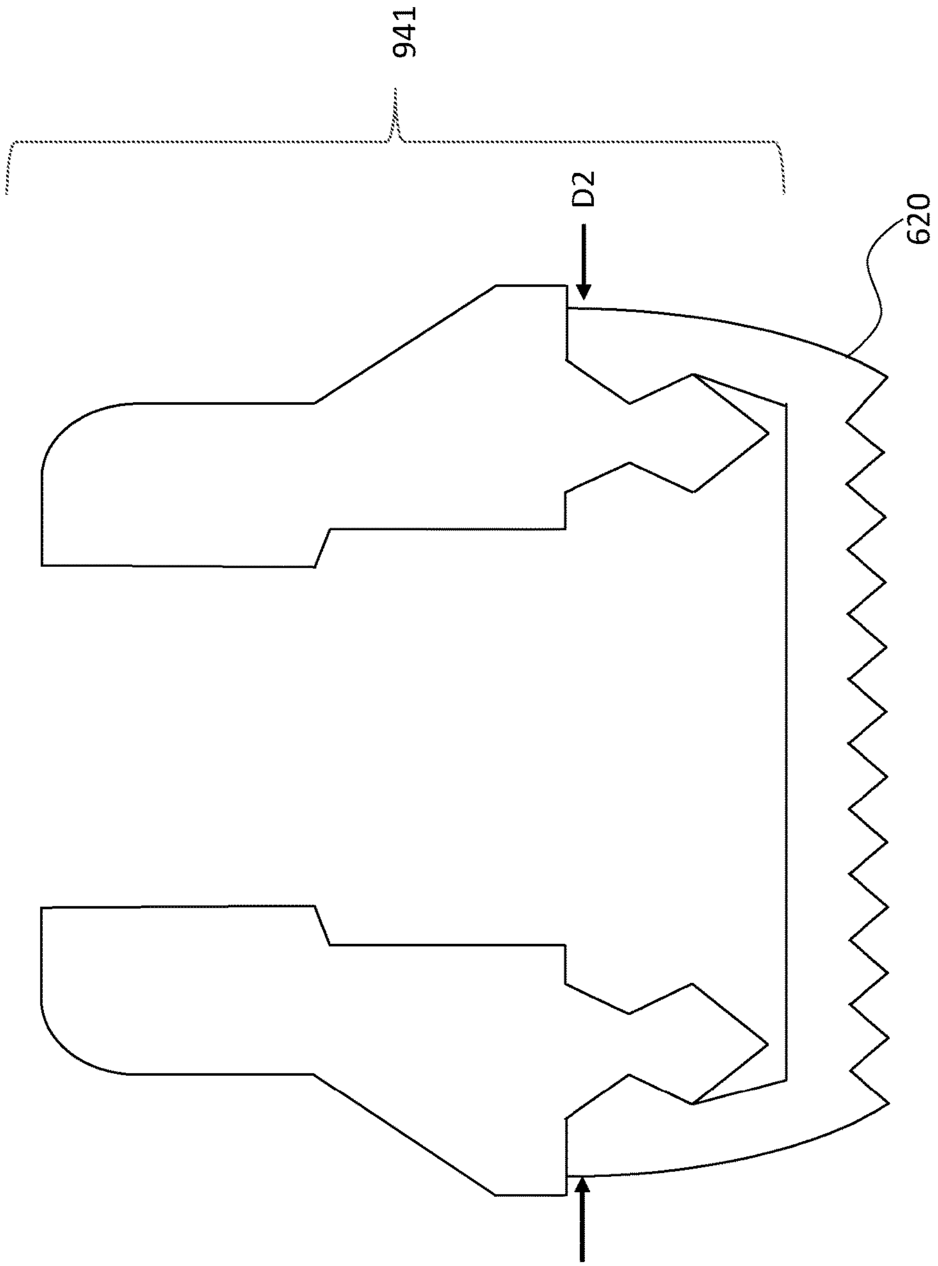
FIG. 10B depicts coupling of the coupling of FIG. 9 with the abutment of FIG. 6.

As seen in FIG. 9, coupling 941 includes teeth 942. In this exemplary embodiment, teeth 942 include the surfaces 944 and 946. Surfaces 944 provide the configuration to couple to the abutment 620 detailed above, and thus provide the male coupling components of the coupling 941. Surfaces 946 provide the configuration to couple to the abutment 820. This is seen in FIG. 10A. Surfaces 944 provide the configuration to couple to the abutment 620. This is seen in FIG. 10B. (FIG. 10B also shows the maximum diameter D2 of the abutment, concomitant with the teachings above—note that while it cannot be specifically made out on the drawing of FIG. 10B, the abutment 620 curves inward at the locations above the arrows for D2.)

Thus, in view of the above, it can be seen that in an exemplary embodiment, there is a device, such as a removable component of a percutaneous bone conduction device 400, comprising, a transducer, such as the transducer 450, and a coupling apparatus configured to couple to a male mating coupling component and also configured to couple to a female mating coupling component. While the embodiment depicted in the FIGS. 8-10B represents a snap coupling arrangement (where the teeth 942 have the resilience of the teeth of the embodiment of FIG. 5A detailed above, and/or variations thereof, in at least some exemplary embodiments), other embodiments are not limited to only snap coupling. Indeed, in an exemplary embodiment, surfaces 944 and 946 can instead be provided with threads, and thus enabling the configuration of the coupling to a male mating component and also the coupling to a female mating component. Still, with respect to the embodiment of FIGS. 8, 9, and 10B, the coupling apparatus is configured in at least some embodiments to snap couple to a male mating coupling component and also configured to snap couple to a female mating coupling component.

In view of the above, it can be seen that in an exemplary embodiment, the coupling apparatus includes a plurality of teeth, and at least some of the respective teeth of the plurality of teeth provide the configuration to snap couple to the female mating component, and at least some of the respective teeth of the plurality of teeth provide the configuration to snap couple to the female mating component. Here, a given tooth is configured to enable both types of coupling. Thus, at least some of the respective teeth of the plurality of teeth provide the configuration to snap couple to the female mating component and provide the configuration to snap couple to the male mating component. That said, in an alternate embodiment, a given tooth can be specifically for one type of coupling and not have features that enable the other type of coupling. By way of example only and not by way of limitation, every other tooth could have the features for the female coupling, and the teeth in between can have the features for the male coupling. That said, the configuration of the teeth can be weighted towards one or the other. In an exemplary embodiment, more teeth can be directed towards providing the configuration to snap couple to the female mating component than the male mating component or vice versa. Note also that in some embodiments, some teeth can be configured to provide the configuration to snap couple to both the female mating component and the male mating component, and other teeth can be configured to provide only the configuration for one or the other. Thus, in at least some exemplary embodiments, there exists embodiments where there are three different types of teeth on the coupling.

In view of the above, it is to be understood that in at least some exemplary embodiments, the coupling apparatus includes a plurality of teeth, at least some of the respective teeth of the plurality of teeth including male projections (the projection established by surface 944) extending outward away from a longitudinal axis (999 in FIG. 9) of the coupling apparatus, thereby providing the configuration to snap couple to the female mating component. The coupling is also configured such that at least some of the respective teeth of the plurality of teeth include male projections (the projections established by surface 946) extending inward towards the longitudinal axis of the coupling apparatus, thereby providing the configuration to snap couple to the female mating component. The embodiment of FIG. 9 shows that at least some of the teeth of the plurality of teeth have both the male projections extending outward and the female projections extending inward. As will be seen below, in some other embodiments, none of the teeth of the plurality of teeth have both the male projections extending outward and the male projections extending inward. That is, in at least some exemplary embodiments, with respect to all coupling teeth of the device none of the teeth of the plurality of teeth that include the male projections include the female projections, and none of the teeth of the plurality of teeth that include the female projections include the male projections.

It is noted that in at least some exemplary embodiments, some of the teeth have the male components that extend outward and inward, while others only include the features that extend outward or only include the features that extend inward. Such can be utilitarian with respect to embodiments where some coupling configurations require more surface area/structure than the others. Thus, in an exemplary embodiment, there is a device wherein one of:

(i) the coupling apparatus includes a plurality of teeth respectively including male projections extending outward away from a longitudinal axis of the coupling apparatus, thereby providing the configuration to snap couple to the female mating component, and at least some of the respective teeth of the plurality of teeth include male projections extending inward towards the longitudinal axis of the coupling apparatus, thereby providing the configuration to snap couple to the male mating component; or (ii) the coupling apparatus includes a plurality of teeth respectively including male projections extending inward towards the longitudinal axis of the coupling apparatus, thereby providing the configuration to snap couple to the male mating component, and at least some of the respective teeth of the plurality of teeth include male projections extending outward away from the longitudinal axis of the coupling apparatus, thereby providing the configuration to snap couple to the female mating component.

In some other embodiments, only some of the teeth have both projections, while some of the teeth only have one type of the projection and the other type of projection respectively. Of course, in some embodiments, all of the teeth have both types of the projections.

Figure 10D:
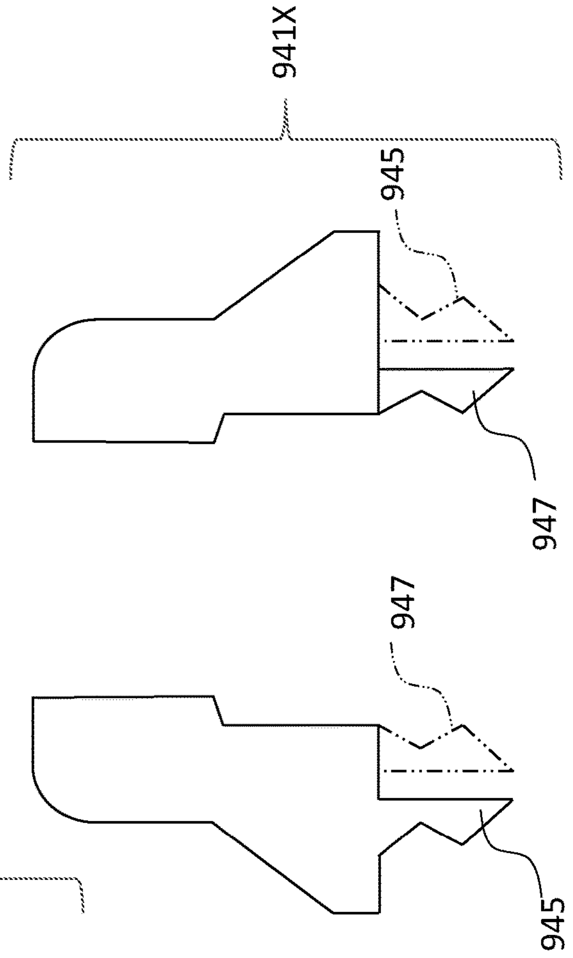
FIGS. 10C-11 depict other exemplary embodiment of other couplings.
Figure 10C:
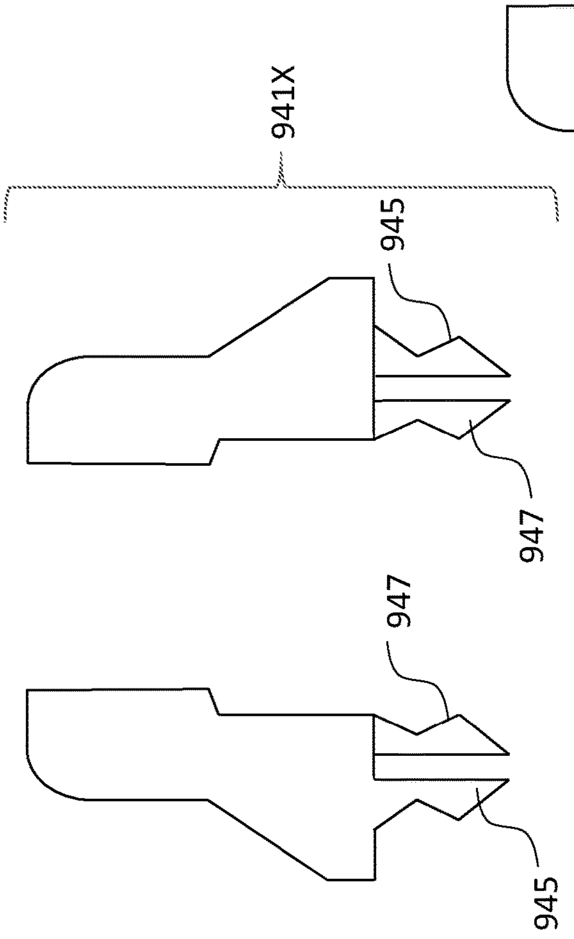

Note also that in at least some of the exemplary embodiments associated with the teeth herein have teeth radially arrayed about a common diameter relative to the longitudinal axis. That said, in some alternate embodiments, the teeth are not so arrayed. Some teeth are arrayed around a first common diameter and other teeth are arrayed around a second common diameter. By way of example only and not by way of limitation, in an exemplary embodiment, there could be teeth that are inboard of other teeth. The teeth that are inboard can be configured to couple to a male mating component and the teeth that are outboard can be configured to couple to a female mating component. FIG. 10C presents an exemplary embodiment of such. Here, teeth 945 are located outboard of teeth 947. The teeth 945 can be utilized to interface with the female mating component, and the teeth 947 can be utilized to interface with a male mating component. Note also that in at least some exemplary embodiments, the space between the teeth 945 and 947 in the radial direction can be utilized as some form of coupling in and of itself. By way of example only and not by way of limitation, the inside surfaces of the teeth 945 and 947 (the surfaces that face one another) can be high friction surfaces that are configured to "grip" a structure having a circular and hollow cross-section. In an alternative embodiment, nubs or detents can be placed on the inside surfaces that can interface with holes/divots of the just described circular and hollow cross-section structure. Thus, in an exemplary embodiment, there is a coupling that is configured to snap coupled to a female mating component, snap coupled to a male mating component and couple (snap or otherwise) to another type of component where that other component has both male and female features vis-à-vis the coupling.

Note also that in at least some exemplary embodiments, one or both of the respective facing surfaces of the teeth 945 and 947 can be threaded, thus enabling the coupling to be screwed onto the aforementioned structure having the circular and hollow cross-section, providing that component has the associated mating threads.

While the embodiment of FIG. 10C has been presented in terms of the teeth 945 and 947 being angularly aligned with one another with respect to location about the longitudinal axis of the coupling, in some other embodiments, the respective teeth are offset from one another. FIG. 10D conceptually presents this with some of the teeth being shown in phantom. In this regard, looking down the longitudinal axis, the teeth 945 can be located, starting at 0° angle, every 60 degrees, and the teeth 947 can be located, starting at the 30° angle, every 60°. Note also that this embodiment need not necessarily be applicable to only the feature where the respective teeth are arrayed inboard/outboard relative to one another. This can also be the case with respect to teeth that are radially aligned (as opposed to the embodiments of FIGS. 10C and 10D). Any arrangement of teeth they can have utilitarian value with respect to practicing at least some exemplary embodiments can be utilized in some embodiments.

Thus, in an exemplary embodiment, there is a device that includes a coupling apparatus that includes a plurality of teeth. In an exemplary embodiment, the plurality of teeth includes a first set of teeth including a first plurality of the plurality of teeth. By way of example and only, this first set of teeth can correspond to the teeth 945. In an exemplary embodiment, the plurality of teeth includes a second set of teeth including a second plurality of the plurality of teeth. In this exemplary embodiment, the second set of teeth can correspond to the teeth 947. As can be seen in this embodiment with respect to FIGS. 10C and 10D, the first set of teeth are arrayed about the second set of teeth, and the first set of teeth provide the configuration to snap couple to the male mating component, and the second set of teeth provide the configuration to snap couple to the female mating component.

Figure 11:
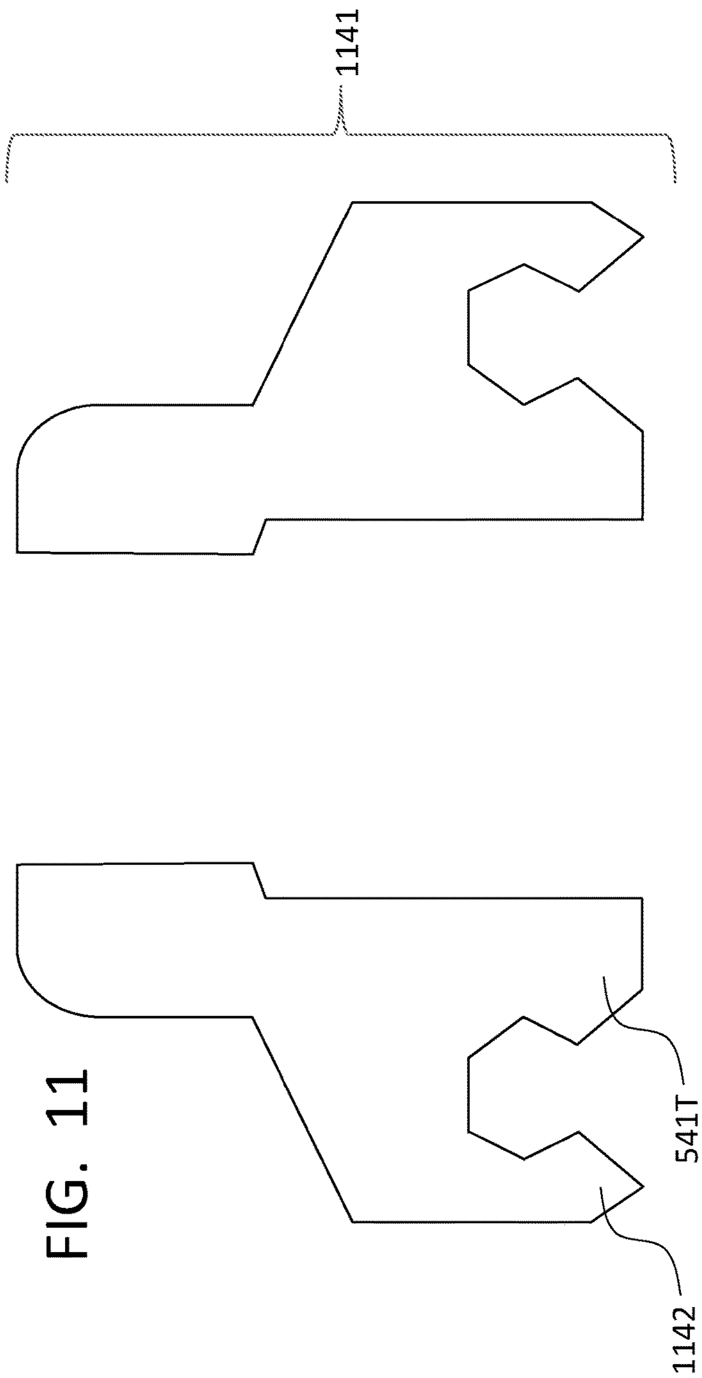
Figure 12:
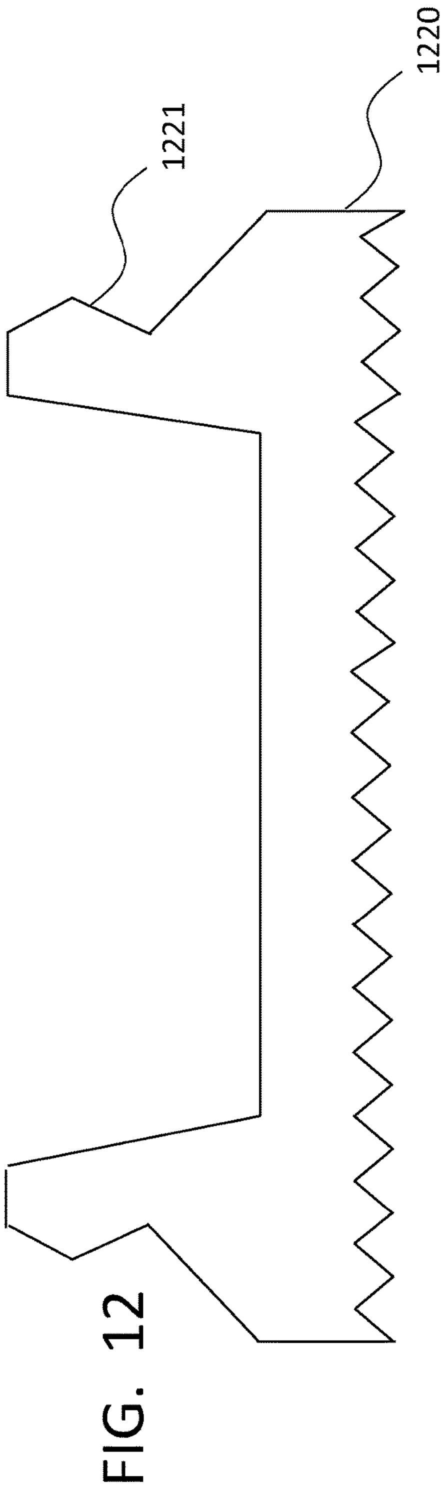
FIG. 12 a depicts another exemplary embodiment of an abutment.
Figure 13:
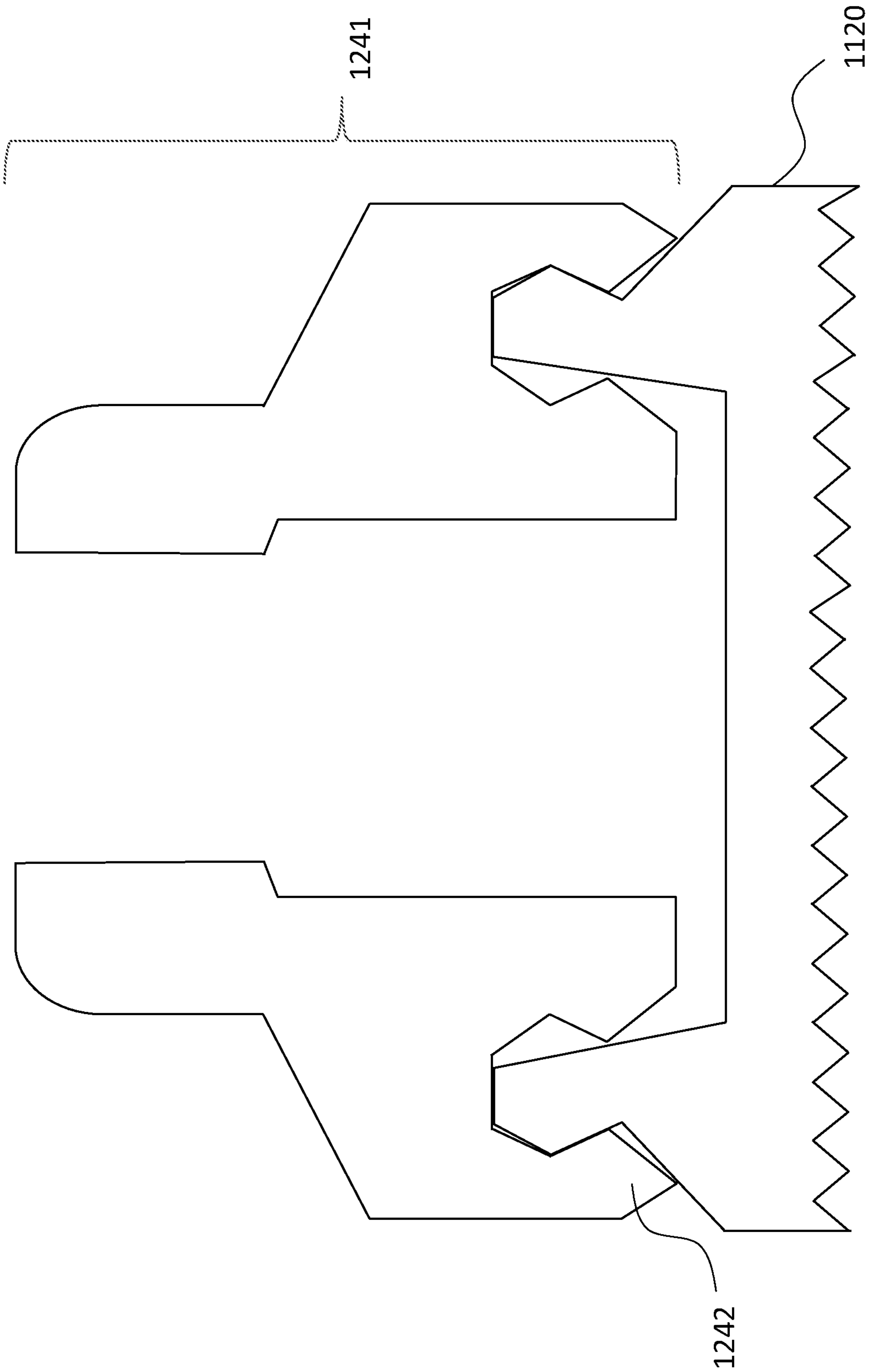
FIG. 13 depicts the abutment of FIG. 12 coupled to an exemplary coupling.

While the embodiment of FIG. 9 is directed towards a coupling 941 that has the female coupling features inboard of the male coupling features, and herein, such couplings will be described with respect to working from the inboard location outboard, and thus the coupling 941 is a female+male coupling configuration, in an alternate embodiment, the male coupling features are located inboard of the female coupling features, and thus there are couplings that correspond to a male+female coupling configuration. This is seen in FIG. 11, where coupling 1141 is presented with teeth 541T corresponding to the teeth of coupling 541 above, and teeth 1142 correspond to teeth that provide the female coupling features. FIG. 11 is configured to interface with the abutment 620 via teeth 541T, and with abutment 1220 of FIG. 12 (where the backlines are not present for purposes of clarity), as shown in FIG. 13. FIG. 12 is a male configured abutment with surface 1221 establishing the male portion of the abutment. FIG. 13 shows that there is clearance between teeth 541T and the inside of the structure that establishes the surface 1221. In an alternate embodiment, there can be contact between the teeth 541T and the inside of the structure that establishes the surfaces 1221, as such can provide potentially more "grip" owing to the bias of the teeth 541T.

Figure 14A:
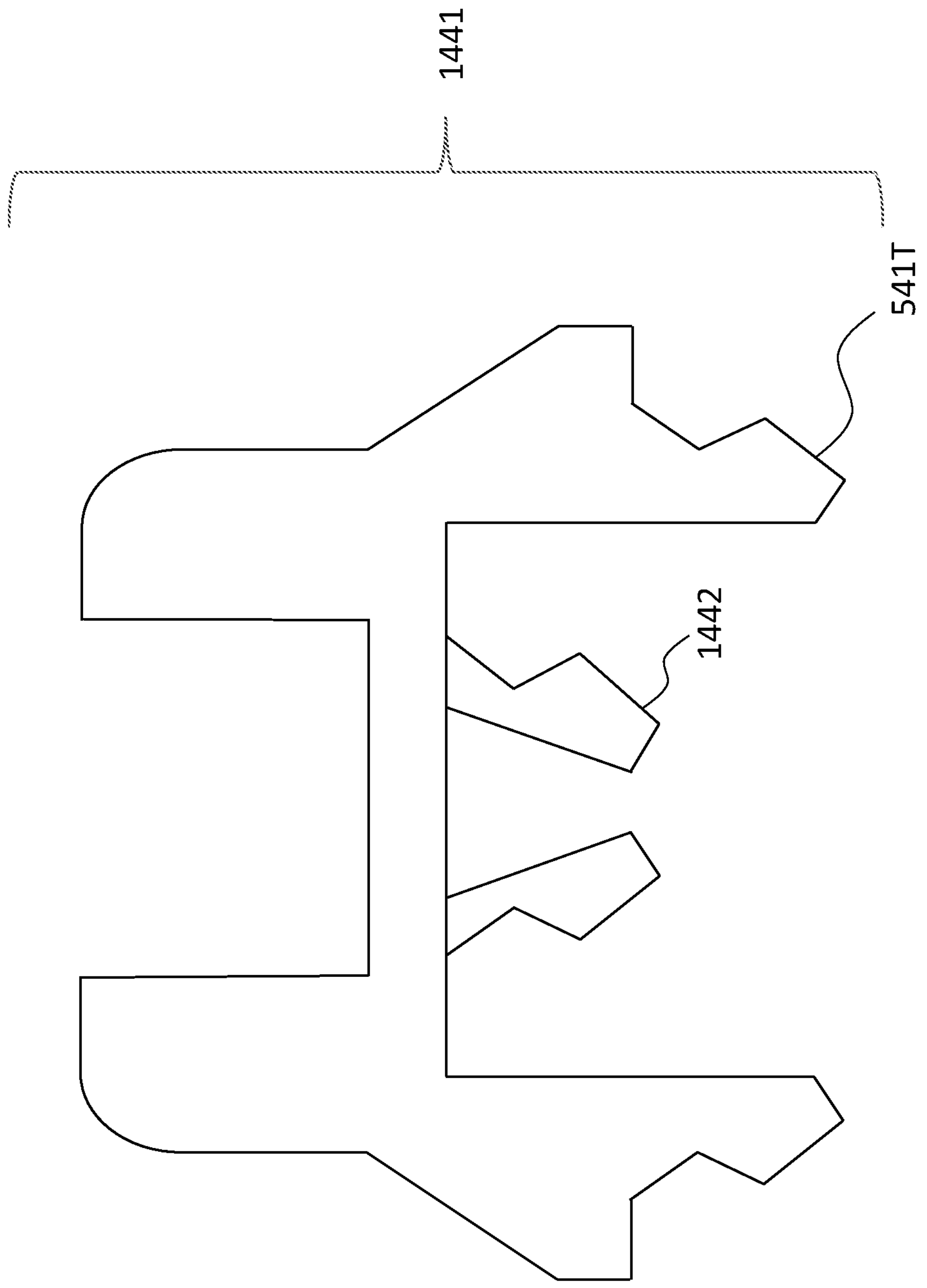
FIGS. 14A to 14E depict other exemplary embodiments of other coupling apparatuses.

While at least some exemplary embodiments are directed towards establishing a coupling that can coupled to a male mating coupling component and a female mating coupling component, other embodiments are directed towards establishing a coupling that can be coupled to two different types of female mating coupling components and/or to two different sized female mating coupling components. In this regard, FIG. 14A presents a coupling 1441, that has teeth 1442 and 541T. Teeth 541T correspond to the teeth of FIG. 5A, and teeth 1442 correspond to different teeth that are inboard relative to teeth 541T, as can be seen. Here, teeth 1442 are configured to provide a configuration of the coupling 1441 to snap couple to a female mating component. Thus, the embodiment of FIG. 14A provides a male+male coupling configuration.

Figure 14B:
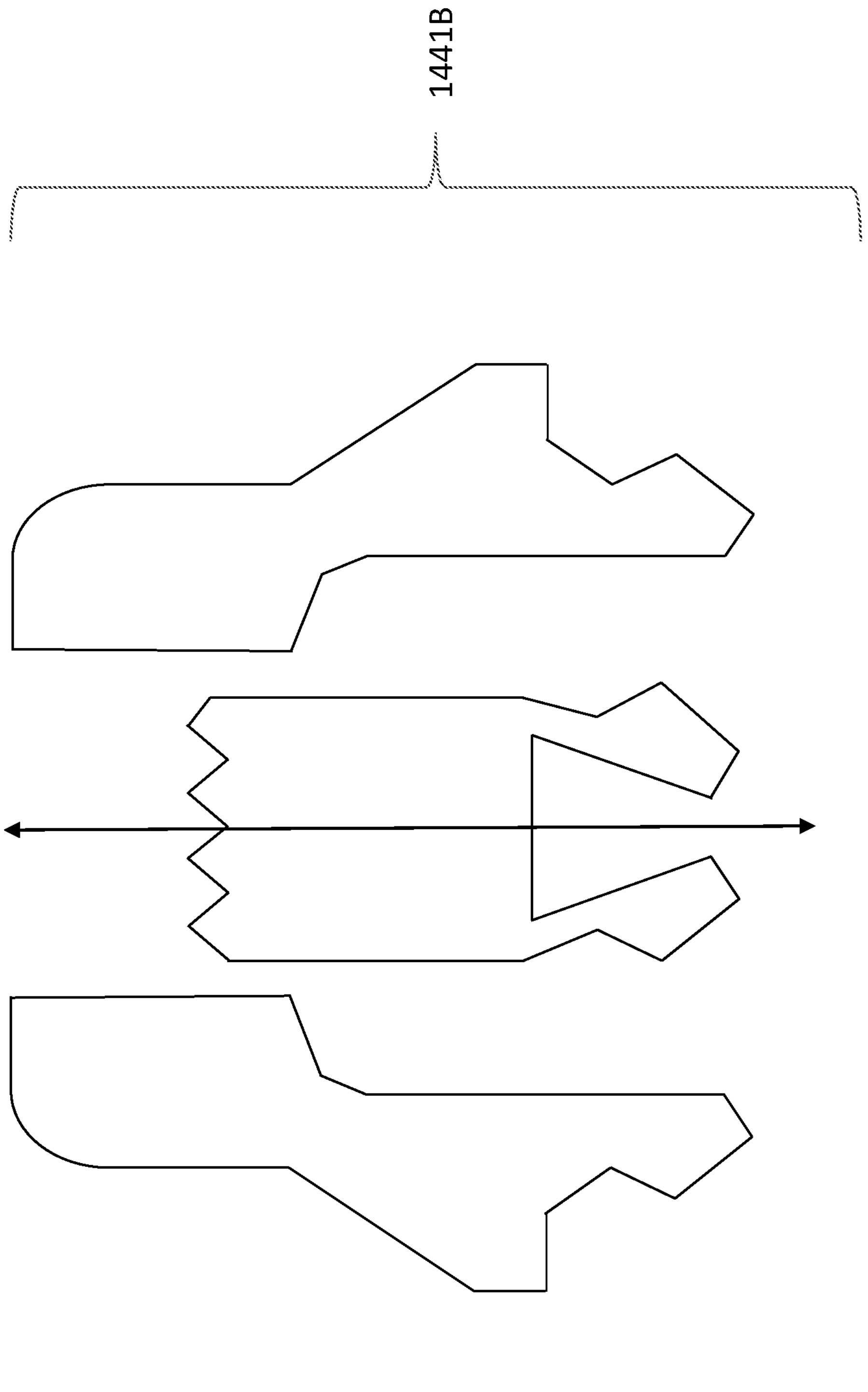
Figure 14C:
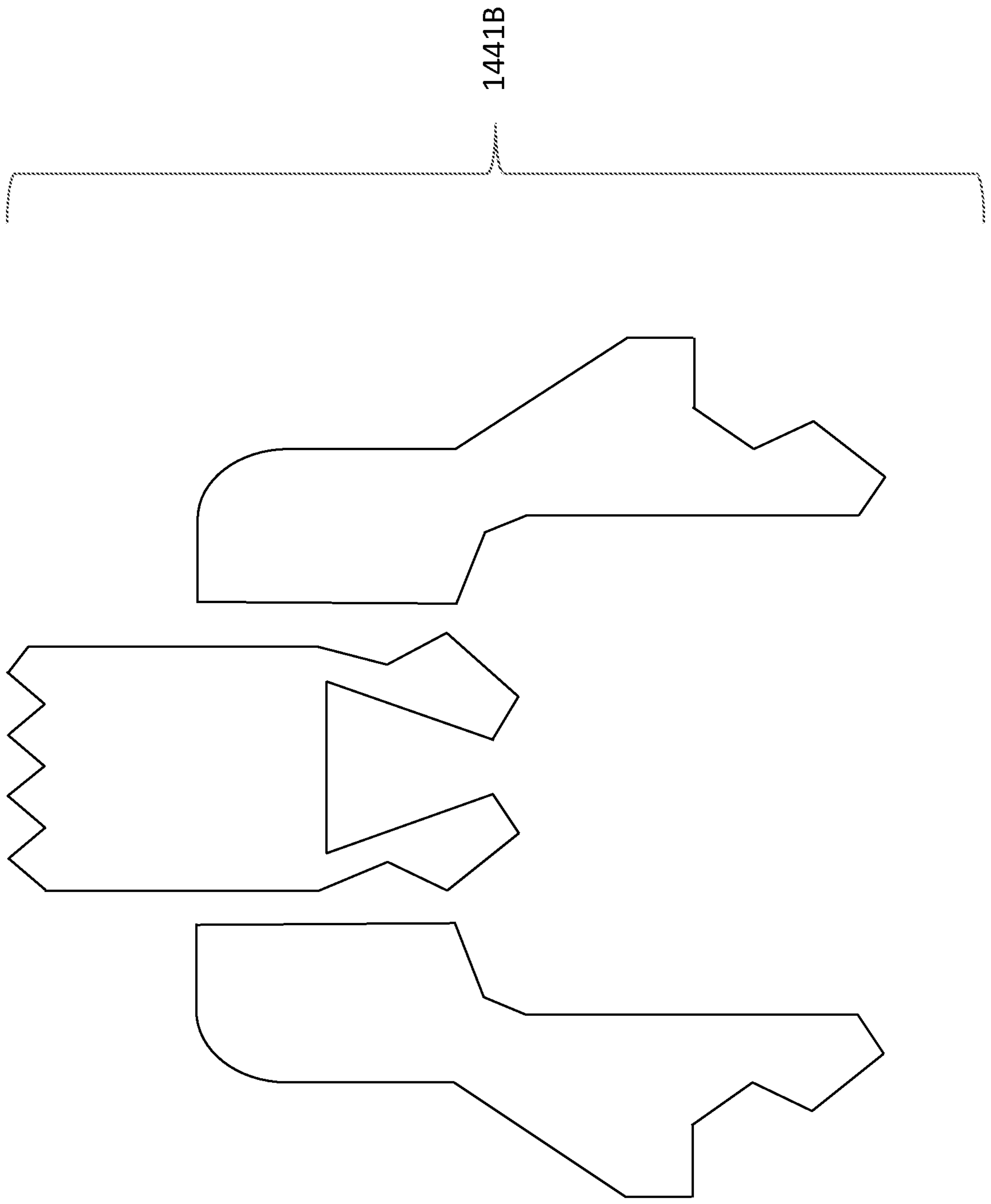

Briefly, FIGS. 14B and 14C provide an alternate embodiment of a coupling apparatus 1441B, where the inboard male coupling configuration is movable relative to the outboard male coupling configuration. It is briefly noted that in alternate embodiments, it is the outboard male coupling configuration that is movable relative to the inboard male coupling configuration, and in other embodiments, both are movable relative to the other. Indeed, in an exemplary embodiment, a frame of reference can be the transducer 450, and one and/or both are movable relative to the transducer 450, and in other embodiments, one and/or both are not movable relative to the transducer 450 (inboard is movable but not the outboard, or vice versa). Still, with respect to some embodiments, neither are movable. While the embodiment presented in FIG. 14A depicts the inboard coupling in the outboard coupling as part of a monolithic component (as with the couplings of the prior figures), in alternate embodiments, such as the embodiment of FIG. 14B the coupling apparatus is not a monolithic component. Note also that in some embodiments of the embodiments detailed above, some of the teeth can be attached (mechanically, chemically, adhesively, weldingly, etc.) to the overall chassis, and thus even those embodiments need not necessarily be monolithic.

Figure 14D:
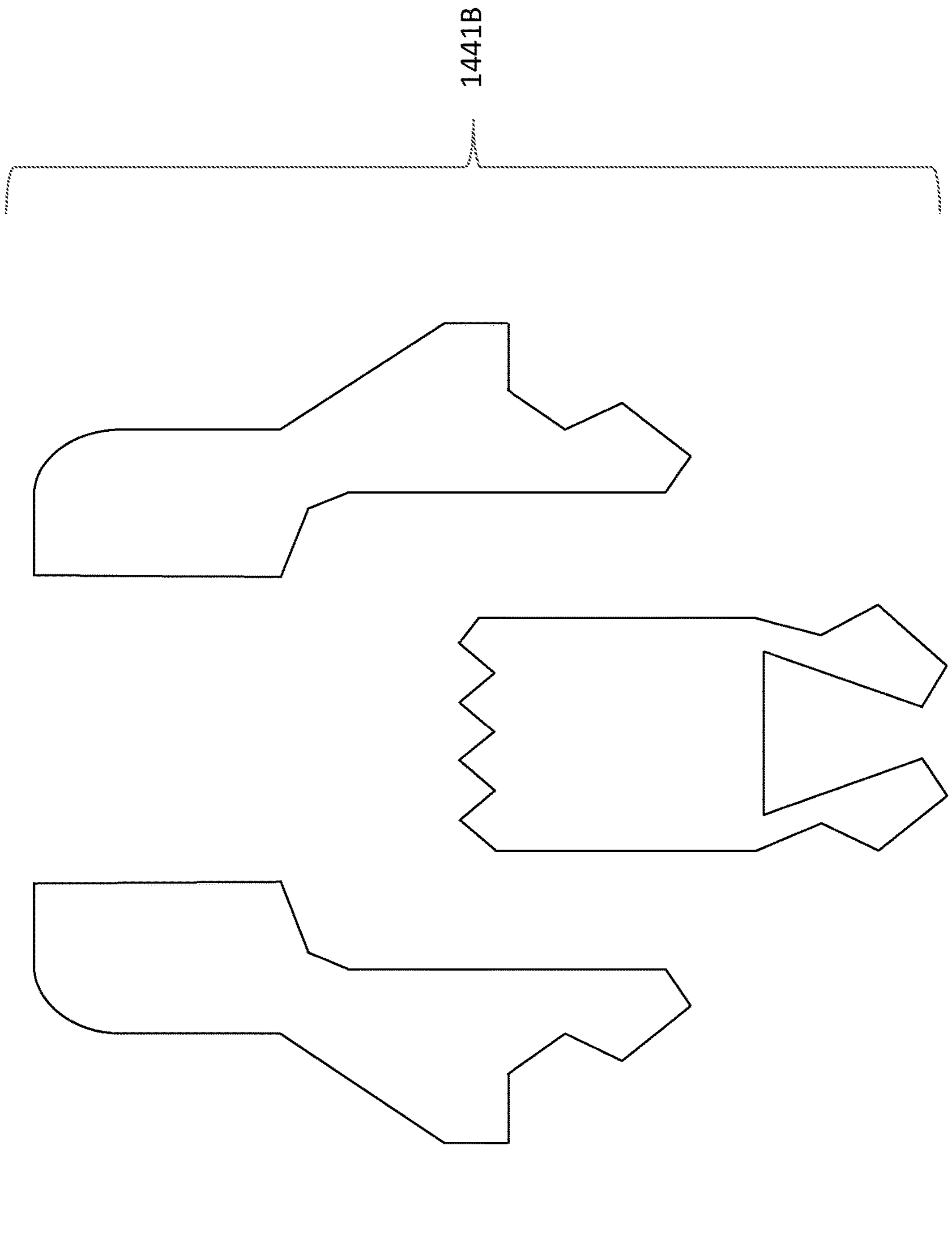

Still with reference to FIG. 14B, in an exemplary embodiment, the inboard coupling, or more accurately, the device is configured such that the inboard coupling can be moved relative to the outboard coupling. This can have utilitarian value with respect to providing clearance with respect to structure that might be present when the outboard coupling is utilized. FIG. 14C provides a schematic of an exemplary scenario where the inboard coupling has been moved upwards so that, for example, the outboard coupling can be utilized in the embodiment of FIG. 6, and thus the inboard coupling is clear of the abutment screw. FIG. 14D depicts a schematic of an exemplary scenario where the inboard coupling has been moved downward and extends beyond the lowermost locations of the outboard coupling, thus providing a configuration where, when the inboard coupling is coupled to an abutment, the upper coupling is away from that coupling, and thus does not interfere with the inboard coupling.

It is noted that while the embodiment of the inboard coupling moving relative to the outboard coupling is described in terms of a male+male coupling apparatus, it is to be understood that embodiments also include application of this feature to any of the other dual or triple or quadruple, and more, coupling embodiments detailed herein, such as by way of example only and not by way of limitation, to the female+male configuration described above, or to the male+female and to the female+female and to the male+female embodiments described herein or otherwise that would result from implementing the teachings detailed herein. It is also noted that in an exemplary embodiment, the teeth of the component that moves relative to the other component need not necessarily be inboard/outboard. Indeed, in an exemplary embodiment, such as the embodiment where the teeth that establish the configuration to snap coupled to a male mating component are interleaved about the same radial location, but angularly offset, with the teeth that establish the configuration to snap couple to a female mating component, the teeth of one or both can move relative to the other in a direction normal to the longitudinal axis of the coupling. In this regard, in an exemplary embodiment, to monolithic components can exist in a manner that is coaxial with one another, where, for example, one the components, a first component is positioned above the other component (closer to the transducer), a second component, and the second component has clearance features that permit elongated teeth or other structure of the first component to extend from above the second component to a location about where the teeth of the second component are located.

Figure 14E:
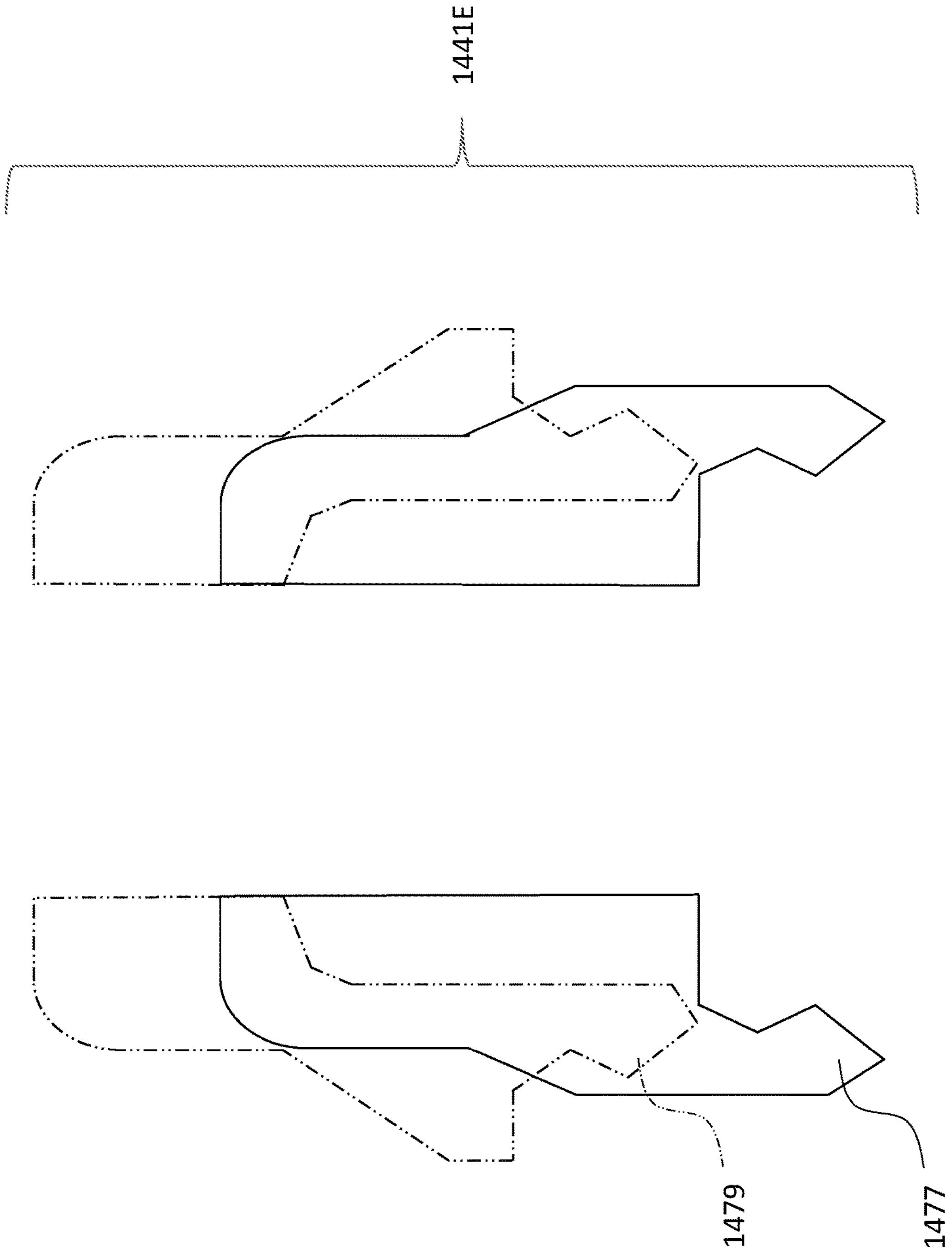
Figure 14F:
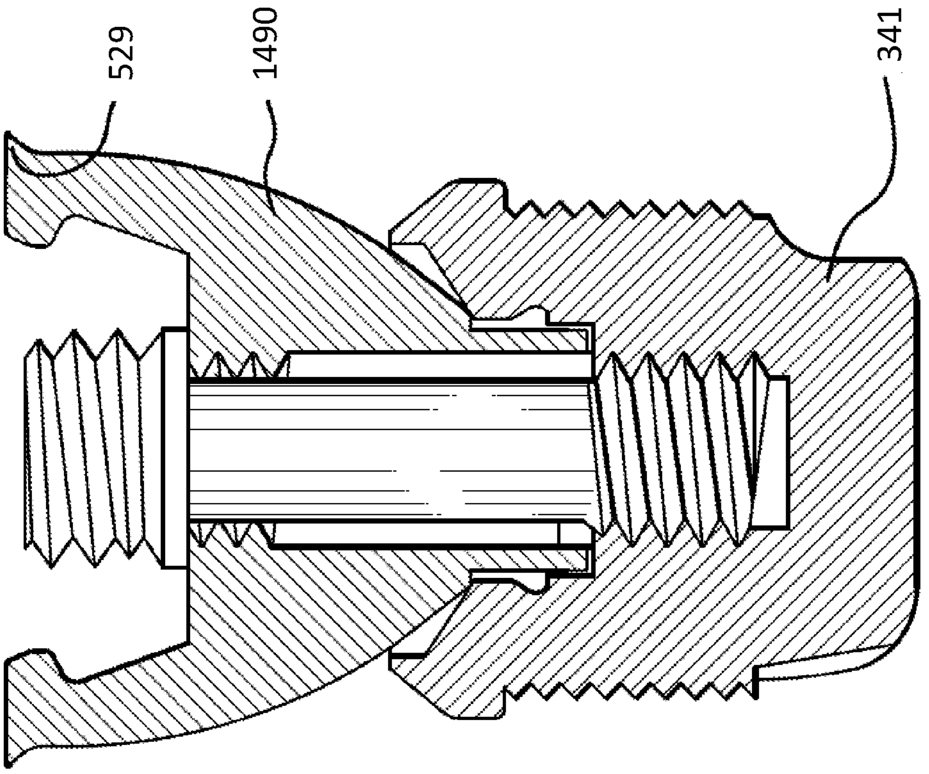
FIG. 14F depicts an exemplary embodiment of a skin penetrating apparatus.
Figure 14G:
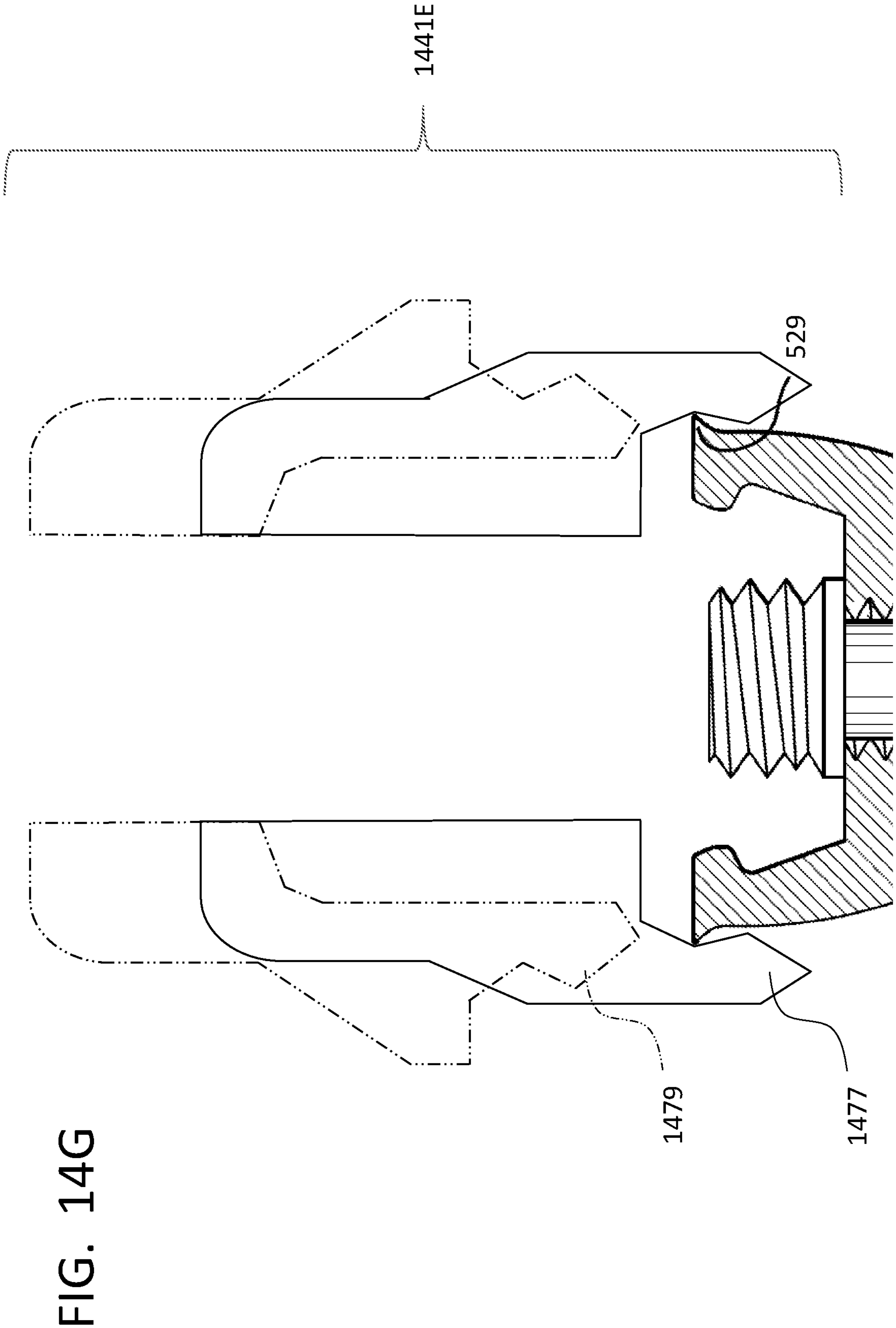
FIG. 14G depicts a coupling apparatus interfacing with a skin penetrating apparatus.
Figure 14H:
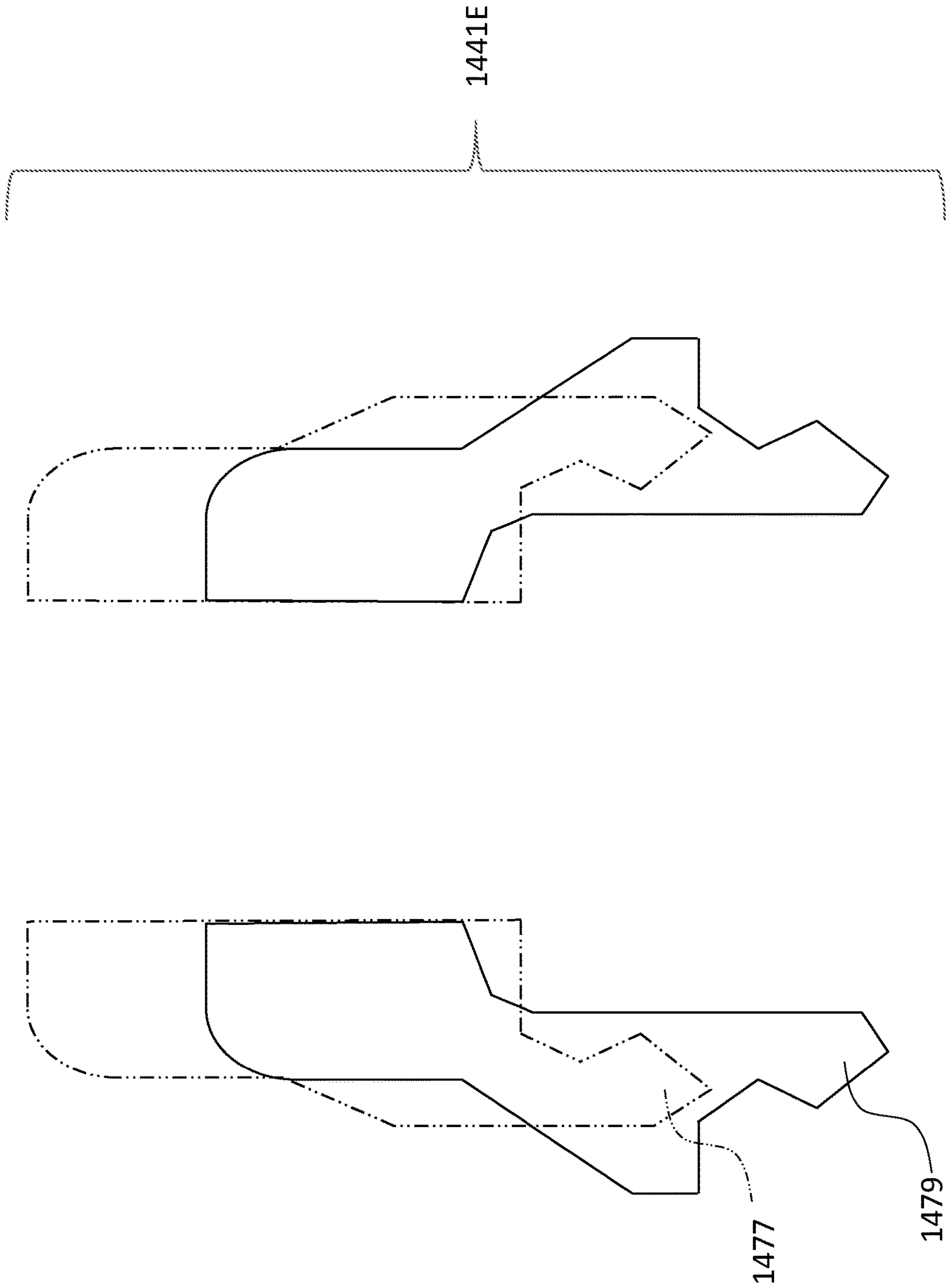
FIG. 14H depicts an exemplary embodiment of a coupling.

FIG. 14E present an exemplary schematic of an embodiment where the teeth of the male component 1479 are interleaved with the teeth of the female component 1477. The component that establishes teeth 1479 is depicted in phantom, and while shown on the same plane as the component that establishes teeth 1477, the purpose of the phantom lines is to represent the fact that teeth 1479 are interleaved with teeth 1477 about the longitudinal axis of the coupling apparatus 1441E, where the device is configured to enable the teeth 1479 to move relative to the teeth 1477/two move relative to the transducer 450 along the longitudinal axis of the coupling apparatus upwards and downwards. In an exemplary embodiment, when viewed from the above, the components establish something akin to a Union Jack, where some of the legs of the crosses support the teeth 1477 and the other legs of the crosses support the teeth 1479. Via the utilization of a coaxial arrangement somewhat analogous to how counterrotating axially aligned propellers (e.g., torpedoes) are supported, the component establishing the teeth 1479 can move relative to the component establishing the teeth 1477. Thus, in the embodiment of FIG. 14E, the component establishing the teeth 1479 is pulled away, upwards, from the teeth 1477 to enable the coupling apparatus to snap couple onto a male component, such as the abutment 1490 shown in FIG. 14F, where, in particular, the teeth 1477 snap couple onto lip 529, as seen in FIG. 14G. Conversely, in order to couple to the abutment 620 of FIG. 6, the component establishing the teeth 1479 is move downward such that the teeth 1477 are clear of the features of the abutment 620, as seen in the schematic representation of FIG. 14H.

It is noted that the movement(s) of the components can be features that are automatic and/or manual. Some embodiments can be configured with an electrically powered actuator that moves one or more of the components. This actuator can be under the control of a control system or can be actuated via the pressing of a button or the like. Still further, the movement can be a result of movement of levers of the like which are purely mechanical in their nature. In an embodiment, one or more of the components can be configured to be rotatably moved about the longitudinal axis to "unlock" that component and thus enabling component to be moved, where can then be locked again. Any device and/or system and/or apparatus and a regime that can enable movement of one of the components relative to the other and/or movement of one or both relative to the transducer that can enable the teachings detailed herein and/or variations thereof can be utilized in at least some exemplary embodiments.

Accordingly, as can be seen, in at least some exemplary embodiments of the removable components of a bone conduction apparatus, the coupling apparatus includes a first sub-apparatus that couples to the male mating component and a second sub-apparatus that couples to the female mating component. The device is configured to enable operational movement of at least one of the first sub-component relative to the second-sub component or the second sub-component relative to the first sub component to provide clearance, the clearance enabling the configuration of the coupling to the male mating component and also the configuration to the female mating component.

Figure 15:
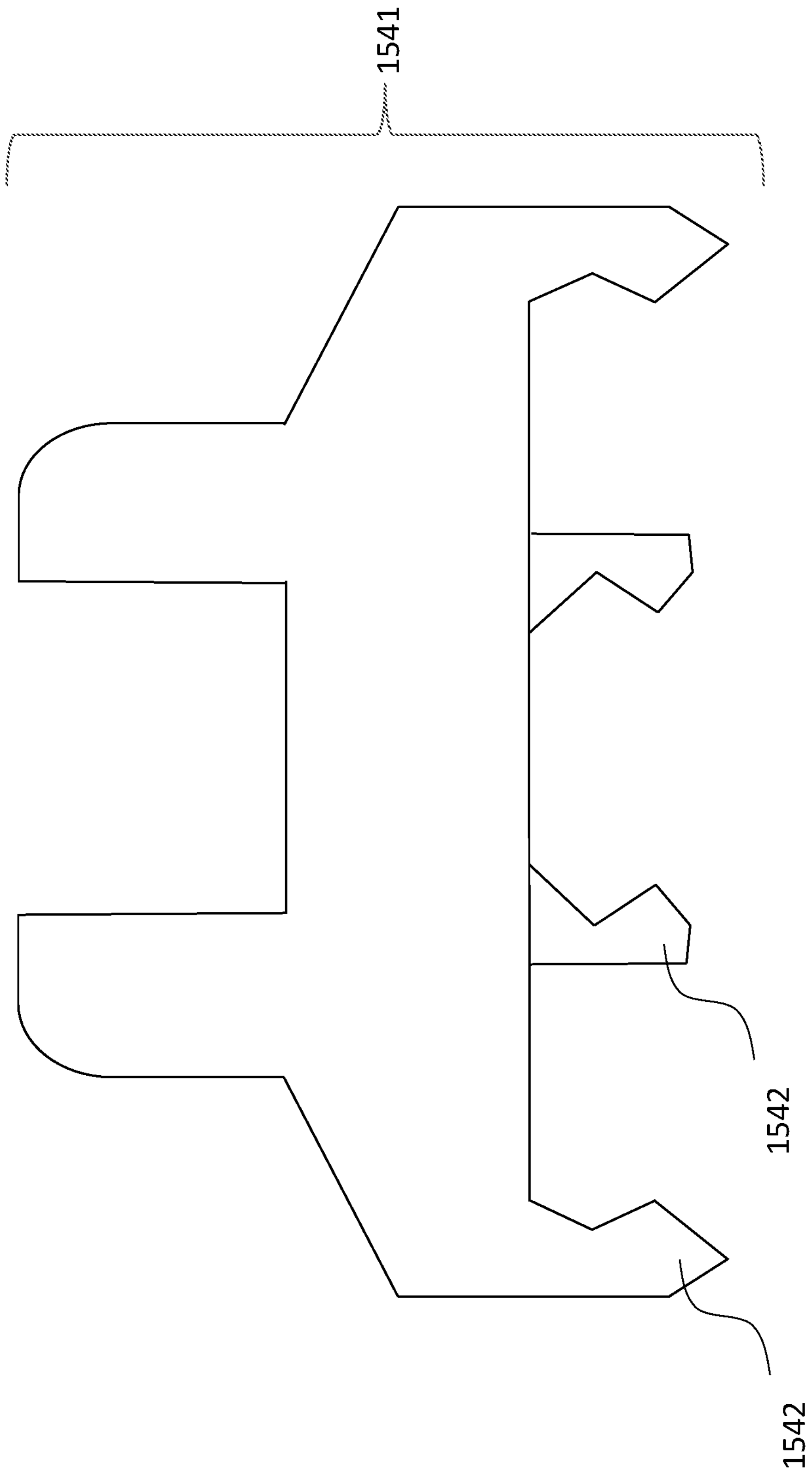
FIGS. 15 and 16 depict additional exemplary embodiments of couplings.

FIG. 15 provides an exemplary embodiment of a female+female coupling 1541, where teeth 1542 and teeth 1552 are located as seen. As can be seen, with respect to the embodiment of FIG. 15, the coupling 1541 is configured to snap coupled to the same type of mating coupling, just that the different couplings to which it is configured to snap have a substantially different size. This as opposed to the embodiment of FIG. 11, where the coupling is configured to snap couple to a different type of coupling.

As used herein, the phrase "type of mating coupling" refers to the species of a given mating coupling. For example, a male mating coupling that is configured for snap coupling is one species, and a male mating coupling that is configured for screw coupling is another species. Still further by example, a male mating coupling that is configured for snap coupling is one species, and a female mating coupling that is configured for snap coupling is another species, even though both are snap couplings. Conversely, a male mating coupling that is configured for snap coupling that has one size that is larger than the size of a male mating coupling that is also configured for snap coupling are not different types of mating coupling.

Also as used herein, the phrases "substantially different size" or, "substantially different in size," corresponds to a maximum diameter of a given mating component that interfaces with the corresponding coupling, which diameter is a diameter of a structure that provides the coupling (as opposed to, for example, the diameter at a mid-location of abutment 620, which is irrelevant to the coupling). The distinction between the sizes is not simply one of tolerancing or minor differences. It is a difference that fundamentally prevents a given coupling from attaching to two different sized mating components, at least in a manner that provides operational coupling to enable the functionality of the prostheses, such as by way of example, a coupling that enables the effective if not functionally operable/functionally utilitarian evocation of a bone conduction hearing percept.

It is briefly noted that in some instances herein, for purposes of a linguistic simplicity, the phrase "different size" will be used instead of the phrase "substantially different size." Any utilization of the phrase different size or variations thereof herein should also be considered to correspond to a disclosure of substantially different size, although it is noted that the use of the phrase different size does not always mean substantially different size.

Note also that the aforementioned "types" and "sizes" can also be used to describe the coupling as opposed to the mating component and/or in addition to the mating component. In this regard, coupling apparatus can have two different male couplings of substantially different sizes. This would mean that the sizes are such that if the two couplings are taken separately, one coupling would not be able to fit or otherwise couple onto a mating component that the other one would be able to be coupled to, at least in a manner that enables the teachings detailed herein.

Figure 16:
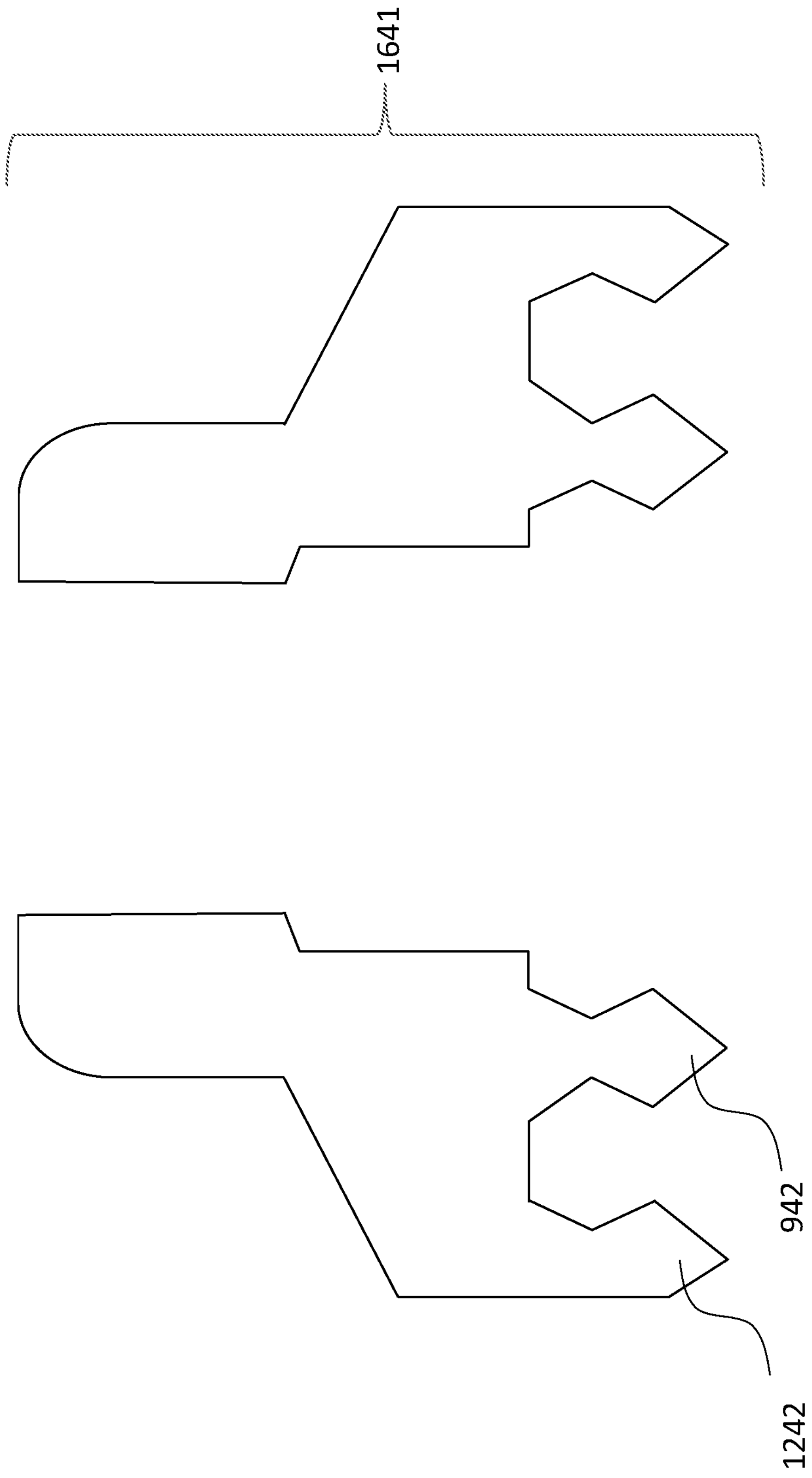
Figure 17:
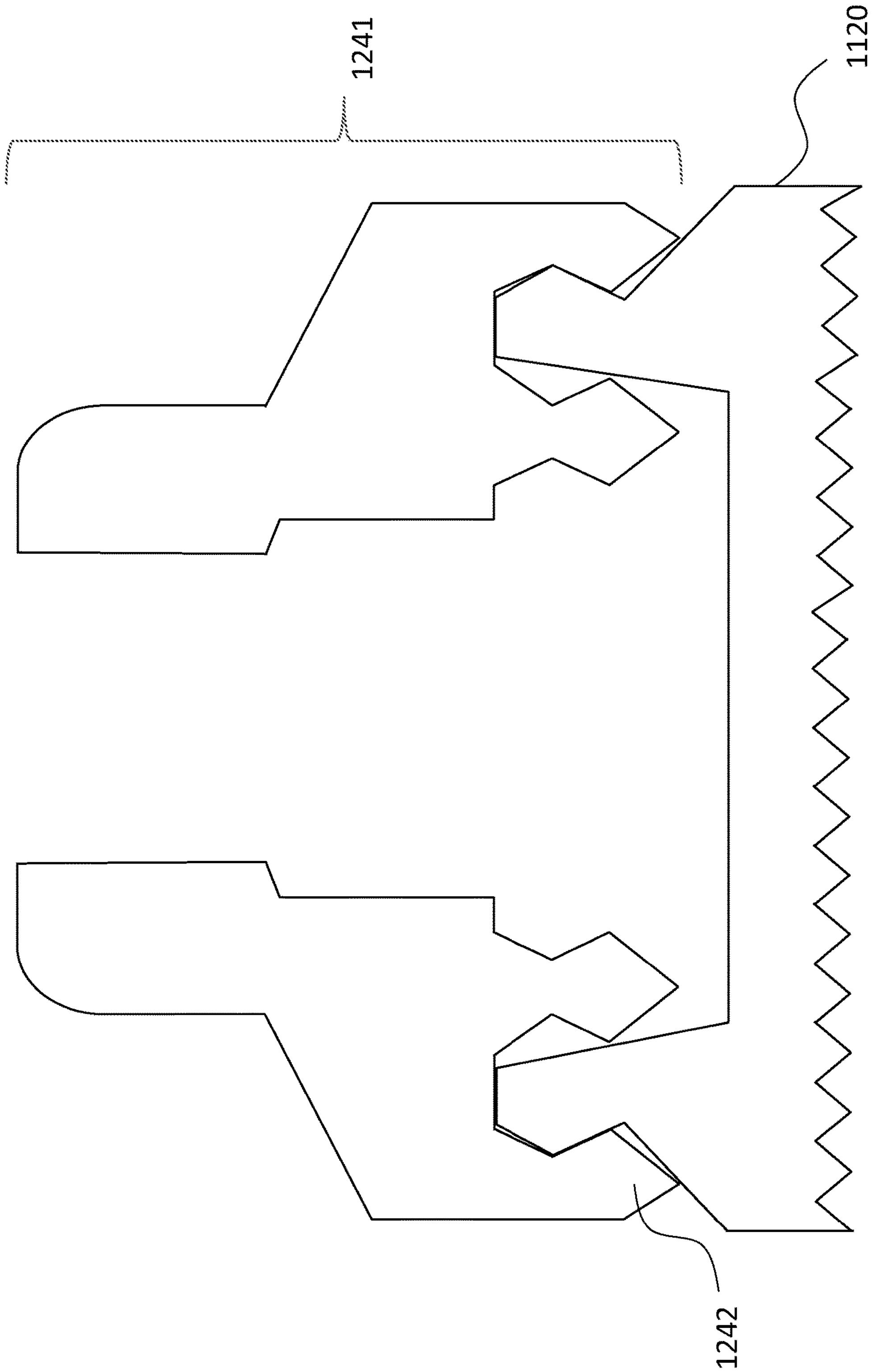
FIGS. 17 and 18 depict exemplary couplings coupled to exemplary abutments.
Figure 18:
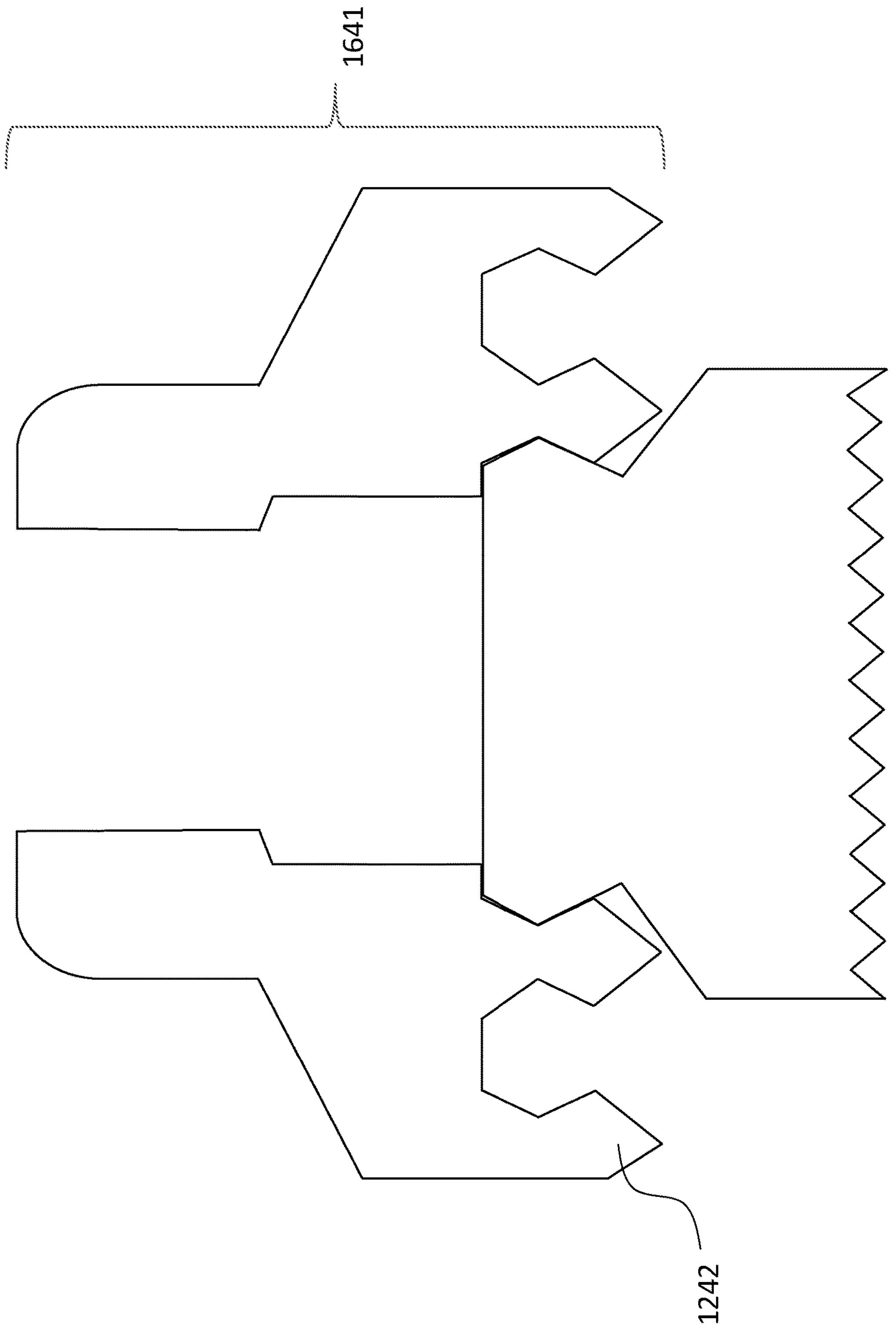

FIG. 16 provides an alternate embodiment that expands the compatibility range of the embodiment of FIG. 9. Here, as can be seen, there is an inboard set of teeth 942 which are configured to snap coupled to a female mating component and a male mating component. Also, as can be seen, there are teeth 1242 that are outboard of the teeth 942, and are configured to snap couple to a male mating component. FIG. 17 depicts how coupling 1641 couples on to the abutment 1120, in a manner analogous to how the coupling above couples to abutment 1120, where the teeth 942 are clear of the features of the abutment 1120. FIG. 18 depicts how the coupling 1641 can snap couple to the male abutment, and while not shown, coupling 1641 is configured to snap couple to the abutment 620 utilizing the opposite sides of teeth 942 relative to that utilized to snap couple in FIG. 18. The embodiment of FIG. 16 is a female+male+female coupling.

In view of the above, in an exemplary embodiment, there are some embodiments that enable coupling to mating coupling components that have maximum diameters with respect to the interfacing coupling components that are different, where the larger diameter is at least 10, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400% or more or any value or range of values therebetween in 1% increments larger than the smaller diameter. In an exemplary embodiment, the aforementioned values are measured from the same distance from the top/uppermost part of the respective mating component and/or within a distance therefrom where the larger distance is no more than 1, 2, 3, 4, 5, 6, 7, 8, 9, 10, 11, 12, 13, 14, 15, 20, 25, 30, 35, 40, 45, 50, 55, 60, 65, 70, 75, 80, 85, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400% of the smaller distance.

Figure 19:
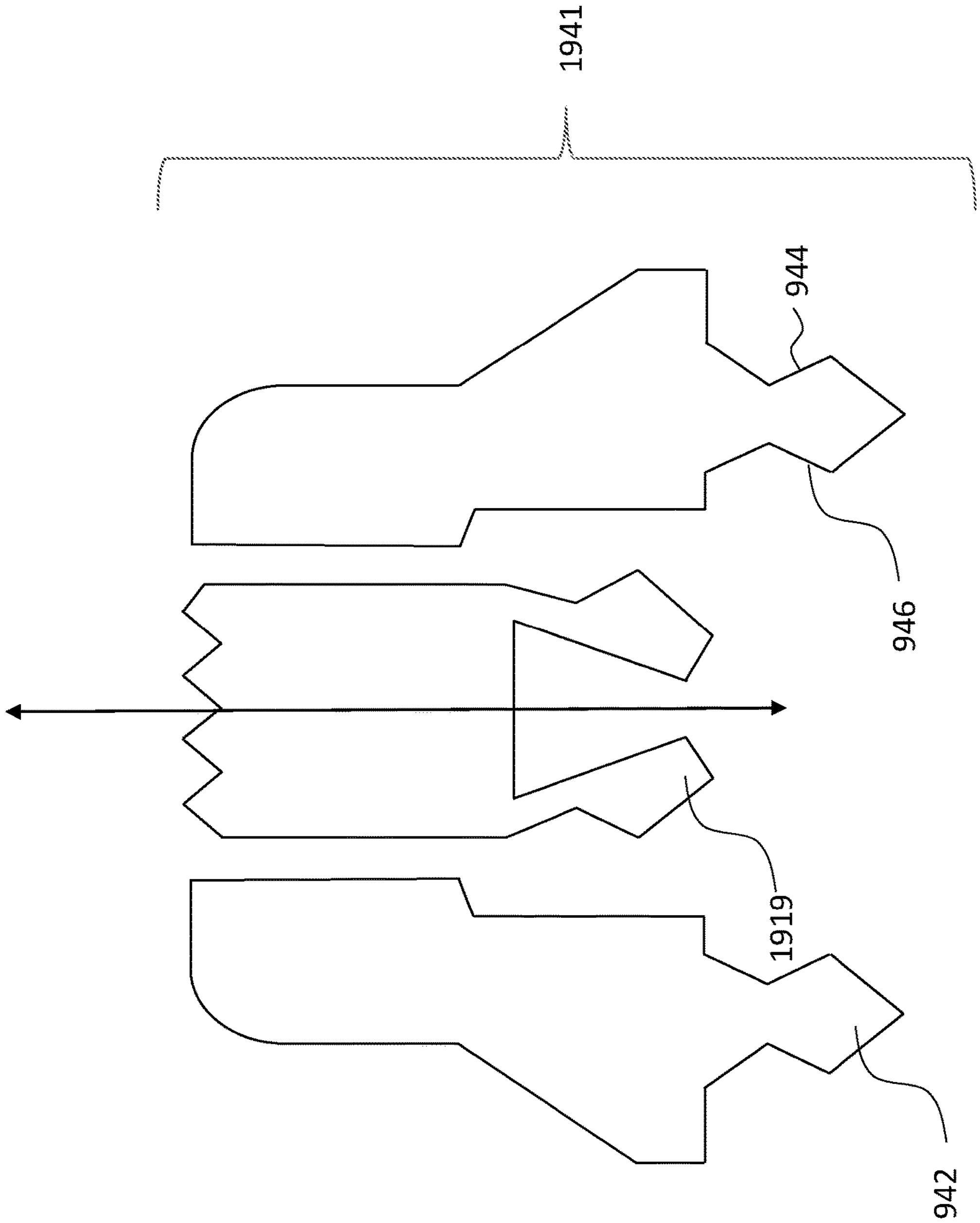
FIGS. 19 to 21 provide additional exemplary embodiments of couplings.

Thus, in an exemplary embodiment, the device is configured to couple to a second type of male mating coupling component substantially different in size from a first male mating component, and there is a second set of teeth that provide the configuration to couple to the second type of male mating coupling component. It is also noted that while the embodiments just described focus on the utilization of a configuration that enables coupling to two different size male mating coupling components, in other embodiments, there are embodiments that enable coupling to two substantially different size female mating coupling components. In this regard, FIG. 19 depicts such, where coupling apparatus 1941 includes an inboard coupling component 1919 configured to snap coupled to female mating components, and also an outboard coupling component that includes teeth 1942. Thus, this embodiment is a male+female+male coupling apparatus. As seen in this embodiment, the inboard coupling component 1919 is movable relative to the outboard coupling component/is movable relative to the transducer. (It is noted that any disclosure of a coupling component herein represents a disclosure of a coupling component that is directly or indirectly attached to the transducer unless otherwise noted.) Again, in some embodiments, it is the outboard component that move relative to the inboard component/relative to the transducer.

Figure 20:
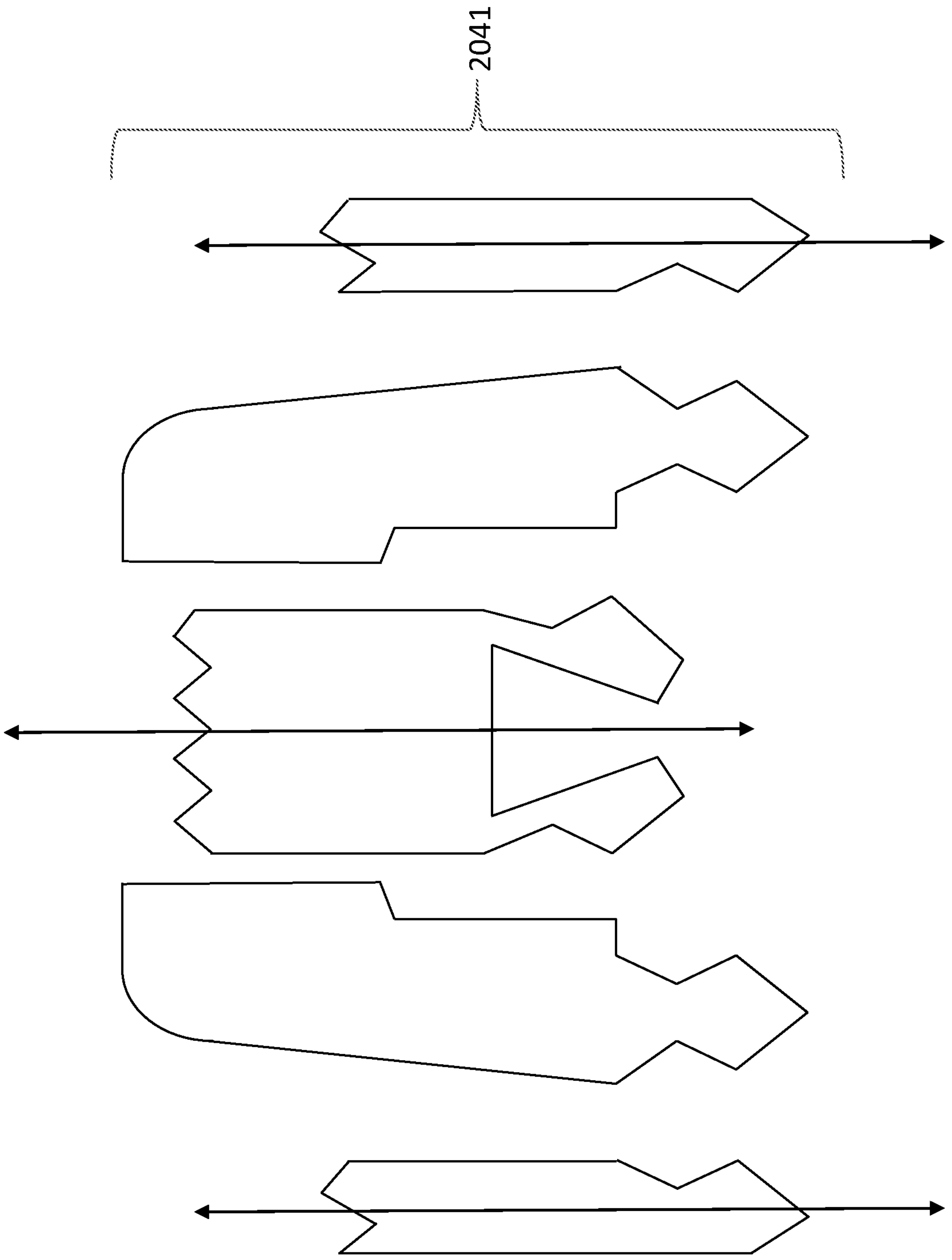

FIG. 20 presents an exemplary embodiment of a coupling apparatus 2041, that is a male+female+male+female coupling apparatus. It is noted that in the embodiment of FIG. 20, the outboard female coupling component is configured to move relative to the middle coupling component. In an exemplary embodiment, the movement of the outboard female coupling component is synchronized or otherwise in a one to one relationship with movement of the inboard male coupling component. In an alternate embodiment, the outboard coupling component is configured to move independently of the other components. In an alternate embodiment, the middle coupling component is configured to move alternatively and/or in addition to the others.

Figure 21:
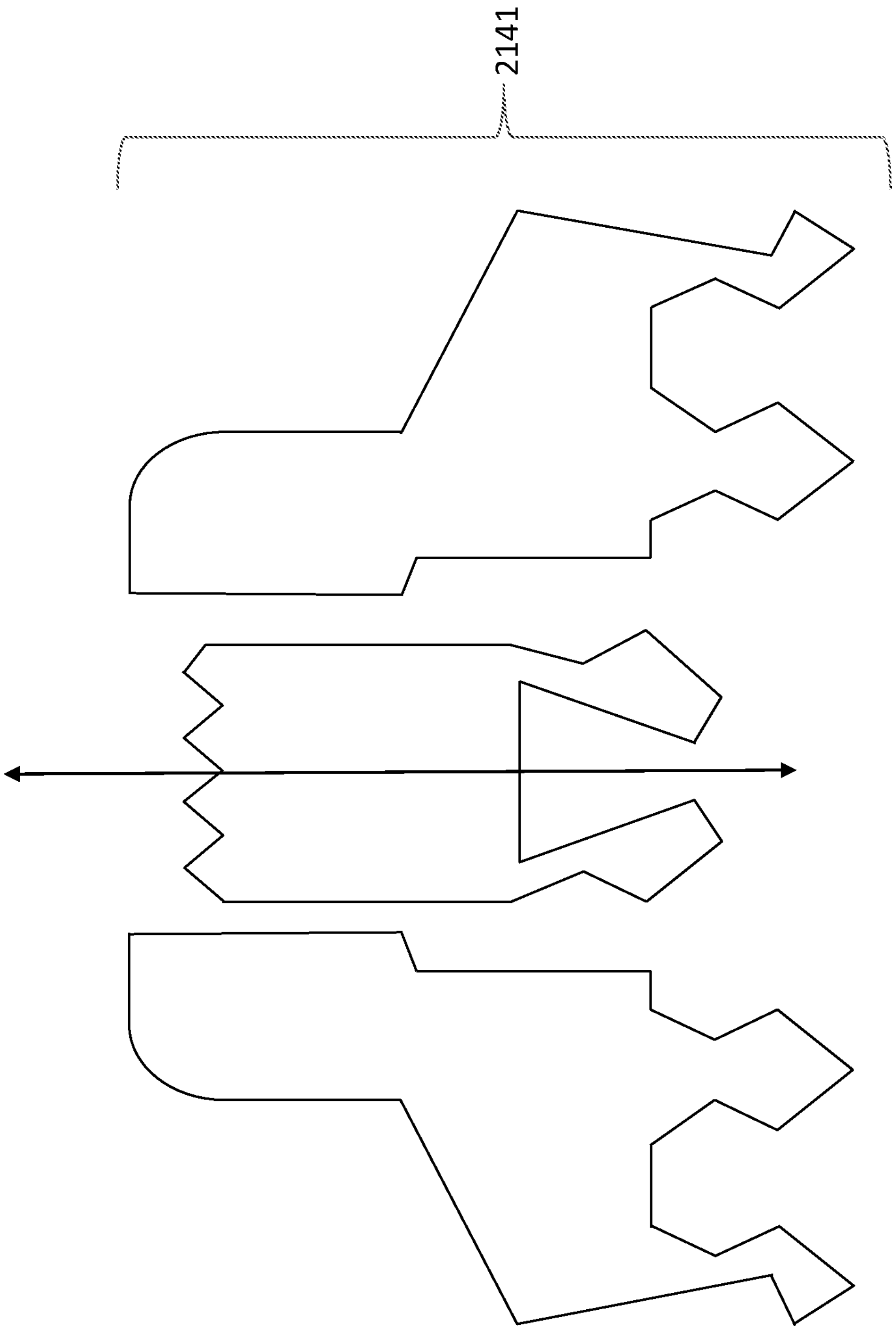

FIG. 21 presents an exemplary male+female+male+female+male coupling apparatus 2141.

In view of the above, it can be seen that in at least some exemplary embodiments, there is a device, such as a removable component of a percutaneous bone conduction device, that includes the transducer, and a coupling apparatus configured to couple to at least one of at least two different male couplings of substantially different sizes or at least two different female couplings of substantially different sizes. In some embodiments, the coupling apparatus is configured to couple to at least two different male couplings of substantially different sizes, while in other embodiments, the coupling apparatus is configured to couple to at least two different female couplings of substantially different sizes. Of course, in some embodiments, the coupling apparatus is configured to also couple to the opposite of the male and/or female couplings just detailed, one or two or more different sizes. Thus, in at least some exemplary embodiments, there is a device that includes a coupling apparatus configured to couple to two different male couplings of substantially different sizes and least one female coupling. In at least some exemplary embodiments, there is a device that includes a coupling apparatus that is configured to couple to at least two different female couplings of substantially different sizes. and to couple to at least one male coupling.

Moreover, as can be seen, in an exemplary embodiment, the coupling apparatus of the device can be configured to couple to at least two different male couplings of substantially different sizes and at least two different female couplings of substantially different sizes. Also, as can be seen, in an exemplary embodiment, the coupling apparatus of the device can be configured to at least one of at least three different male couplings of substantially different sizes or at least three different female couplings of substantially different sizes. Corollary to this is in at least some exemplary embodiments, the coupling apparatus is configured to couple to at least three different female couplings of substantially different sizes and at least one male coupling. Also, in at least some exemplary embodiments, the coupling apparatus is configured to couple to at least three different male couplings of substantially different sizes and at least one female coupling.

Thus, in at least some exemplary embodiments, the coupling apparatus is configured to couple to at least X different female couplings of substantially different sizes and at least Y male coupling. Also, in at least some exemplary embodiments, the coupling apparatus is configured to couple to at least X different male couplings of substantially different sizes and at least Y female coupling, where X can be any value or range of values of 2, 3, 4, 5 and Y can be any value or range of values of 1, 2, 3, 4, 5.

In an exemplary embodiment, again consistent with the features where the coupling components are movable in the longitudinal direction relative to one another, the device can include a coupling apparatus that includes a first sub-apparatus that couples to one of the male couplings of substantially different size and/or one of the female couplings of substantially different size. Further, in an exemplary embodiment, this coupling apparatus includes a second sub-apparatus that couples to another of the male couplings of substantially different size and/or another of the female couplings of substantially different size. Also, the device is configured to enable operational movement of at least one of the first sub-component relative to the second-sub component or the second sub-component relative to the first sub component to provide clearance, the clearance enabling the configuration of the coupling to the at least one of at least two different male couplings of substantially different sizes, or at least two different female couplings of substantially different sizes.

Figure 22:
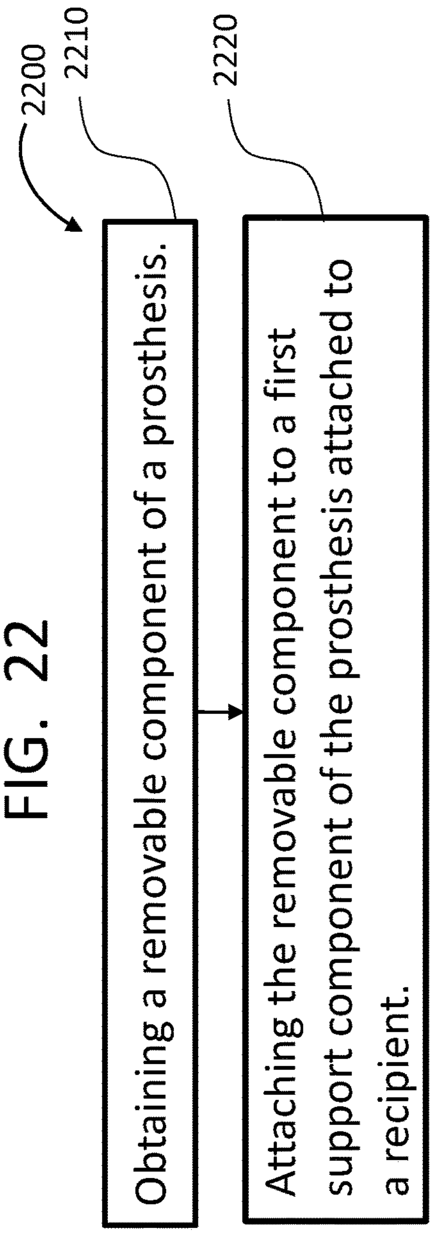
FIGS. 22 and 23 provide exemplary algorithms for exemplary methods.

FIG. 22 presents an exemplary algorithm for an exemplary method, method 2200, which includes method action 2210, which includes the action obtaining a removable component of a prosthesis. In an exemplary embodiment, the obtained removable component of the prosthesis can correspond to the external component of the percutaneous bone conduction device detailed above. That said, in some alternate embodiments, it can be another type of component of the prostheses. Method 2200 also includes method action 2220, which includes the action of attaching the removable component to a first support component of the prosthesis attached to a recipient. In this exemplary embodiment of this method, during the action of attaching (method 2220), the removable component is in a configuration such that it is readily attachable to a different type and/or different size support component than the first support component if removed therefrom.

Figure 23:
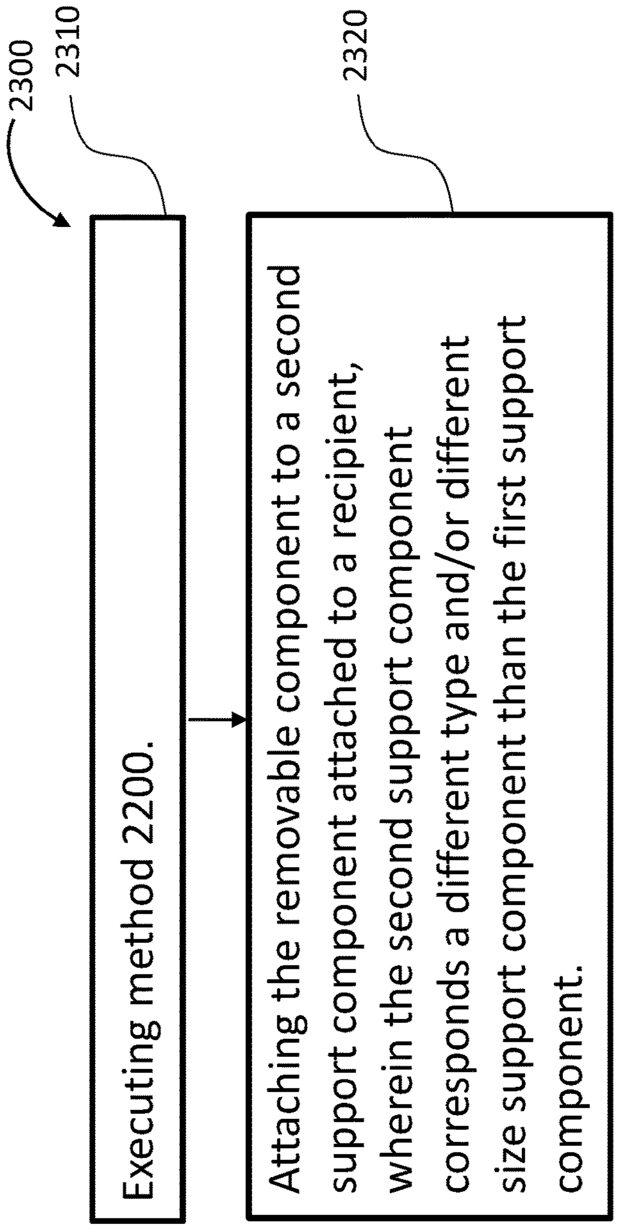

In an exemplary embodiment, there is another exemplary method, method 2300, as represented by algorithm 2300 represented by FIG. 23, which includes action 2310, which includes executing method 2200. Method 2300 also includes method action 2320, which includes attaching the removable component to a second support component attached to a recipient, wherein the second support component corresponds a different type and/or substantially different size support component than the first support component.

In an exemplary embodiment of method 2300, the action of attaching the removable component to the first support component is executed without an adapter to interface between the removable component and the first support component, and the action of attaching the removable component to the second support component is executed without an adapter to interface between the removable component and the second support component.

In this regard, it is specifically noted that the couplings herein are not adapters. Adapters as used in the art are devices that enable the coupling of two incompatible components with each other, where in the absence of the adapter, the coupling would not be achievable. By way of example only and not by way of limitation, US patent application publication No. 2016/02491403 to Dr. Marcus Andersson, discloses a remarkable and ingenious adapter. At least some exemplary embodiments specifically exclude some and/or all of the teachings of that publication. In this regard, as different from the adapter, the couplings detailed herein are components that are part of the removable component of the percutaneous bone conduction device. In this regard, when the removable component is operationally removed, such as by the recipient gripping the housing of the removable component and pulling the removable component away from the skin penetrating component, the coupling comes with the removable component. Conversely, many if not all of the embodiments of the aforementioned patent application publication are such that the adapter stays with the skin penetrating component when the removable component is removed therefrom.

Put another way, the couplings detailed herein are couplings that are designed to, for all intents and purposes, be permanently attached, directly or indirectly, to the transducer. Granted, embodiments include retrofitting or otherwise replacing couplings, but this is no different or otherwise substantially no different than that which would result in replacing a broken coupling with a new coupling.

Accordingly, at least some exemplary embodiments include couplings that are non-adapter couplings. Further, at least some exemplary embodiments include skin penetrating apparatuses that include only 1, 2, 3, 4, and/or 5 components, to which a removable bone conduction device including only one coupling and/or coupling apparatus is coupled. Thus, at least some exemplary embodiments include a device where, when the removable component is operationally removed, the skin penetrating apparatus that is left includes only 1, 2, 3, 4, and/or 5 components. In at least some exemplary embodiments, the skin penetrating apparatus is an apparatus that comprises only a bone fixture, and abutment, and an abutment screw.

In an exemplary embodiment of method 2200, the removable component was previously attached to a second support component attached to the recipient, and the first support component has a maximum outer diameter that is substantially greater than that of the second support component. In this regard, in an exemplary embodiment, there can be value with respect to removing an abutment according to abutment 620 detailed above, and replacing such with an abutment such as that according to abutment 820 detailed above, which as a smaller maximum outer diameter, at least with respect to that which is located at the middle and upper regions of the surface of the skin and outside the skin. This provides for a smaller hole through the skin and thus a reduced circumference with respect to bacteria intrusion around the abutment, and also provides for a reduction in the noticeability of the abutment, at least relative to that which is the case with respect to the larger abutment 620. In this regard, the recipient can have a minor surgery to utilize this new, smaller abutment. Because embodiments of the external component have the coupling apparatus that can be coupled to the different sized abutments, the same external component can be utilized with respect to both abutments. This can have utilitarian value with respect to not having to reprogram or otherwise refit (in the hearing prosthesis sense vis-à-vis tonatopical mapping) the external component/remap the sound processor of the external component to the individual sound perception capabilities of the recipient relative to other recipients. Also, it permits the recipient to obtain a new abutment without undergoing the expense of having to obtain a new external component, the latter being relatively more expensive than the former.

In an exemplary embodiment of method 2200, the action of attaching is executed such that the removable component couples to the first support component in a male-female relationship, wherein the removable component has the male component, and during the action of attaching, the removable component is in a configuration such that it is readily attachable, if removed from the first support component, to a second support component in a female-male relationship, where the removable component has the female component. In an exemplary embodiment of method 2200, the action of attaching is executed such that the removable component couples to the first support component in a male-female relationship, wherein the removable component has the female component, and during the action of attaching, the removable component is in a configuration such that it is readily attachable, if removed from the first support component, to a second support component in a female-male relationship, where the removable component has the male component.

At least some exemplary embodiments include methods that relate to retrofitting existing removable components of percutaneous bone conduction devices. In this regard, in an exemplary embodiment, at time zero, there exists removable components of percutaneous bone conduction devices with couplings that are configured along the lines of that detailed in figure and FIGS. 6 and 7 detailed above. In general, these couplings are configured to only interface with one type and one size mating component. At a time subsequent to time zero, a determination is made that there can be utilitarian value with respect to having a coupling that has expanded functionality than that of the existing coupling. Thus, parties impacted by this decision or otherwise associated there with obtain a new coupling that has expanded functionality. By way of example only and not by way of limitation, in an exemplary embodiment, a coupling such as coupling 941 is obtained. Coupling 941, as detailed above, is configured to snap couple to mating components of different types and different sizes.

In an exemplary embodiment, the existing coupling is removed according to any of the teachings detailed herein or according to any other removal techniques that can enable such removal, and replaced with the new coupling 941. While some embodiments utilize the sleeve 544 apparatus to positively retain the coupling 541 to the rest of the external component of the percutaneous bone conduction device, some embodiments include removing the sleeve 544 and replacing the sleeve with a body that does not include element 552 and the body portion thereof. By way of example only and not by way of limitation, the replacement body could instead only include element 5460 and 545, which will be sufficient to positively retain the new coupling 941.

Alas, some embodiments of the coupling do not include the through hole/through bore. Accordingly, other types of positive retention can be utilized, such as by way of example only and not by way of limitation, a roll pin inserted through a lateral hole in the coupling and in extension 459, which pin is normal to the longitudinal axis of the coupling and the external component. Again, in other embodiments, a threaded system can be utilized, which may not necessarily positively retain the coupling. Thread locking compound or the like can be utilized. Any device, system, and/or method that can enable a retrofit of an old coupling to a new coupling to enable the teachings detailed herein can be utilized in at least some exemplary embodiments.

Thus, in an exemplary embodiment of method 2200 or method 2300, prior to the attaching action, there is an action of removing a coupling apparatus from the removable component and attaching a new coupling apparatus of a different type from the removed coupling apparatus, wherein the removed coupling apparatus was configured to only attach to a support component of one type and one size, and the new coupling is the coupling that is used to attach the removable component to the first component.

Thus, in an exemplary embodiment of this exemplary method, a previously limited use external component of a bone conduction device can be expanded to have functionality beyond that limited use.

In an exemplary embodiment of method 2200 or method 2300, the first support component is a percutaneous bone conduction implant comprising an abutment and a bone fixture screwed into bone of the recipient, the abutment is rigidly secured to the bone fixture via an abutment screw having an abutment screw head. Also, the action of attaching the removable component to the first support component comprises snap coupling the removable component directly to the abutment screw head of the percutaneous bone conduction implant.

Figure 24:
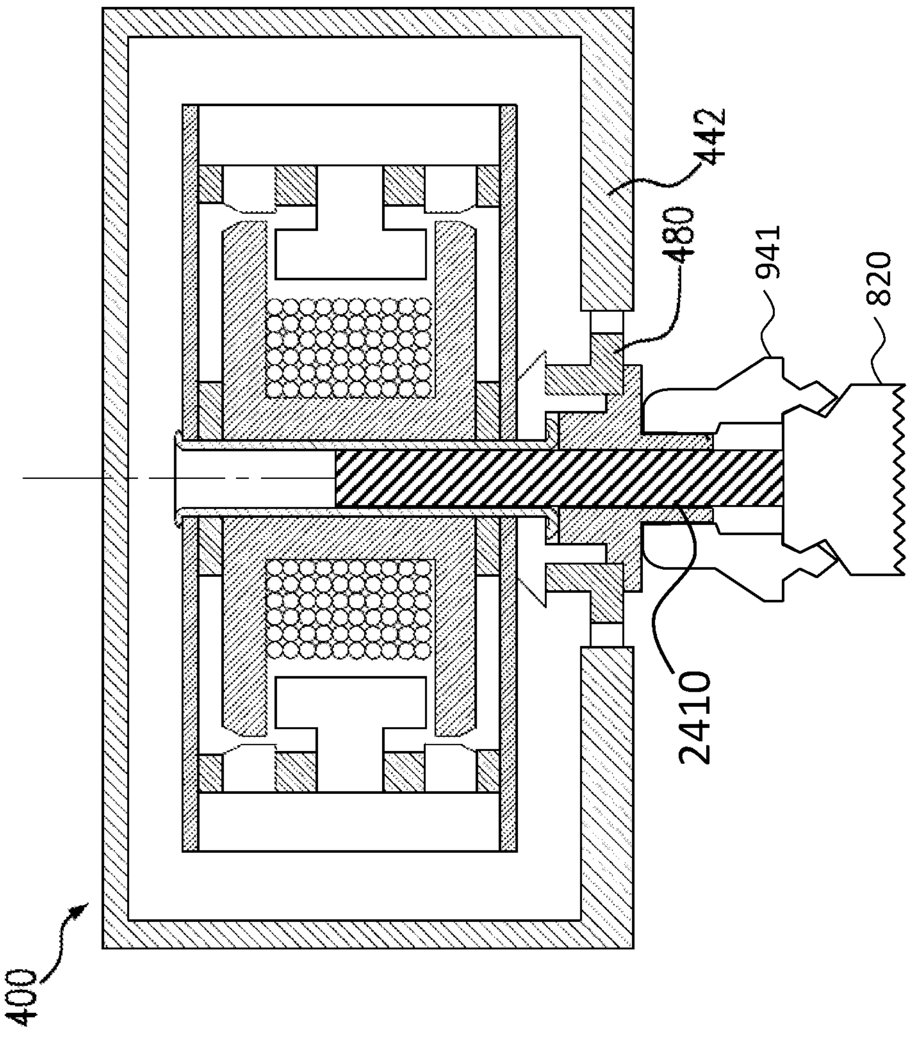
FIGS. 24-32 provide arrangements that conduct vibrations via metallic structures.

FIG. 24 depicts an exemplary embodiment of another configuration of a percutaneous bone conduction device that includes an additional vibrationally conductive structure 2410 that conducts vibrations from the transducer directly to the abutment 820. Here, the vibrationally conductive structure is in the form of a cylindrical rod that is interference fitted inside the bobbin of the transducer. In an alternative embodiment, the vibrationally conductive structure can have a tapered and/or a stepped outer body so that the structure can extend through more narrow bores of the coupling and/or the components supporting the coupling to the transducer (e.g., the structure can have a larger outer diameter so that it interference fits in the bore of the bobbin, and a smaller outer diameter at more distal locations so that it can fit through a smaller hole through the connector, etc.

The idea is that the structure enables direct connection/direct contact between the vibrationally conductive structure and the abutment and/or other components of the implanted component, such as the abutment screw, etc. In at least some exemplary embodiments, the vibrationally conductive structure is directly and rigidly coupled to the transducer. In at least some exemplary embodiments, the spring force of the plastic snap coupling 941 or whatever coupling that is utilized holds the vibrationally conductive structure into contact with the implantable component. In alternative embodiments, alternatively and/or in addition to this, a connector can be utilized to connect the vibrationally conductive structure to the implant, such as by way of example only and not by way of limitation, a detent feature of the structure that interfaces with, for example, the hex head of the abutment screw and/or a female threaded structure that threads on to the outer screw thread of the head of the abutment screw (discussed further below). In some embodiments, permanent magnets can be utilized to create a magnetic attraction between the vibrationally conductive structure 2410 and the implantable component.

In view of the above, in an exemplary embodiment, there is a device, such as the removable component of the percutaneous bone conduction device, that includes a non-metallic connector apparatus configured to removably connect the removable component to a recipient skin penetrating apparatus. In an exemplary embodiment, this can correspond to the coupling 541 detailed above, or the coupling 941 detailed above, or any of the other couplings detailed herein providing that such can enable the teachings detailed herein or any other type of coupling. In at least some of these embodiments, the coupling is made of a plastic material, as detailed above. Further, in an exemplary embodiment, the removable component of the bone conduction device also includes a metallic structure that is in direct contact with the skin penetrating apparatus when coupled to the skin penetrating apparatus for bone conduction. That is, the metallic structure actually touches the skin penetrating apparatus, as there is no structural element between the metallic structure and the skin penetrating apparatus (e.g., paint or a plating may be present, but no non-metallic structure is present between the metallic structure and the part of the skin penetrating apparatus that the metallic structure directly contacts).

Consistent with the teachings detailed above, the removable component includes a transducer configured to output vibrations when activated, and the metallic structure is rigidly connected to the transducer.

Figure 25:
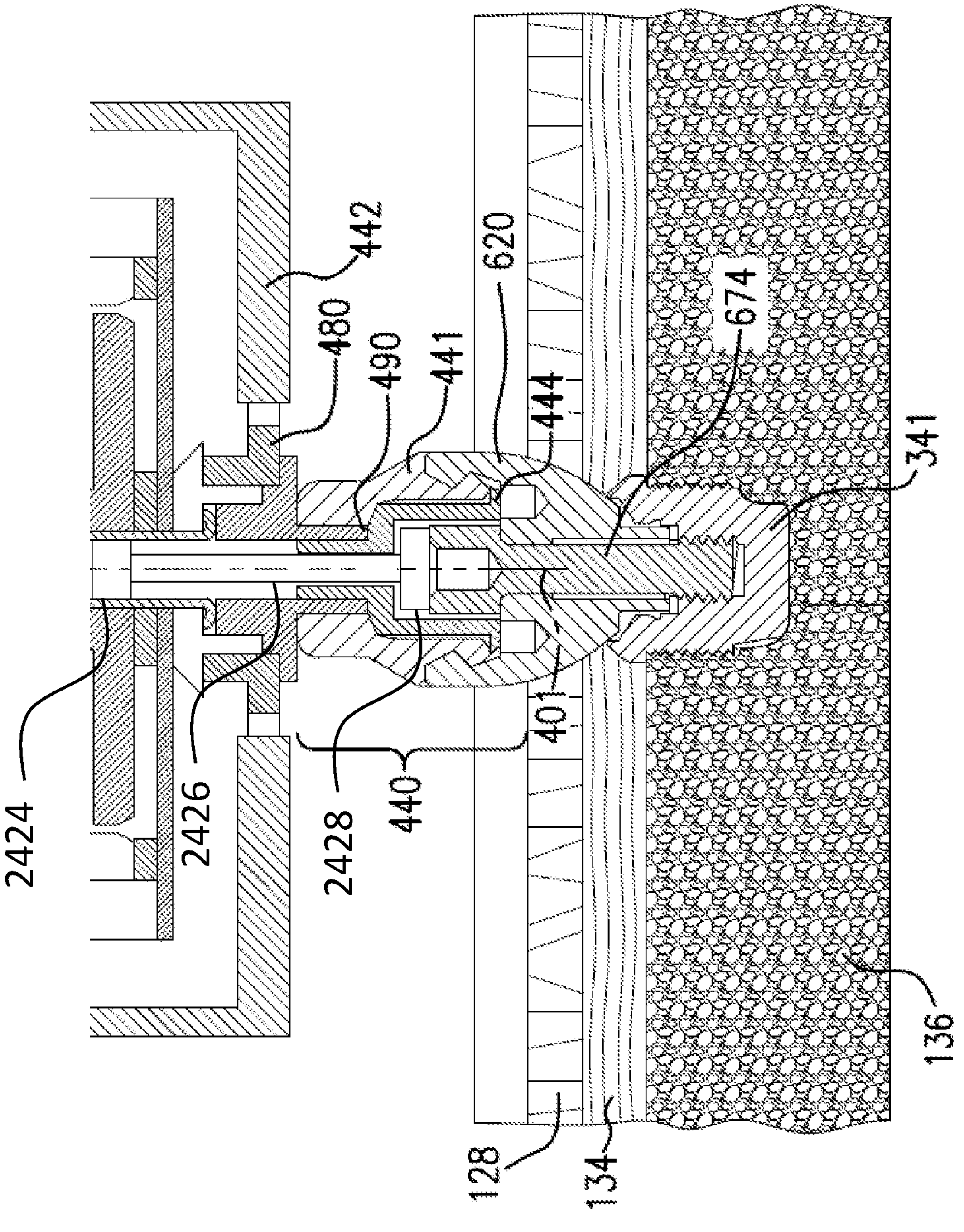

FIG. 25 depicts another exemplary embodiment of a metallic structure made up of three separate component parts —2424, 2426, and 2428. Element 2424 is a cylindrical body that is interference fitted into/inside the bobbin. Element 2426 is a shaft that extends from element 24242 element 2428. Element 2428 is a body that can be circular in outer circumference when measured about the longitudinal axis of the removable component and is configured to directly abut the abutment screw 674 that holds the abutment 620 to the bone fixture when the external component of the removable bone conduction device is attached to the abutment for purposes of bone conduction evoking hearing percepts, as can be seen. In an exemplary embodiment, the three elements are separate components that are connected together mechanically and/or in a welded manner, etc. In an alternative embodiment, the collection of the three elements is in fact a monolithic component made from a single piece of metal or the like, turned on a lathe, etc. Any device, system, and/or method of making the metallic structure can be utilized in at least some exemplary embodiments.

Still, in the embodiment shown in FIG. 25, the three separate elements are separate elements that are screwed together so that the assembly of the removable component of the bone conduction device can be put together. Element 2424 would be put in the assembly first, and then the other components could be put together, and then element 2426 could be screwed into element 2424, where element 2428 could be already attached to element 2426 (a hex socket can be located at the bottom of 2428).

As seen in the embodiment of FIG. 25, element 2426, which is a metallic structure, directly contacts the abutment screw. In an exemplary embodiment, as noted above, the spring force of the coupling 441 urge is the metallic structure on to the upper face of the screw so that there is a downward force applied by the removable component on to the metallic structure and thus on to the screw so as to maintain direct contact of the metallic structure to the screw during operation of the removable component to evoke a bone-conduction hearing percept.

Figure 26:
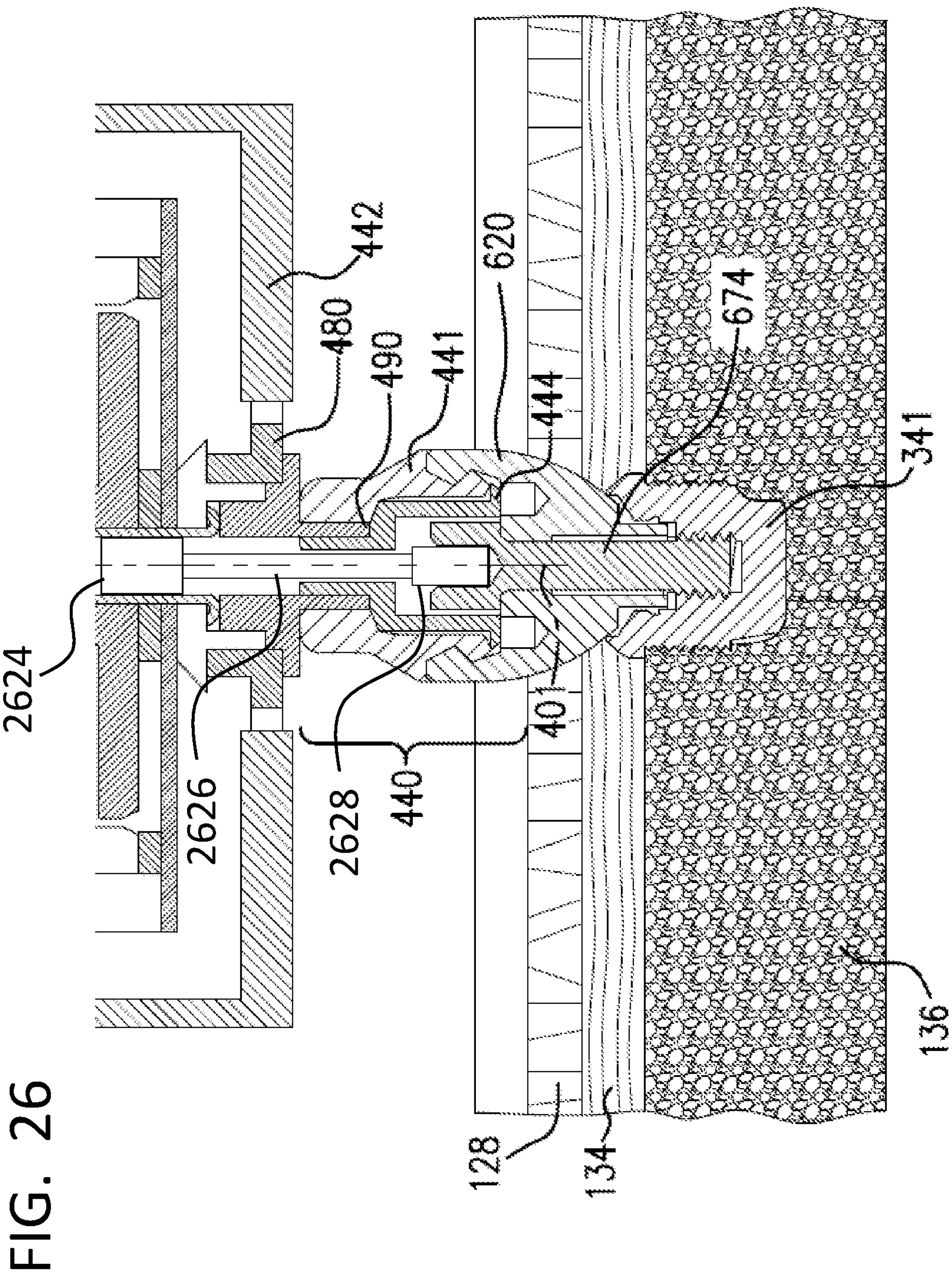

FIG. 26 presents an alternative embodiment of the metallic structure. As with the embodiment detailed above with respect to FIG. 25, the metallic structure of FIG. 26 is established by three elements—elements 2624, 2626 and 2628. Here, element 2624 and element 2626 are the same relatively similar to the elements detailed above. Element 2628 is configured to fit into the receptacle of the abutment screw 674, as can be seen. In an exemplary embodiment, element 2628 has a hexagon all configuration that matches the female hex receptacle of the screw 674. In another embodiment, the outer circumference is circular. It is briefly noted that in at least some exemplary embodiments, the outer surface/the configurations of the metallic structure are circular/cylindrical structures. Conversely, in some other embodiments, the outer surfaces can have different shapes. By way of example only and not by way of limitation, element 2626 or element 2526 could have a square cross-section or an oval cross-section, etc. Any shape that will enable the teachings detailed herein can be utilized in at least some exemplary embodiments.

Still with reference to FIG. 26, in an exemplary embodiment, element 2628 is a solid cylindrical structure made of steel and/or titanium (any or all of the components of the metallic structures can be made of steel and/or titanium and/or any other metal that can enable the teachings detailed herein) that is sized to have a very very slight interference fit and/or a slip fit with the inside of the hex receptacle of the screw 674. That said, in an alternate embodiment, the element 2628 can be an eccentric body such that no single part of the element truly interferes with the hex head receptacle, but because of the off-center nature of the element 2628 with location along the longitudinal axis, contact is maintained between the sidewalls of the element 2628 and the inside of the hex receptacle. Note also that in at least some exemplary embodiments, owing to the spring force as detailed above, the bottom of element 2628 is pushed into contact with the bottom of the hex receptacle of the screw 674.

Figure 27:
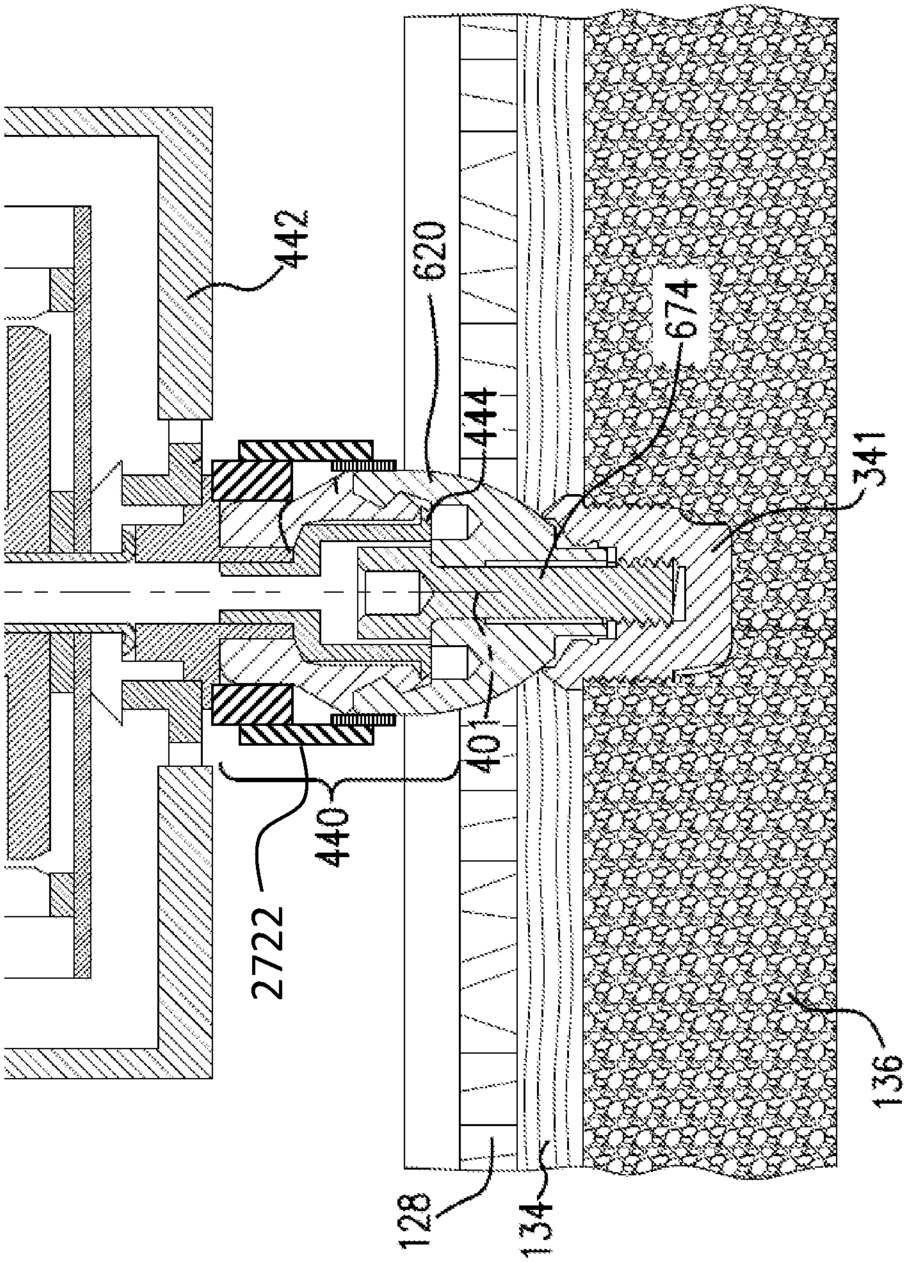

FIG. 27 provides another exemplary embodiment of a metallic structure that can have utilitarian value with respect to the teachings detailed herein. As seen, structure 2722, cross-sections of which are seen in FIG. 27, comprises three separate bands (hoop like structures) that extend about the structure of the coupling assembly of the removable component of the hearing prostheses. As seen, there is an upper band that is in direct contact with the top of the coupling 441 as well as in contact with some of the other structure supporting the coupling 441. There is a central band that extends downward from the upper band to a third, lower band. This third lower band is configured to slip fit and/or slightly interference fit with the outer diameter of the abutment 620. Thus, there is metal to metal contact with respect to the metallic structure and the abutment 620 when the external component is attached to the abutment for bone conduction evoking hearing percepts.

While the embodiment of the metallic structure depicted in FIG. 27 is depicted as three separate components (which can be interference fitted together and/or welded or glued or mechanically held together, etc.), in some other embodiments, the italic structure 2722 is a single monolithic body which is turned on a lathe or otherwise cast a single component.

In the embodiments of FIGS. 24-27, the metallic structure is rigidly connected to the transducer, albeit, with respect to the embodiment of FIG. 27, this rigid connection is established indirectly, whereas the embodiments of FIGS. 24, 25, and 26 establish such directly with the transducer.

Still with reference to FIGS. 25-27, in at least some exemplary embodiments, the metallic structure is configured to at least one of enter a boundary of the skin penetrating apparatus or envelop a portion of the skin penetrating apparatus. Conversely, in at least some exemplary embodiments, the metallic structure is configured to not enter a boundary of the skin penetrating apparatus and/or envelop a portion of the skin penetrating apparatus.

With respect to the embodiments of FIGS. 24-26, the metallic structure has been depicted as something that is located at the longitudinal axis of the coupling. It is noted that in an alternative embodiment, the metallic structure can alternatively and/or in addition to this branch out so as to extend laterally away from the centerline. In this exemplary embodiment, such can have utilitarian value with respect to having the metallic structure contact the upper surface of the abutment/the topmost surface of the abutment—which surface directly faces and is directly opposite the transducer. By way of example only and not by way of limitation, the coupling 441 can have passageways through the outer portions thereof through which the metallic structure extends to reach the abutment. As detailed in the embodiment just described, in an exemplary embodiment, the metallic structure reaches the top upper surface of the abutment so that it directly contacts that surface. Alternatively, and/or in addition to this, the metallic structure can extend downwards into the body of the abutment. Indeed, in an exemplary embodiment, the metallic structure can be located in between the teeth of the coupling. The metallic structure can be configured to slip fit or slightly, ever so slightly, interference fit with the inside of the female receptacle of the abutment 620. The metallic structure can be configured so as to not interfere with the resilient nature and movement of the teeth so as to not interfere with the snap coupling and uncoupling. Indeed, in an exemplary embodiment, the metallic structure can be utilized as a substitute for the sleeve, which can prevent the side of the abutment from extending between the teeth.

Moreover, in an exemplary embodiment, the coupling 441 or any other coupling can be a coupling that is cast around a metallic component, where the metallic component almost forms a chassis for the plastic material of the coupling 441. By way of example only and not by way of limitation, a metallic skeleton that includes pseudo-teeth at the bottom (teeth like structure that are meant to contact the inside of the abutment but not grip the abutment, as opposed to the plastic teeth of the coupling 441) conform the chassis and plastic can be molded there are about to establish the resilient teeth of the coupling.

Figure 28:
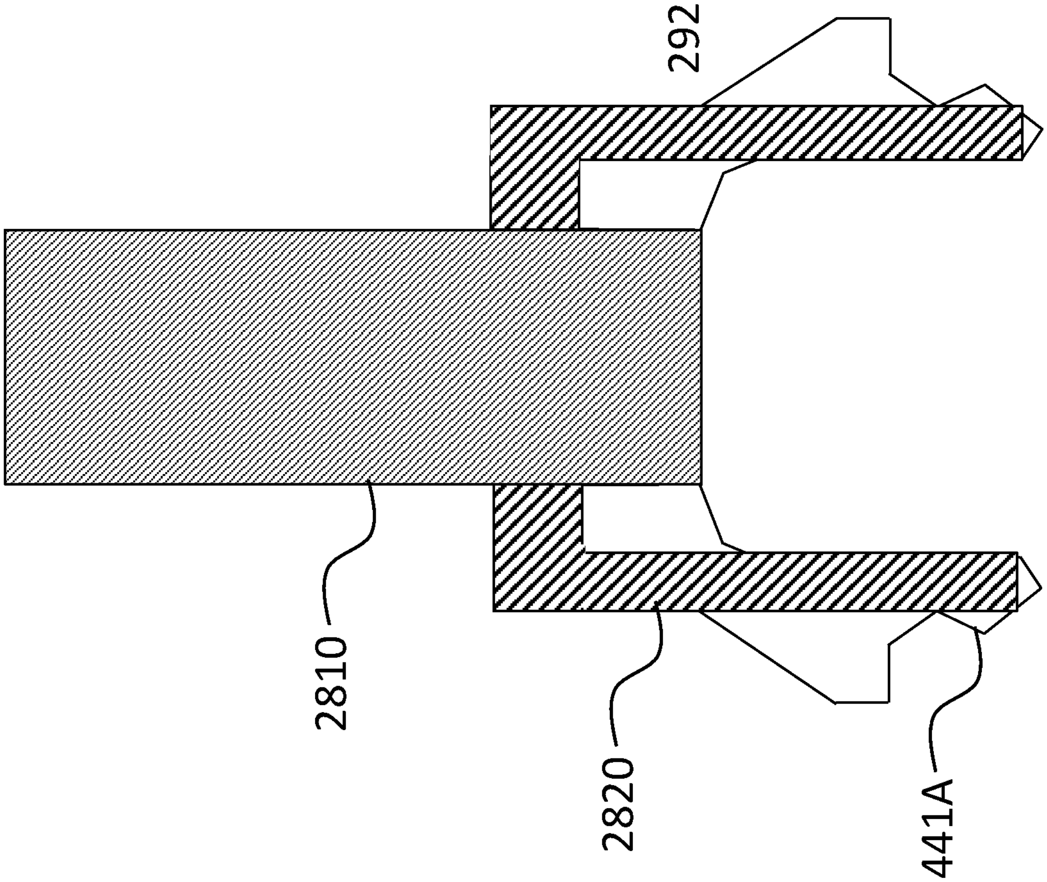

FIG. 28 depicts an exemplary embodiment of an exemplary metallic structure established by elements 2810 and 2820, where these elements are depicted as separate components, but in some other embodiments, these can be monolithic with respect to one another. In this regard, as can be seen, there is a draft 2810 that extends from the transducer and can be a part of the transducer. Over this, is interference fitted a skeleton 2820 which includes prongs that extend downward through openings in the modified coupling 441A to locations in between the teeth of the coupling. FIG. 28 depicts the skeleton superimposed onto the plastic of the coupling for purposes of illustration to illustrate the concept. In reality, the teeth and/or the prongs of the skeleton would be offset from that depicted in the figure, as the prongs would fit in between the teeth. The teeth could be arrayed every 30 degrees starting at zero degrees about the longitudinal axis, and the prongs could be arrayed every 30 degrees starting at 15 degrees. The skeleton 2820 is sized and dimensioned to contact the inside of the abutment such that there is metal to metal contact when the external component is removably attached to the abutment.

Figure 29:
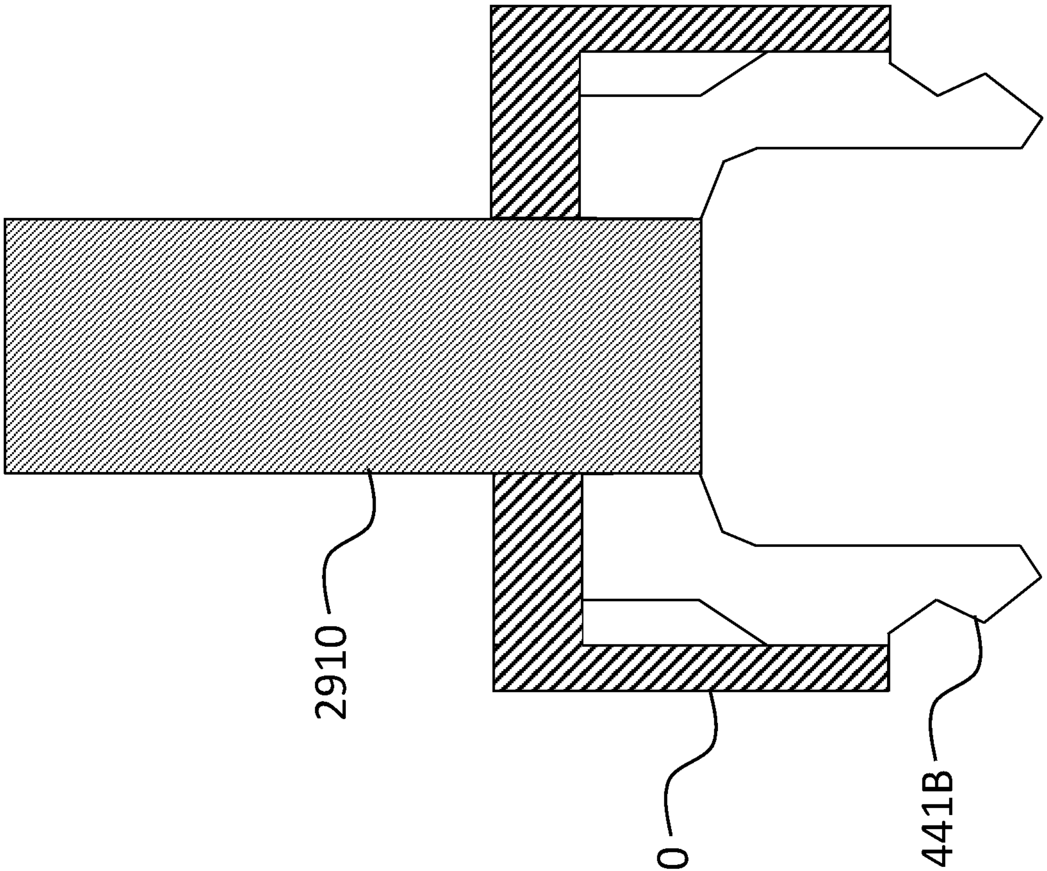

FIG. 29 presents an alternate exemplary embodiment where a shaft 2910, which can correspond to shaft 2810 detailed above, is connected to a body 2920 which can form an inverted cup shaped body with a hole through the center through which the shaft 2910 is press fitted, while again, in other embodiments, element 2920 can be monolithic with element 2910. Unlike the embodiments of FIG. 28 which establishes a skeleton or pseudo-skeleton or chassis like component or otherwise extends through the coupling, in this embodiment, body 2920 extends around and envelops at least a portion of the modified coupling 441B (although in some respects, body 2920 can be considered an exoskeleton of sorts with respect to the coupling 441B). Here, the body 2920, which is a metallic body, extends all the way down to the abutting surface of the coupling, and replaces a portion of that abutting surface, so as to directly abuts the top surface of the abutment. In this embodiment, because the body 2920 extends 360° around the longitudinal axis, there is metal to metal contact over the entire top surface of the abutment over the 360° of the abutment. That said, in some alternate embodiments, there are openings or spaces between the bottom portions of the wall that establishes the cup, and thus there may not necessarily be metal to metal contact over the entire top surface the abutment over the 360° of the abutment.

In view of the above, in an exemplary embodiment, the metallic structure is directly connected to the transducer and rigidly coupled to the transducer, while in another exemplary embodiment, the metallic structure is indirectly connected to the transducer and rigidly coupled to the transducer. Also, with respect to the embodiments detailed above that utilize, for example, the teeth of the coupling 941/441 to establish the spring force, in an exemplary embodiment, the metallic structure is urged and held against the skin penetrating apparatus when coupled to the skin penetrating apparatus for bone conduction via a spring force.

In an exemplary embodiment, the device is configured to urge and hold the metallic structure in contact with the skin penetrating apparatus beyond that which results from the connector apparatus connecting the removable component to the skin penetrating apparatus. In this regard, in an exemplary embodiment, the metallic structure can be supported by a spring apparatus that urges the metallic structure downward, which spring apparatus is separate from the coupling.

As can be understood from the embodiments just described, the metallic structure is a structure that is delta to the coupling componentry vis-à-vis the structure that is utilized to retain the removable component of the percutaneous bone conduction device to the abutment. That is, the metallic structure is not necessary or otherwise forms no part of the retention system of the percutaneous bone conduction device, at least in some embodiments. Thus, in an exemplary embodiment, the removable component of the bone conduction device is configured to removably connect to the recipient skin penetrating apparatus in the complete absence of the metallic structure. Still further, in an exemplary embodiment, the metallic structure is not a retention coupling structure with respect to retaining the removable component to the skin penetrating apparatus.

In some embodiments, the metallic structure is part of the transducer. By way of example only and not by way of limitation, in some exemplary embodiments, the bobbin can have a structure that is monolithic with the bobbin that extends down to the coupling. Indeed, in an exemplary embodiment, the bobbin can be turned on a lathe where a cylindrical portion thereof extends from the bobbin. That said, in an exemplary embodiment, the metallic structure can have a male thread and be screwed into a female threaded receptacle of the bobbin. Also, the metallic structure can be press fitted or interference fitted into the bobbin. This is all as opposed to, for example, the embodiment of FIG. 27, where the support structure is not part of the transducer, just as the coupling 941 is not part of the transducer In at least some exemplary embodiments, a first vibrational path from the transducer passing through the metallic structure to reach the skin penetrating apparatus is more conductive to vibrations than a second vibrational path from the transducer that does not pass through the metallic structure to reach the skin penetrating apparatus. By way of example only and not by way of limitation, with respect to FIG. 24, a first path can extend from the transducer directly to the metallic component 2410 and then travel through the metallic component directly to abutment 820. Also, with respect to FIG. 24, a second path can extend from the transducer to the interface component and then to the fastener 490 and then to the coupling 941 and then to the abutment 820.

In some embodiments, a first portion of the vibrational energy from the operationally removable component is transferred to the skin penetrating apparatus via the metallic structure and a second portion of the vibrational energy from the component is transferred into the skin penetrating apparatus via the plastic coupling/non-metallic coupling (such can be transferred effectively simultaneously, in some embodiments). Accordingly, in an exemplary embodiment, a first percentage less than 100% of the vibrational energy that is generated by the operationally removable component and that passes into skin penetrating apparatus is transferred via the metallic component. Further, in an exemplary embodiment, a second percentage less than 100% of the vibrational energy that is generated by the operationally removable component and that passes into skin penetrating apparatus is transferred from the coupling (plastic/non-metallic). In an exemplary embodiment, the ratio of the first percentage to the second percentage can be at least about 50, 40, 30, 25, 20, 15, 14, 13, 12, 11, 10, 9, 8, 7, 6, 5, 4, 3, 2.5, 2, or 1, or any value or range of values therebetween in 0.01 increments (e.g., between about 20 and about 1.03, 4.44, etc.).

In an exemplary embodiment, the external component/removable component and the skin penetrating apparatus are configured such that the difference between the vibrational energy transferred to the metallic component and the vibrational energy transferred into the skin penetrating apparatus from the metallic structure as a result of the transfer of the vibrational energy into metallic structure when the metallic structure is abutting the skin penetrating apparatus during normal coupling of the external component to the skin penetrating apparatus is less than 20 dB, 15 dB, 10 dB, 9 dB, 8 db, 7 dB, 6 dB, 5 dB, 4 dB, 3 dB, 2 dB, 1 dB, 0.5 dB, 0.25 dB and/or 0.0 dB, or any value or range of values between any two of these values in 0.01 dB increments (e.g., between 15 dB and 0.05 dB).

In an exemplary embodiment, the external component and the skin penetrating apparatus are configured such that the difference between the vibrational energy transferred into the skin penetrating apparatus from the operationally removable component with the metallic structure present versus the absence of the metallic structure is more than 20 dB, 15 dB, 10 dB, 9 dB, 8 db, 7 dB, 6 dB, 5 dB, 4 dB, 3 dB, 2 dB, 1 dB, 0.5 dB, 0.25 dB, 0.125 dB, or any value or range of values between any two of these values in 0.01 dB increments (e.g., between 15 dB and 0.05 dB).

In an exemplary embodiment, the external component and the skin penetrating apparatus are configured such that the difference between the vibrational energy generated by the external/removable component and the vibrational energy that is ultimately transferred into the skin penetrating apparatus is less than 20 dB, 15 dB, 10 dB, 9 dB, 8 db, 7 dB, 6 dB, 5 dB, 4 dB, 3 dB, 2 dB, 1 dB, 0.5 dB, 0.25 dB, 0.125 dB, and/or 0.0 dB, or any value or range of values between any two of these values in 0.01 dB increments (e.g., between 15 dB and 0.05 dB).

In an exemplary embodiment, the external component and the skin penetrating apparatus are configured such that the ratio between the vibrational energy transferred into the skin penetrating apparatus from the operationally removable component with the metallic structure present versus the absence of the metallic structure is at least 11, 10, 9, 8, 7, 6, 5, 4, 3, 2.5, 2, 1.5, or 1.1 or any value or range of values therebetween in 0.01 increments (e.g., between about 20 and about 1.13, 4.44, 5.55, etc.).

Figure 30:
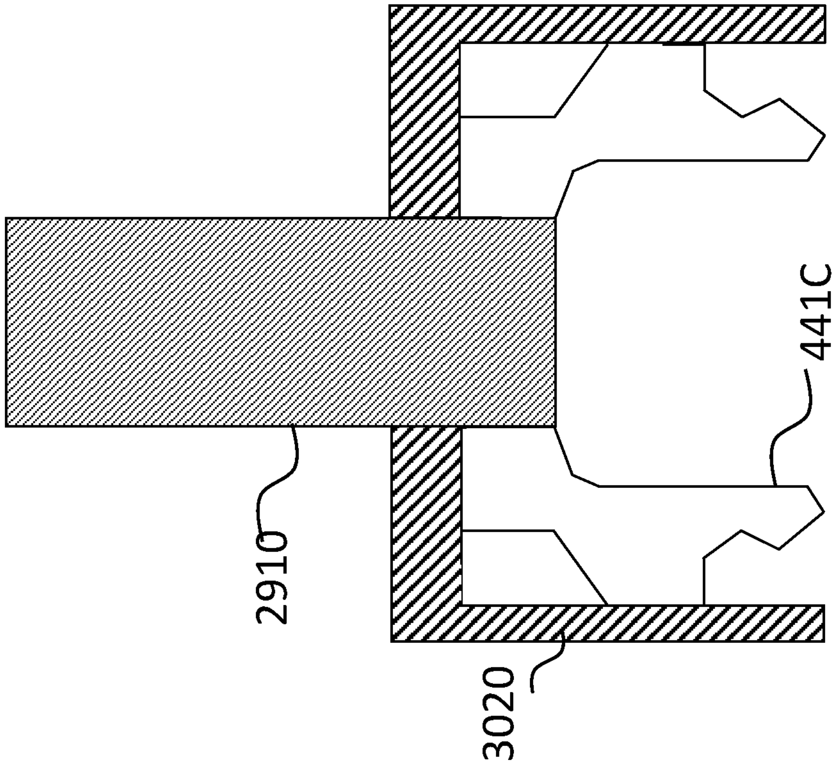

FIG. 30 presents an alternate exemplary embodiment where a shaft 2910, which can correspond to shaft 2810 detailed above (and thus can be press fit into the bobbin/screwed into the bobbin or to the bobbin (the bobbin can have a male threaded boss), welded to the bobbin, etc.,) is connected to a body 3020 which can form an inverted cup shaped body with a hole through the center through which the shaft 2910 is press fitted, while again, in other embodiments, element 3020 can be monolithic with element 2910. Unlike the embodiments of FIG. 28 which establishes a skeleton or pseudo-skeleton or chassis like component or otherwise extends through the coupling, in this embodiment, body 2920 extends around and envelops at least a portion of the modified coupling 441C (although in some respects, body 3020 can be considered an exoskeleton of sorts with respect to the coupling 441B). Here, the body 3020, which is a metallic body, extends all the way down past the abutting surface of the coupling as shown. Unlike the embodiment of FIG. 29, it does not replace a portion of that abutting surface, and instead grips the outer circumference of the abutment 620 during use in a male-female relationship. In this embodiment, because the body 3020 extends 360° around the longitudinal axis, there is metal to metal contact over the entire side service of the abutment over the 360° of the abutment. That said, in some alternate embodiments, there are openings or spaces between the bottom portions of the wall that establishes the cup, and thus there may not necessarily be metal to metal contact about the entire outer surface of the abutment over the 360° of the abutment.

Figure 31:
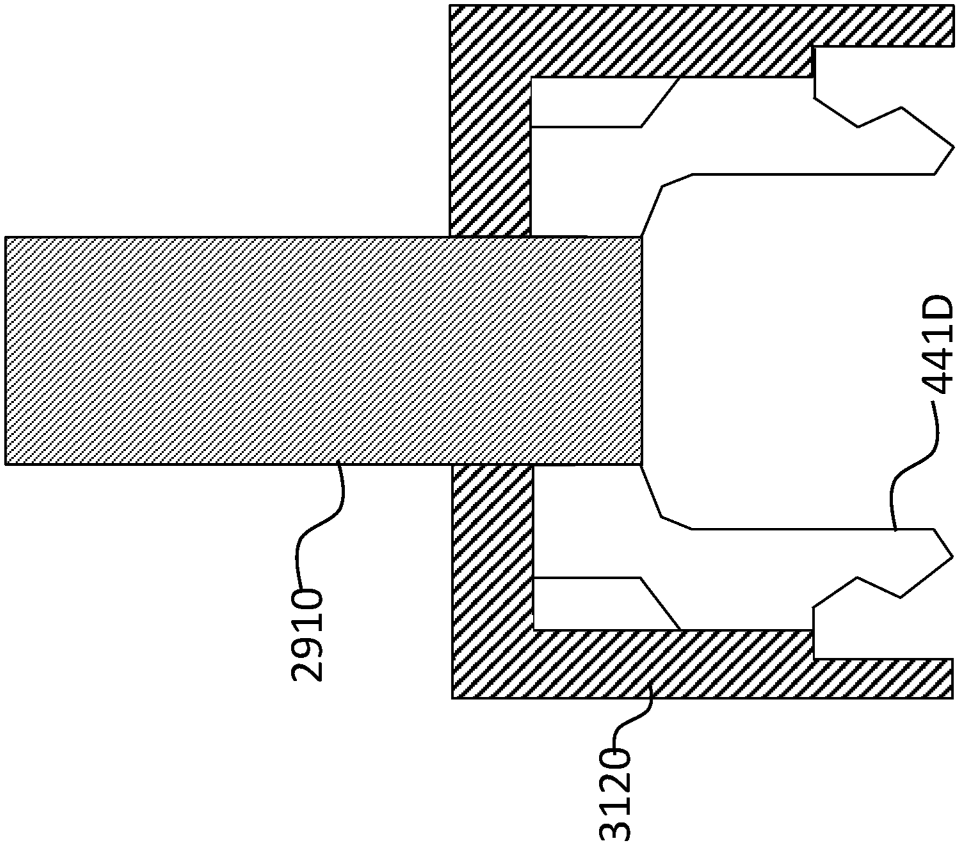

While the embodiment of FIG. 30 does not include a portion of the cup 3020 that contacts the top surface of the abutment, as opposed to the embodiment of FIG. 29, a hybrid device can exist such as that seen in FIG. 31, where not only does the cup 3120 extend down past the abutting surface of the coupling that abuts the top surface of the abutment, but also replaces at least a portion of the surface of the coupling 441D that abuts the top surface of the abutment. In some embodiments, the cup can extend further inboard towards the longitudinal axis than that depicted. Indeed, in some embodiments, it can potentially replace all of the abutting surface of the coupling in the lateral direction with respect to a certain angular amount. Thus, in an exemplary embodiment, there could be gaps between the cup in which the plastic coupling is located so as to also provide support for the teeth, again in an interleaved fashion. That is, in at least some exemplary embodiments, the teeth of the coupling are supported by the plastic of the coupling body, owing to the overall structure where there is utilitarian value with respect to having like materials part of one another in a monolithic component. Thus, there needs to be a path, in at least some exemplary embodiments, for the body of the coupling to reach the teeth so that the teeth can be supported by the body of the coupling. Thus, by interleaving the cup and the body of the coupling, there exists room for the teeth and the portion of the coupling that supports the teeth to be co-located side-by-side with the portions of the cup.

Figure 32:
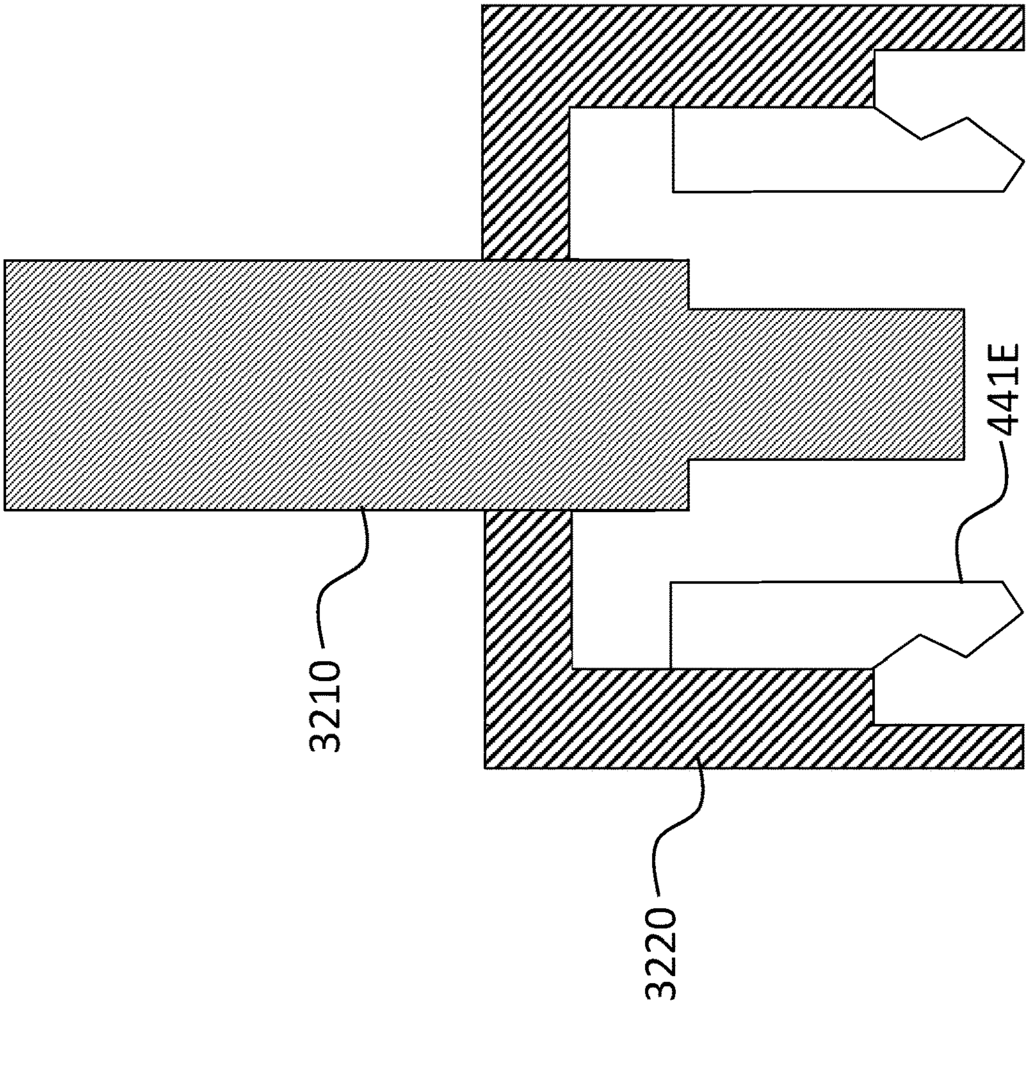

Note also that in at least some exemplary embodiments, there may not necessarily be a body of the coupling. Instead, individual plastic teeth can be directly attached to the cup in an individual manner. Moreover, in an exemplary embodiment, a band of teeth can be present that is press fit or otherwise interference fitted into the inside of the cup. In some of these exemplary embodiments, no portion of the coupling (plastic portion) attaches to the rod 2910 and/or two or any other component of the removable component of the bone conduction device. An exemplary embodiment of such as shown in FIG. 32. Here, cup 3220 forms the portion of the removable component that contacts the top surface of the abutment, and coupling 441E is a band that is press fit into the inside of the cup and otherwise serves only for retention purposes and transfers at most minimal amounts of vibration to the abutment, while in other embodiments, an amount more than a minimal amount of the vibration is transferred. It is noted that while this embodiment depicts a space above the band 441E, in some other embodiments, the band can extend all the way up above to the inner top of the cup. Also, as can be seen, rod 3210 is a rod that has a plurality of diameters. In this embodiment, the lower diameter is configured to fit into the hex receptacle of the abutment screw. In other embodiments, the rod is configured to simply abuts the top surface of the abutment screw. In some embodiments, it is configured to both abut the top surface and extend into the hex receptacle. In some other embodiments, the rod does not contact the abutment or the abutment screw or any other part of the skin penetrating apparatus directly. It is also noted that while the embodiment of FIG. 32 depicts a portion of the cup that extends outward, down around the abutment, in other embodiments, this feature is not present.

Figure 33:
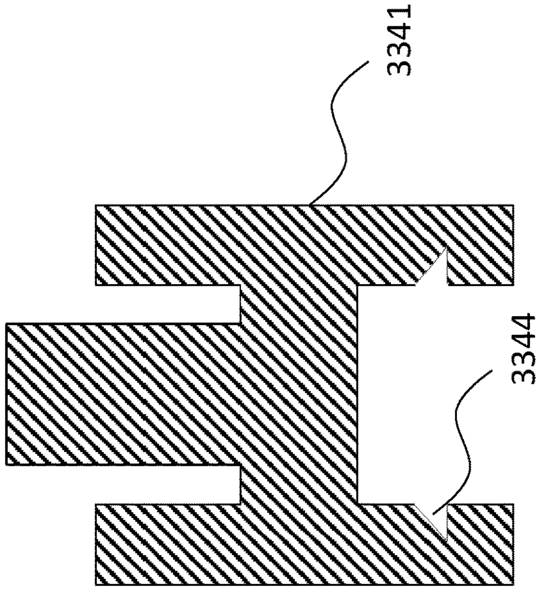
FIG. 33 provides another exemplary embodiment of an exemplary coupling.

Embodiments can include couplings configured to couple, and in some embodiments, snap couple, to the abutment screw 674. FIG. 33 provides an exemplary coupling 3341 that is configured to attached to the fastener 490 of the removable component of the percutaneous bone conduction device. In an exemplary embodiment, coupling 3341 is press fitted to the fastener 490, while in other embodiments, it is screwed to the faster 490, while in other embodiments it is welded, and in other embodiments, is positively retained, such as via a roll pin.

Figure 34:
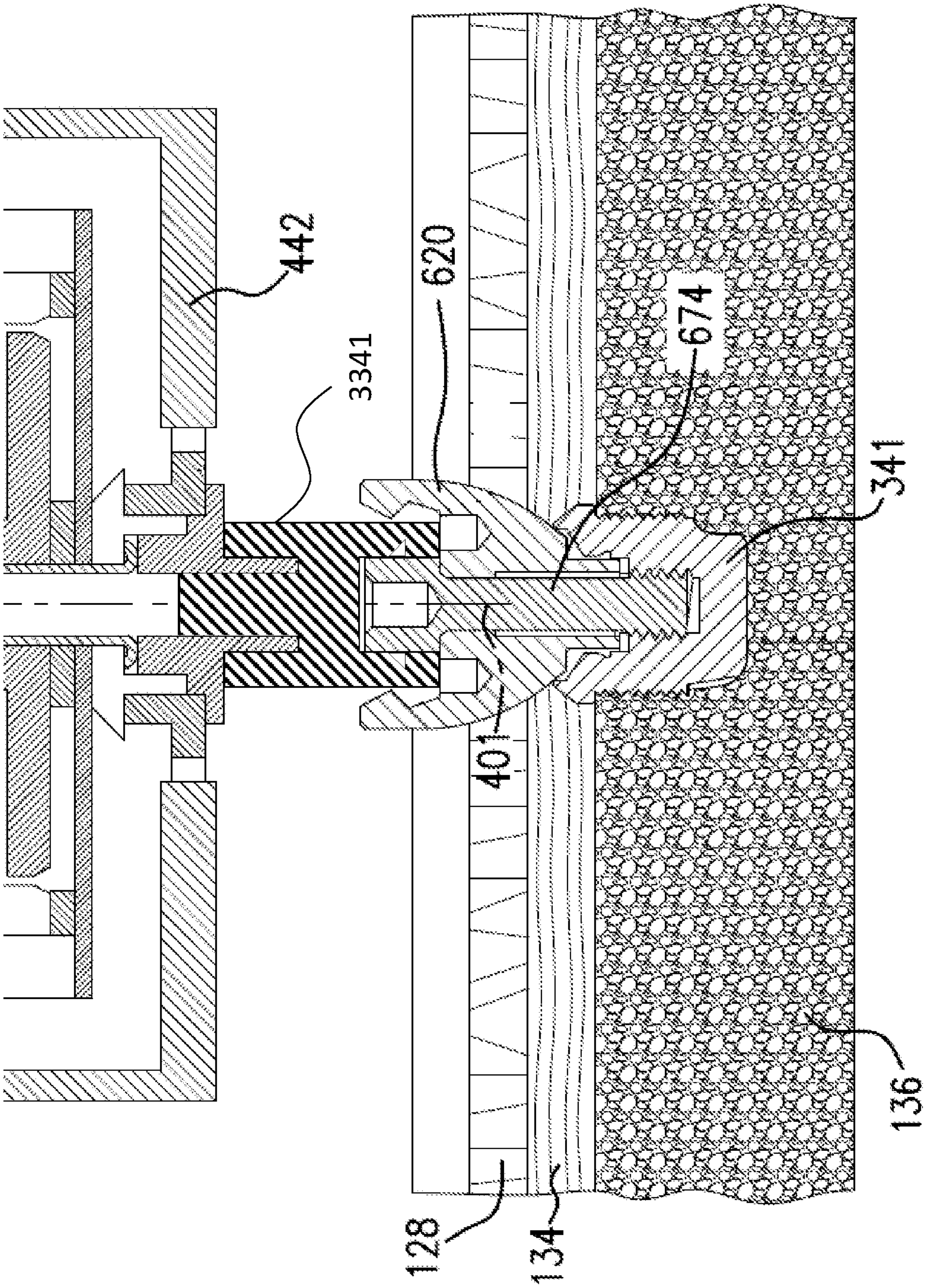
FIG. 34 depicts utilization of the coupling of FIG. 33.

In an exemplary embodiment, the coupling 3341 enables the removable components to be coupled, including snap coupled in some embodiments, to the abutment screw as seen in FIG. 34. Briefly, it is noted that the coupling 3341 includes recess(es) 3344 that can enable snap coupling to a component different than the abutment screw, as will be detailed below. Some embodiments include these recesses while other embodiments do not include these recesses. Also, it is noted that instead of recesses, in an alternate embodiment, teeth/prongs/detents are provided. Any arrangement that can enable snap coupling can be utilized in at least some exemplary embodiments. Again, these features will be described in greater detail below.

The embodiment depicted in FIG. 34 depicts a quasi-interference fit where the inside diameter of the coupling 3341 at the locations that interface with the head of the abutment screw 674 are slightly smaller than the outside diameter of the abutment screw head at those locations. In an exemplary embodiment, the coupling 3341 is made of a resilient material, such as plastic, and thus the coupling deforms in an elastic manner so as to grip the sides of the snap coupling. In an exemplary embodiment, coupling 3341 is configured to snap couple to the abutment screw 674.

Figure 35:
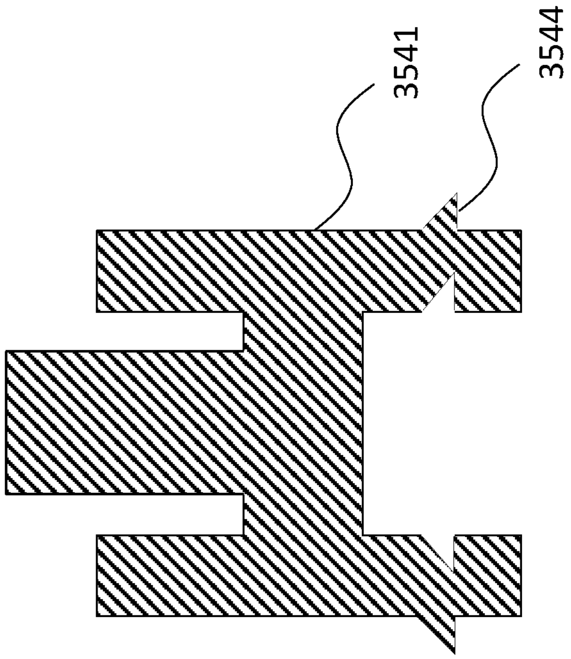
FIG. 35 provides another exemplary embodiment of an exemplary coupling.
Figure 36:
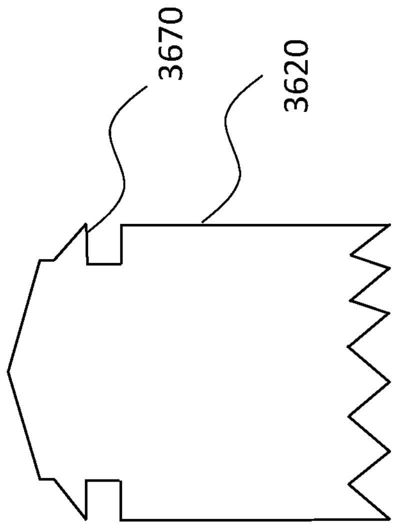
FIG. 36 provides another exemplary abutment.

FIG. 35 presents an alternate embodiment of a coupling 3541 that is configured to snap coupled to the abutment screw 674. In this exemplary embodiment, as can be seen, there are teeth 3544 extending from the sidewalls of the coupling 3541. In an exemplary embodiment, these interface with the inside of the abutment/underside of the abutment 620 in a manner analogous to or otherwise the same as the teeth of the abutment 341 detailed above. In this exemplary embodiment, this can enable a snap coupling feature onto skin penetrating component while also interfacing with the head of the abutment screw. Note also that in at least some exemplary embodiments, the inside diameter of the coupling 3541 that faces the head of the abutment screw when the coupling is coupled to the skin penetrating apparatus may not necessarily interface with the abutment screw. In this regard, in an exemplary embodiment, the configuration of the coupling 3541 is configured to snap couple to the abutment 620 in a manner somewhat analogous to the traditional snap coupling detailed above, without contacting the abutment screw. This can have utilitarian value with respect to providing a coupling that can interface with abutment such as abutment 620 detailed above and can interface with a different type of abutment, such as the abutment seen in FIG. 36. In FIG. 36, abutment 3620 has an outer diameter/a maximum outer diameter at least with respect to the portions located above the mid location of the skin, that is about the same if not smaller than the head of the abutment screw, in some embodiments. Note also that in some exemplary embodiments, element 3620 can instead be an abutment screw and abutment combination, where the top portion is an abutment screw that also serves as a male portion of a snap coupling, and the bottom portion serves as the abutment. The top portion can have a hex recess in a manner analogous to the abutment screw 674 detailed above, albeit potentially smaller in size. Some additional features of this concept will be described in greater detail below, where the abutment screw also serves as a snap coupling. In an exemplary embodiment, the dimensions of 3620 can be the same as those detailed above with respect to element 820. Indeed, any of the disclosure herein regarding 3620 corresponds to an exemplary embodiment wherein such is represented by a disclosure regarding 820, and visa-versa, unless otherwise noted. For example, there thus constitutes a disclosure of a coupling 3541 being used on abutment 820, as there is a disclosure of such being used on abutment 3620. Indeed, this is concomitant with the teachings detailed below that any given feature herein can be combined with any other given future herein providing that the art enable such, unless otherwise specified.

Thus, in an exemplary embodiment, there is coupling 3341 in general, and the removable component of a percutaneous bone conduction device in particular, having such coupling, that is configured to attach to an abutment screw 674 or the like, such as shown in FIG. 34, and configured to also couple onto the abutment 820. In an exemplary embodiment, the coupling is snap coupling or the like or any other coupling that can enable utilitarian value to the coupling. It is also noted that while the embodiments detailed herein in some instances have focused on a configuration of the removable component that has two or more types of couplings, and/or having two or more couplings of substantially different size, in some embodiments, the removable component has only one type of coupling, and that coupling is configured to only connect to an opposite coupling of substantially the same size with respect to the universe of opposite couplings to which the removable component could couple to. This is consistent with the disclosure herein of fact that any embodiment can be explicitly excluded in some alternate embodiments and that some embodiments explicitly do not have some other features disclosed herein.

Still with respect to FIG. 36, as can be seen, a protrusion 3670 extends outward away from the longitudinal axis of the abutment 3620. In an exemplary embodiment, this protrusion 3670 extends completely about the longitudinal axis for 360°, while in other embodiments, it is segmented and establishes more of a toothed structure. In any event, protrusion 3670 fits into the opening 3344 of coupling 3341 to establish a snap coupling. Thus, with respect to at least the embodiment of FIG. 33, coupling 3341 is configured to couple to both a head of an abutment screw of the arrangement of FIG. 6 detailed above and to a thin abutment such as that depicted in FIG. 36. Still further, with respect to at least the embodiment of FIG. 35, coupling 3541 is configured to couple to both the abutments of the arrangement of FIG. 6 detailed above and to a thin abutment such as that depicted in FIG. 36. Note also that in at least some exemplary embodiments, the coupling can also be configured to couple to the abutment of FIG. 6 and also to the head of the screw.

Thus, in an exemplary embodiment, there is a device, comprising a transducer and a coupling apparatus configured to couple to an abutment screw of a skin penetrating apparatus that has an abutment attached to a bone fixture via the abutment screw. In an exemplary embodiment, the coupling apparatus is configured to snap couple to the abutment screw. Still further, as seen in the embodiments detailed herein, in at least some exemplary embodiments, the abutment screw is completely enveloped by the abutment and the bone fixture. Still further, in an exemplary embodiment, the head of the abutment screw is completely enveloped by the abutment. Corollary to this is that in an exemplary embodiment, the abutment extends above the abutment screw or at least to about (including to) a top of the abutment screw on all sides of the abutment screw with respect to location along the longitudinal axis of the abutment screw in the direction of the transducer when the coupling apparatus is coupled to the abutment screw. That is, in at least some exemplary embodiments, with respect to the former feature, the abutment is proud of all portions of the abutment screw with respect to the side of the skin penetrating apparatus that is exposed to the ambient environment of the recipient.

In view of the above, it is to be understood that in at least some exemplary embodiments, the couplings detailed herein enable the same removable component of a percutaneous bone conduction device to couple to an abutment screw that is analogous to that of FIG. 6, even though portions of the abutment are located on either side and all around (with respect to the longitudinal axis) of the abutment screw.

Figure 37:
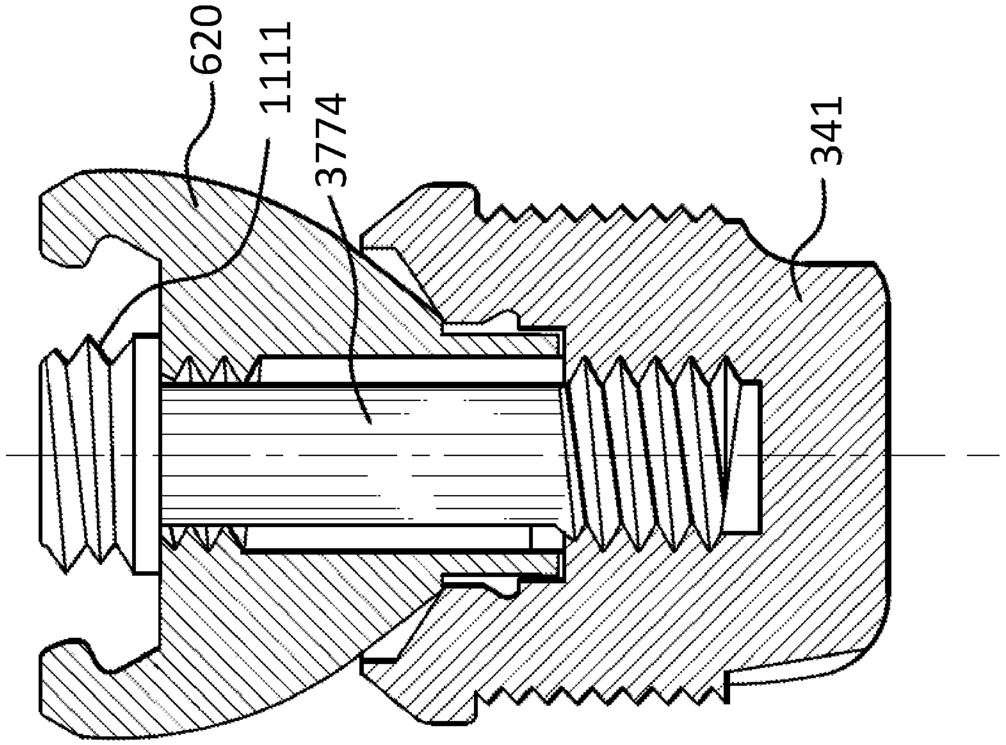
FIG. 37 provides an exemplary skin penetrating apparatus.

FIG. 37 presents an exemplary embodiment of a skin penetrating component where the abutment screw 3774 has a threaded head 1111. That is, the head 1111 has outer threads. Indeed, in an exemplary embodiment, the head 1111 is threaded to enable the performance of implant stability quotient (ISQ) testing on the implant/the fixture. More particularly, abutment screw head 1111 is, at least in some embodiments, configured for ISQ testing of the implant/fixture (the male threads provide for utilitarian coupling of the device used for ISQ testing, although some embodiments can be practiced with other types of coupling in the absence of male threads). Thus, embodiments utilize these threads to enable a coupling with the external component/removable component of the bone conduction device.

An exemplary embodiment includes a coupling that is configured to couple to the threads of the head 1111. In an exemplary embodiment, the coupling 3341 is so configured as a result of a resilient nature of the material of the coupling such that it slightly interference fits with the threaded head 1111 in a manner analogous to how it interference fits with non-threaded head of the abutment screw 674. Conversely, in some alternate embodiments, there are other types of couplings that include threads on the inside of the female component thereof that enable the external component to be threaded onto the head 1111 of the abutment screw 3774. That said, in some alternate embodiments, the couplings are configured to snap couple onto the thread without needing a screwing/rotating action of the coupling relative to the abutment screw.

Figure 38A:
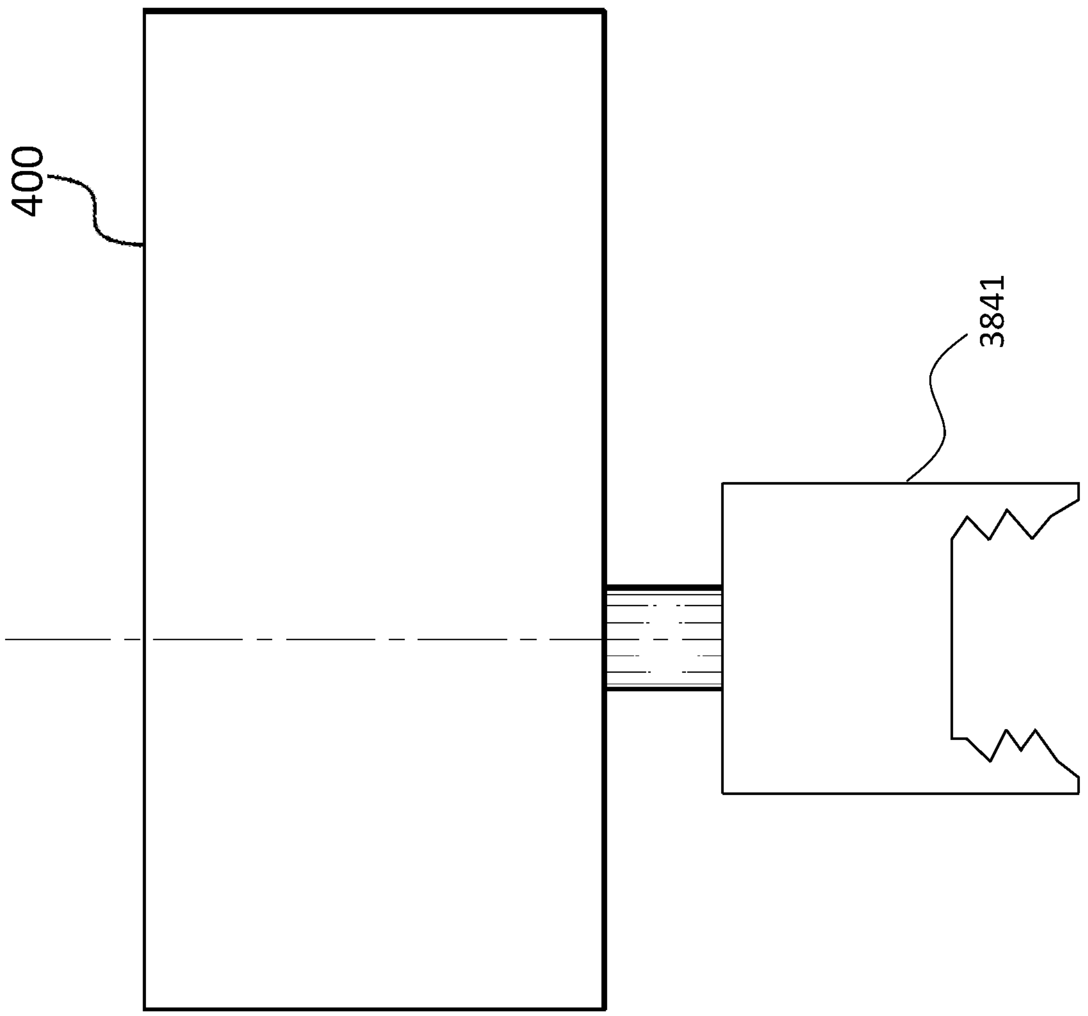
FIG. 38A depicts an exemplary removable component of a bone conduction device according to an exemplary embodiment.
Figure 38B:
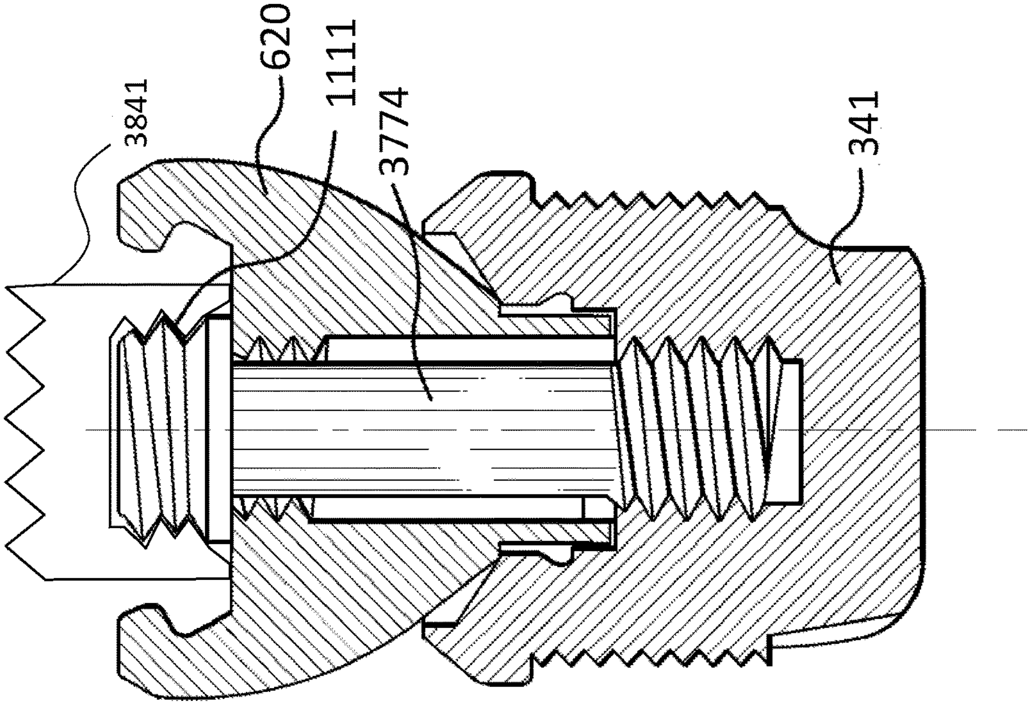
FIG. 38B depicts a portion of the removable component of the bone conduction device of FIG. 38A coupled to the skin penetrating apparatus of FIG. 37.

FIG. 38A provides an exemplary embodiment of a removable component of a percutaneous bone conduction device 400 that includes a coupling 3841 that is configured to snap couple onto the head 1111 of the abutment screw 3741, as seen in FIG. 38B. In this regard, in an exemplary embodiment, the outer wall of coupling 3841 is sized and dimensioned that is made of a material that is sufficiently resilient so as to snap couple onto the metal threads of the head 1111 of the coupling apparatus 3774. In an exemplary embodiment, the female portion is a structure that contiguously extends about the longitudinal axis about the threads when the coupling is snap coupled to the head 1111. In an alternate exemplary embodiment, the female portion is established by teeth that are segmented in a manner analogous to the teeth of coupling 541 detailed above, except where the gripping portions are located on the inside as opposed to the outside. Any arrangement that can enable the removable component of the percutaneous bone conduction device to snap couple to the threaded head of the abutment screw can be utilized in at least some exemplary embodiments.

Thus, as can be seen, in an exemplary embodiment, there is a coupling apparatus that is configured to snap couple to the abutment screw via snapping onto external threads of the abutment screw. This as opposed to and distinct from threading onto the external threads.

Figure 39A:
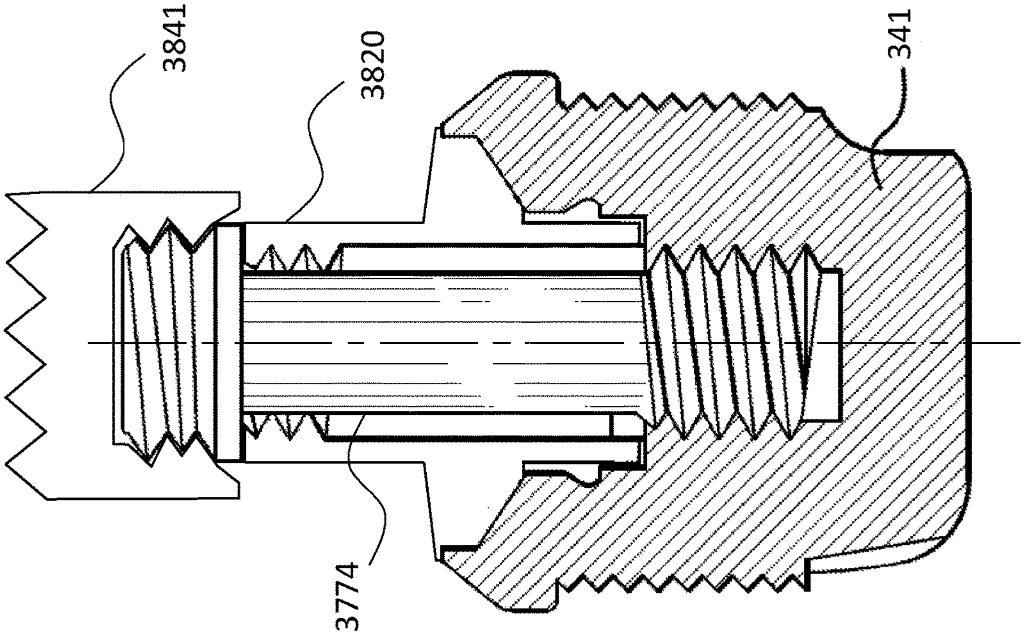
FIG. 39A depicts the portion of the removable component of the bone conduction device of FIG. 38A coupled to a different skin penetrating apparatus.

The embodiment of FIG. 38A can be utilized to snap couple to a skin penetrating apparatus such as that seen in FIG. 39A. Here, skin penetrating apparatus shown in this figure includes the bone fixture 341 and the 3774. However, the component that would otherwise correspond to the abutment, component 3820 is of a different configuration from the abutments detailed above, as can be seen. Here, the component 3820 is not so much an abutment per se as it is simply the portion that interfaces with the skin. In this regard, the component 3820 may not necessarily abut any portion of the removable component. Indeed, in many respects, the abutment is actually the screw 3774. In any event, as can be seen, there is a three-piece skin penetrating apparatus where the screw 3774 has a threaded head, and the coupling 341 is configured to snap couple to that threaded head. Thus, in this exemplary embodiment, the coupling 341 is configured to couple to two different types of skin penetrating apparatus is (at least two), as can be seen.

Figure 40:
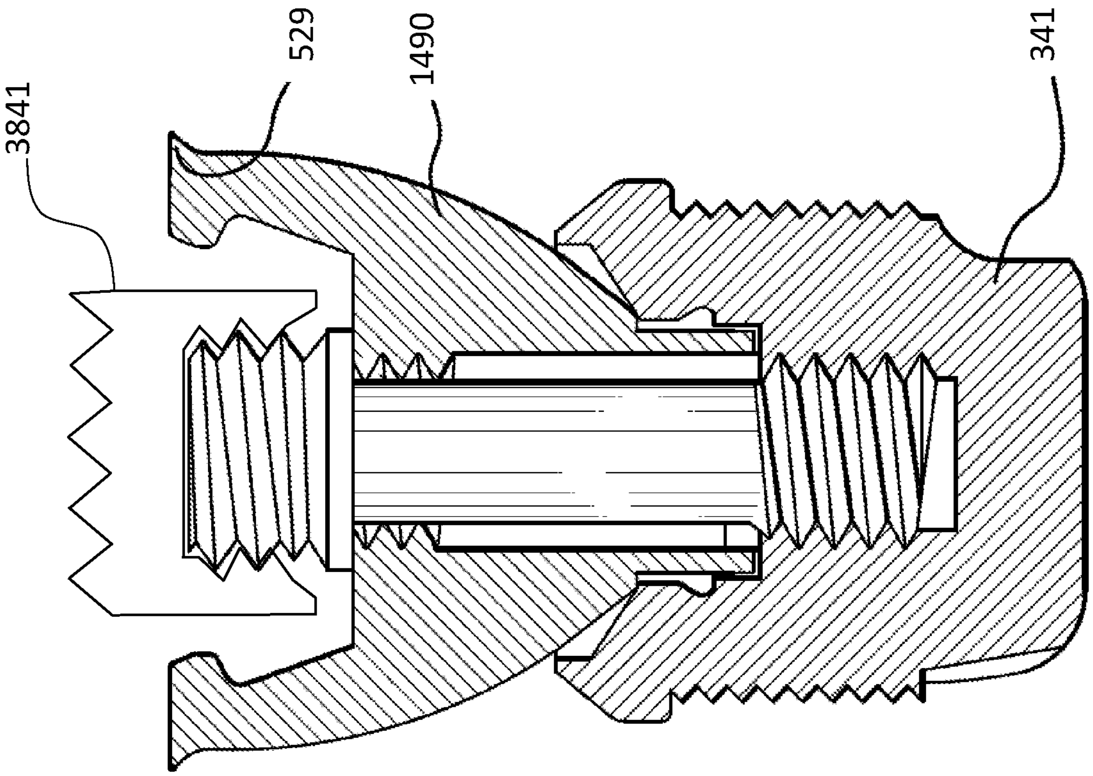
FIGS. 40 to 54 depict additional exemplary embodiments.

Not only is the coupling 3841 configured to enable the removable component to snap couple to the skin penetrating apparatus shown in FIG. 38, it is also configured to enable the removable component to snap couple to the skin penetrating apparatus shown in FIG. 40, although it is noted that in other embodiments, the coupling may not necessarily enable coupling to both. It may instead only enable coupling to the apparatus shown in FIG. 40 and the apparatus shown in FIG. 39A and/or variations thereof.

Figure 39B:
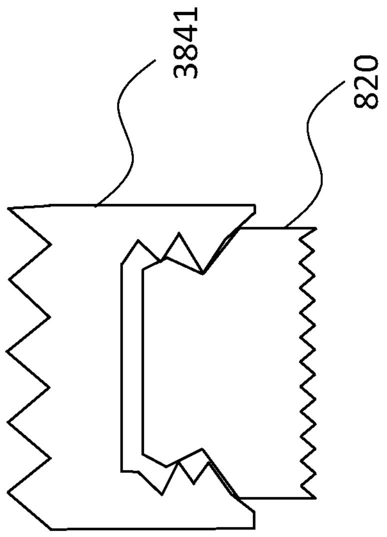
FIG. 39B depicts an alternate use of the device of FIG. 38A.

The embodiment of FIG. 38 can be utilized to snap couple to a skin penetrating apparatus such as that seen in FIG. 39B, which depicts abutment 820 noted above.

FIG. 40 depicts an alternate embodiment of a skin penetrating apparatus with a variation of the abutment described above, where abutment 1490 includes a portion 529 that flares outward, as may be seen. In an exemplary embodiment, a female snap coupling of the removable component of the percutaneous bone conduction device snap couples about the outer circumference of the abutment 4020, and thus snap couples to the portion 529. Thus, in some embodiments, the flared portion 529 enables the male portion of the snap-coupling to the female portion of the coupling of the removable component. Indeed, this configuration was generally described above. Here, this configuration is introduced to show that the coupling 3841 is configured to snap couple to this configuration as well in a manner analogous to that detailed above with respect to the abutments that establish the female component of the coupling.

Figure 41:
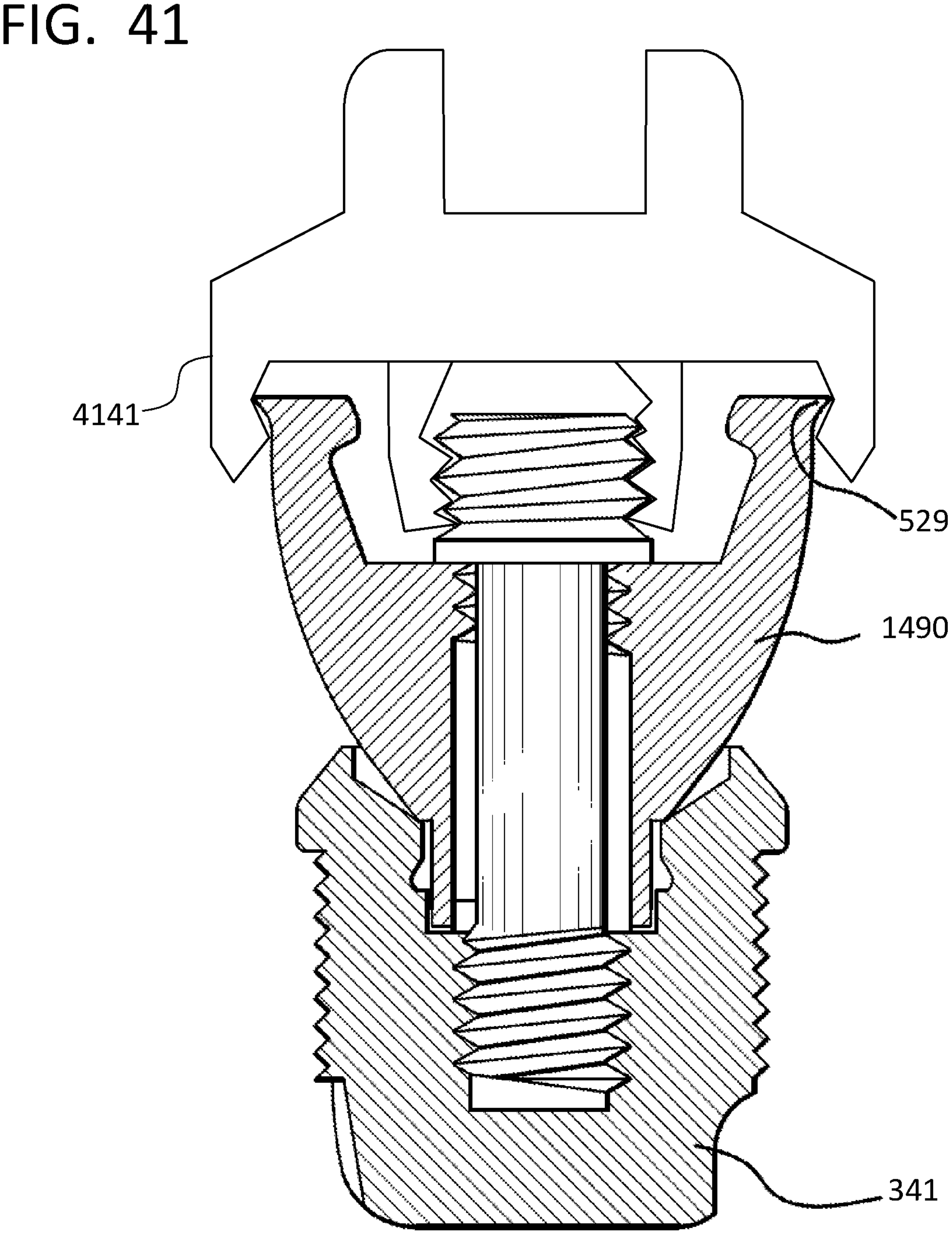
Figure 42:
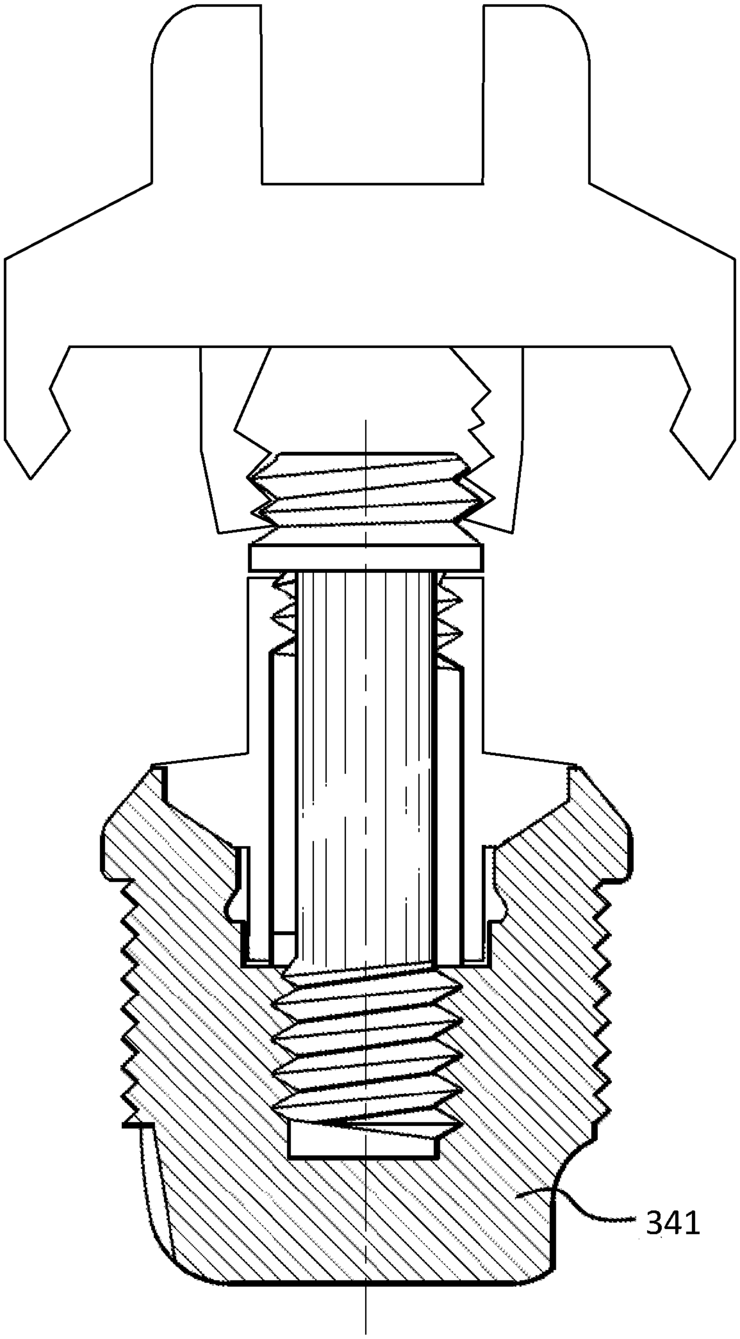

FIG. 41 presents an exemplary embodiment of a coupling 4141 that is configured to snap couple to the outside of the abutment 1490, and also configured to snap couple to the head of the abutment screw, as seen. That said, in an exemplary embodiment, indeed, as with respect to any of the embodiments detailed herein, instead of snap coupling to the head of the abutment screw, a configuration can be such that the coupling 4141 threads one to the head of the abutment screw, and as the coupling 4141 travels down onto the abutment screw, the outside snap coupling takes effect in a traditional albeit slower manner. The coupling 4141 can enable coupling to a different type of skin penetrating apparatus, such as can be seen in FIG. 42.

Figure 43:
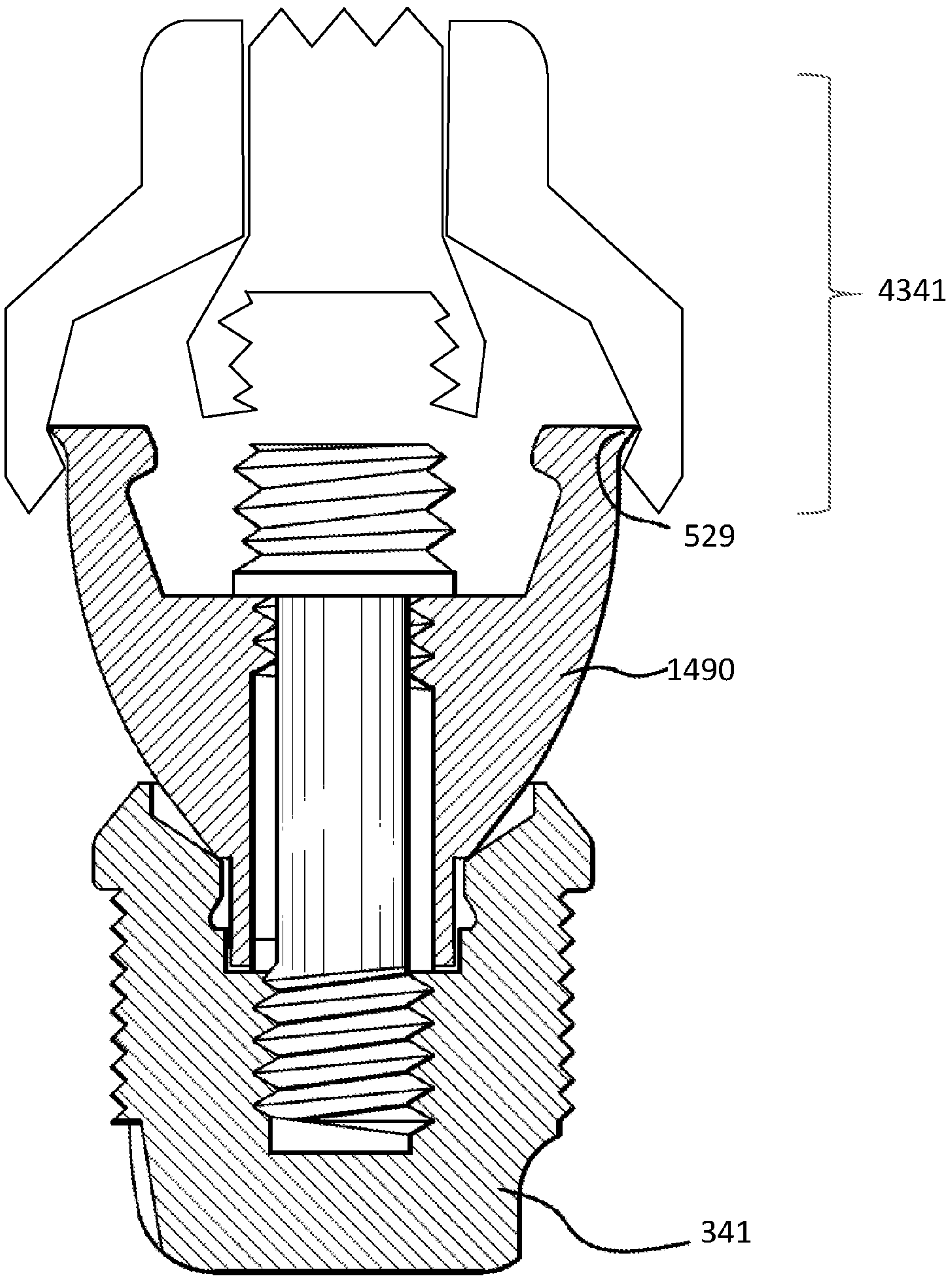

As noted above, at least some exemplary embodiments include a coupling apparatus that includes coupling components that move relative to one another. FIG. 43 presents such an exemplary embodiment that is utilized to couple to a skin penetrating component such as that depicted in FIG. 40. Here, the component that is configured to couple to the head of the abutment screw is movable relative to the component that is configured to couple to the abutment 1490, while in other embodiments, the latter component is configured to move relative to the former component, while in other embodiments, both are configured to move relative to one another. In this regard, the coupling 4341 is configured to provide clearance as needed to enable the different types of coupling.

Thus, in view of the above, there is a coupling that is configured to couple to the abutment screw and couple to another type of skin penetrating apparatus different from that established by an abutment-bone fixture-abutment screw configuration such as that of FIG. 6.

Also, in view of the above, there is a device that comprises, for example a transducer and a coupling apparatus configured to couple to an abutment screw of a skin penetrating apparatus that has an abutment attached to a bone fixture via the abutment screw (e.g., that of FIG. 6). This device also includes a second percutaneous skin penetrating apparatus different from the just mentioned skin penetrating apparatus, wherein the coupling is coupled to the second skin penetrating apparatus (such as that of FIG. 39). Here, no part of the second skin penetrating apparatus extends above the coupling on an outside of the coupling, and the abutment of the skin penetrating apparatus (that of FIG. 6) extends above the abutment screw on all sides of the abutment screw with respect to location along the longitudinal axis of the abutment screw in the direction of the transducer when the coupling apparatus is coupled to the abutment screw.

It is noted that in at least some embodiments, any of the coupling arrangements herein as used herein as described provide a structure when used with the corresponding removable component of the bone conduction device that at least effectively evokes hearing percept. By "effectively evokes a hearing percept," it is meant that the vibrations are such that a typical human between 18 years old and 40 years old having a fully functioning cochlea receiving such vibrations, where the vibrations communicate speech, would be able to understand the speech communicated by those vibrations in a manner sufficient to carry on a conversation provided that those adult humans are fluent in the language forming the basis of the speech. In an exemplary embodiment, the vibrational communication effectively evokes a hearing percept, if not a functionally utilitarian hearing percept. Thus, by way of example only and not by way of limitation, with respect to the coupling that is configured to couple to the head of the abutment screw, when utilized with a bone conduction device and the other components, such as the skin penetrating apparatus, the device is configured for effectively evoke a hearing percept if not a functionally utilitarian hearing percept when utilized on the abutment screw head of FIG. 6 and when utilized when the abutment, such as abutment 3620.

Figure 44:
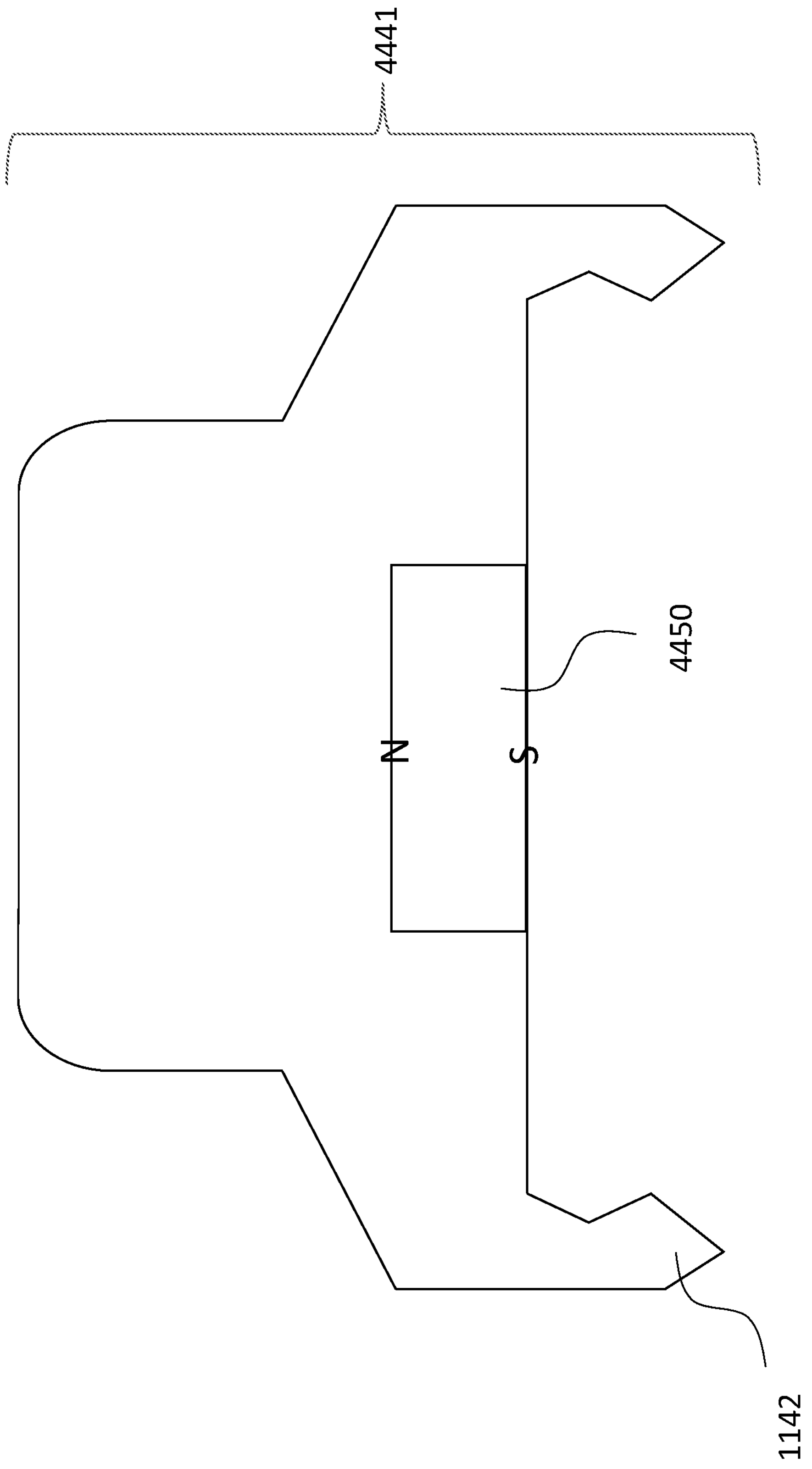

While the embodiments detailed above have typically been directed towards snap coupling, it is noted that in at least some exemplary embodiments, other types of coupling can be utilized in accordance with the teachings detailed herein. By way of example only and not by way of limitation, FIG. 44 presents an exemplary coupling 4441 which includes a permanent magnet 4450 providing magnetic coupling, and also teeth 1142 of the embodiment of FIG. 11 above, which provides snap coupling (female). In this exemplary embodiment, the coupling can enable a removable component of a bone conduction device or the like to be snap coupled in a male-female relationship with respect to one implanted coupling component, and can enable the removable component to be magnetically coupled to another implanted coupling. Here, the implanted coupling/abutment would have a maximum outer diameter with respect to potential interference between the abutment and the female portions of the snap coupling that would be smaller than the minimum interior diameter of the female portion of the snap coupling that might interfere with the abutment.

Thus, the embodiment can enable versatile coupling two different implanted components. Note also that in at least some exemplary embodiments, the magnetic coupling can provide additional coupling force when utilized with a snap coupling. In this regard, it is noted that in at least some exemplary embodiments, there is an implantable component that has both the features of a snap coupling and magnetic coupling, and thus the coupling 4441 can be both snap coupled and magnetically coupled to the same implanted abutment. This can have utilitarian value with respect to increasing the total coupling force.

Concomitant with the teachings detailed above, the magnet can be movable relative to the teeth, and vice versa.

Figure 45:
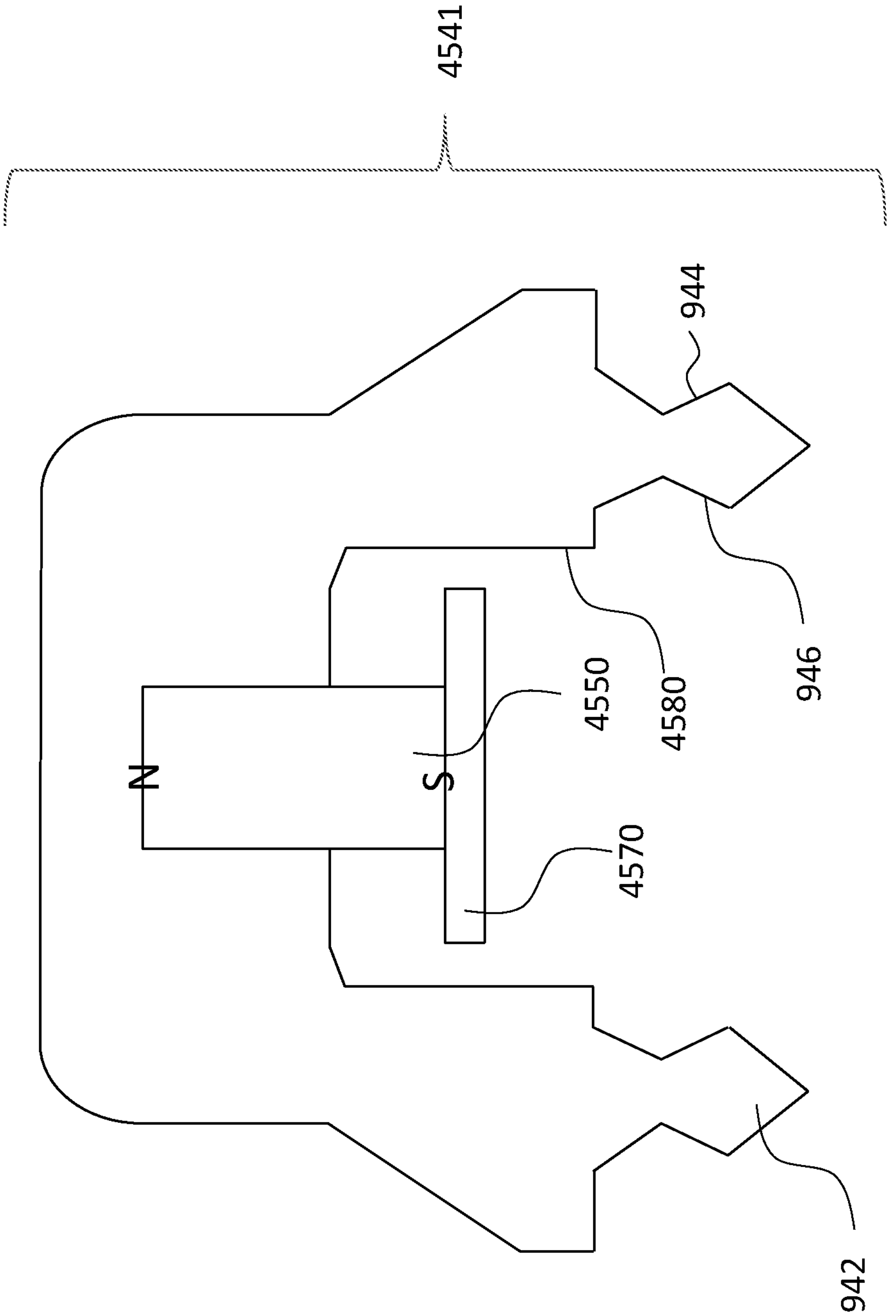

While the embodiment depicted in FIG. 44 is presented in terms of having a female coupling, it is to be understood that this concept can also be applicable to the utilization of a male coupling with the magnetic component. Indeed, the magnet embodiment can be combined with both the male and female coupling such as seen in FIG. 45. The embodiment of FIG. 45 presents coupling 4541 which is based on the embodiment of FIG. 9, with the addition of magnet 4550. Additionally, platform 4570 is provided, which can be in the form of a circular plastic disk and/or other type of disc that is relatively transparent to the magnetic field generated by magnet 4550. This can have utilitarian value with respect to providing more moment resisting surface area relative to that which would be established simply with the magnet (here, the magnet is a long bar magnet that has a relatively narrow face facing the abutment—the platform 4570 would contact against the flat surface of the abutment—the magnet would provide the retention force, and the platform 4570 would resist against rocking of the removable component). Note also that in at least some exemplary embodiments, the magnetic coupling can be utilized with a male-female slip fit arrangement vis-à-vis the abutment. In this regard, surface 4580 can be sized and dimensioned to receive an abutment and a slip fit arrangement. Again, while the magnet provides the retention force, the slip fit resists rocking or the like of the external component with respect to the abutment.

Figure 46:
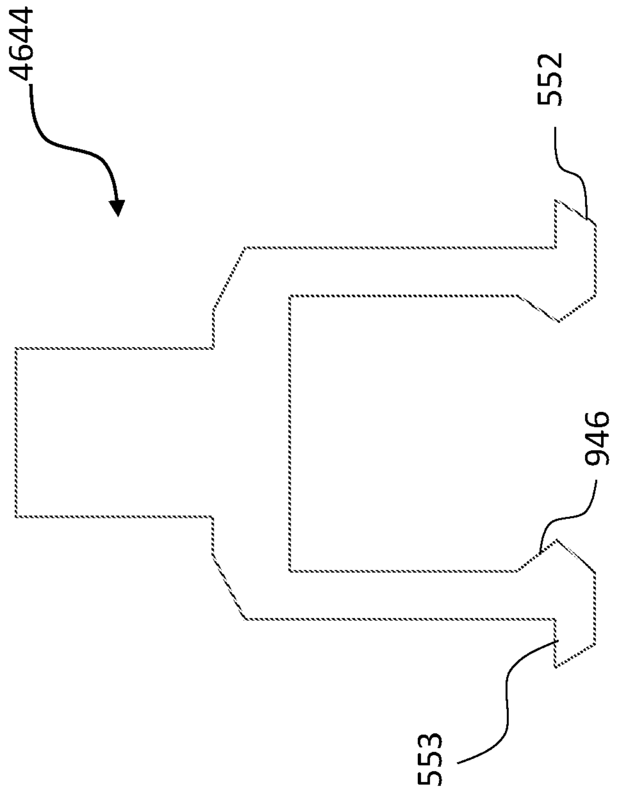

It is noted that at least some exemplary embodiments can be implemented by utilizing the sleeve 544, or more accurately, a modified version thereof. In this regard, FIG. 46 depicts an exemplary sleeve 4644, with backdrop lines removed. Sleeve 4644 is identical to sleeve 544 detailed above, except that it has teeth established by surfaces 946 located on the inside as can be seen. In an exemplary embodiment, sleeve 4644 can enable retrofitting of existing removable components. That is, an existing removable component, such as that detailed above in FIG. 4A, that has sleeve 444, can be obtained, and sleeve 444, which is a traditional sleeve, can be replaced with sleeve 4644, which has surfaces 946 located inboard/inside the sleeve. Thus, what initially was a removable component that could only interface with a female coupling component now can interface with a female coupling component and a male coupling component, without changing any of the other structure.

In an exemplary embodiment, sleeve 4644 is configured to attach to the remainder of the removable component in a manner that is the same as or analogous to sleeve 444 and/or 544. In an exemplary embodiment, the sleeve is press fitted or screwed or interference fitted or slip fitted etc., into the remainder of the component. In an exemplary embodiment, an adhesive is utilized or thread locking compound or the like is utilized to improve retention of the sleeve to the remainder of the component.

With respect to the embodiment of sleeve 4644 seen in FIG. 46, as can be seen, the surface 553 that exists in sleeve 544 is present, which surface can about the teeth 541T of the removable component, while in other embodiments, there can be a space between surface 553 and the tips of the teeth 541T (in the longitudinal direction).

It is briefly noted that the view of FIG. 46 is presented without backdrop/back lines. In this regard, it can be considered a cross-sectional view taken on a plane parallel to and lying on the longitudinal axis of the coupling 941, where everything in the background has been removed for clarity. In an exemplary embodiment, sleeve 4644 is rotationally symmetric about the longitudinal axis. It is also uniform about the rotational axis at all locations. In this regard, in an exemplary embodiment, there really is only one tooth established by surface 946, which tooth extends completely around the longitudinal axis 360°. In an exemplary embodiment, the material of the sleeve, which can be plastic or the like, is a material that has resiliency. Alternatively, and/or in addition to this, the sleeve is sized and dimensioned so that even though it is a solid body that extends uniformly 360° around the longitudinal axis, there is still enough "give" to permit the sleeve to flair outward during coupling and uncoupling of the removable component in general, and the sleeve 4644 in particular, to a male coupling, such as any of the male couplings detailed above.

It is further noted that in an alternate embodiment, the body of the sleeve can be segmented in a manner analogous to the teeth of the embodiments of the coupling detailed above. In this regard, there could be two, three, four, five, six, seven, eight, nine, and/or ten or more teeth, each having surface 946, so that the teeth can operate in an analogous manner to the teeth of the couplings detailed above. That said, the purpose of the sleeve, when not being used to establish the female coupling component, is to prevent the side of the abutment from getting between the teeth of the coupling, as noted above. Segmenting the sleeve in a manner akin to the teeth could result in a situation where the abutment can get between the teeth of the sleeve. In an exemplary embodiment, the arrangement of the teeth of the sleeve can be offset from the arrangement of the teeth of the coupling so that even if the side of the abutment gets between the teeth of the sleeve, the teeth of the coupling will be located so that the teeth of the coupling will stop further downward movement of the removable component. In at least some exemplary embodiments, the removable component will be configured so that the resistance will be significant enough that the recipient can understand that the device is misaligned, and/or such that the removable component cannot be pushed any further onto the abutment, at least not without the recipient realizing that things that are not good are happening. That said, in an alternate embodiment, a ring can be located at the very bottom of the sleeve, which ring is supported by only some of the teeth, such as the teeth on one side. This will enable the teeth to move or otherwise flex to enable coupling to a male coupling, but the ring, which is continuous and extends about the longitudinal axis of the sleeve, will be located in place so that the bottom surface of the ring would abut the side of the abutment and prevent the misalignment. Any arrangement that can enable the teachings detailed herein can be utilized in at least some exemplary embodiments.

Figure 47:
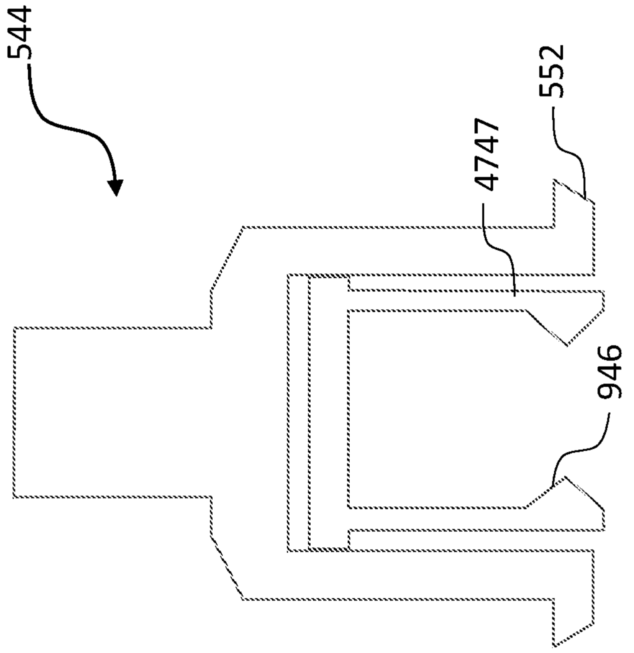

FIG. 47 presents an exemplary embodiment where a plug like device 4747 is inserted into the sleeve 544. Plug 4747 includes surface 946 as can be seen. In this embodiment, plug 4747 can have the teeth/can be segmented (again, no backdrop lines are shown) to function according to teeth 942 above. Alternatively, in an alternate embodiment, the plug 4747 can be rotationally symmetric about the longitudinal axis and the continuous about the longitudinal axis, and be made of a material that is resilient, at least in some embodiments providing that the sleeve 544 can flex outward to accommodate the outward flexing of the plug 4747 (in an embodiment where there is face to face contact between the plug and the sleeve along the entire length of the two, as opposed to the embodiment shown in FIG. 47, where there is a space between the two portions with respect to the lower portions of the plug. In an exemplary embodiment, the upper portions of the plug 4747 are configured to interference fit into the cavity of the sleeve, while in other embodiments, the plug can be screwed into the cavity. Indeed, in an exemplary embodiment, the upper portions of the plug at least can be made of a material that is harder than the material of the sleeve, and thus the plug can be self tapping. As can be seen, there is clearance between the sides of the lower portions of the plug and the interior of the sleeve. This can enable the outward flexing of the plug 4747 without forcing the sleeve to flex outward or otherwise move.

In an exemplary embodiment, the plug and/or the sleeve is configured to transmit vibrations or otherwise enable the transmission of vibrations to evoke a hearing percept according to any of the teachings detailed herein.

In an exemplary embodiment, the sleeve 4644 and/or the plug 4747 are configured to interface with a male component according to any of the teachings detailed herein vis-à-vis the other components that are configured to interface with a male component. In this regard, while the embodiments depicted in FIGS. 46 and 47 are shown as utilizing teeth and a snap fit coupling, in other embodiments, a screw interface is utilized and or a slip fit and/or an interference fit utilizing flat surfaces in some other embodiments.

In any event, as can be seen, in an exemplary embodiment, there is a method of retrofitting a removable component. In this regard, in an exemplary embodiment, at time zero, there exists removable components of percutaneous bone conduction devices (or a transcutaneous passive bone conduction device with a coupling configured to couple to a platform), with couplings that are configured along the lines of that detailed in FIG. 5A and FIGS. 6 and 7 detailed above. In general, these couplings are configured to only interface with one type and one size mating component. At a time subsequent to time zero, a determination is made that there can be utilitarian value with respect to having a coupling that has expanded functionality than that of the existing coupling. Thus, parties impacted by this decision or otherwise associated there with obtain a new sleeve and/or a new plug. By way of example only and not by way of limitation, in an exemplary embodiment, the new sleeve and/or plug can be that corresponding to the embodiments of FIGS. 46 and/or 47 respectively. Subsequent to the determination, the old sleeve is removed and a new sleeve is replaced, or a plug is placed into the old sleeve. The now modified/retrofitted removable component is configured to interface with more than one type and/or more than one size mating component.

Note also that in at least some exemplary embodiments, the plug and/or the sleeve concepts detailed herein can be utilized with the new couplings detailed above so as to obtain broader coupling abilities beyond that which would be the case by simply replacing the coupling with a new coupling.

Figure 48:
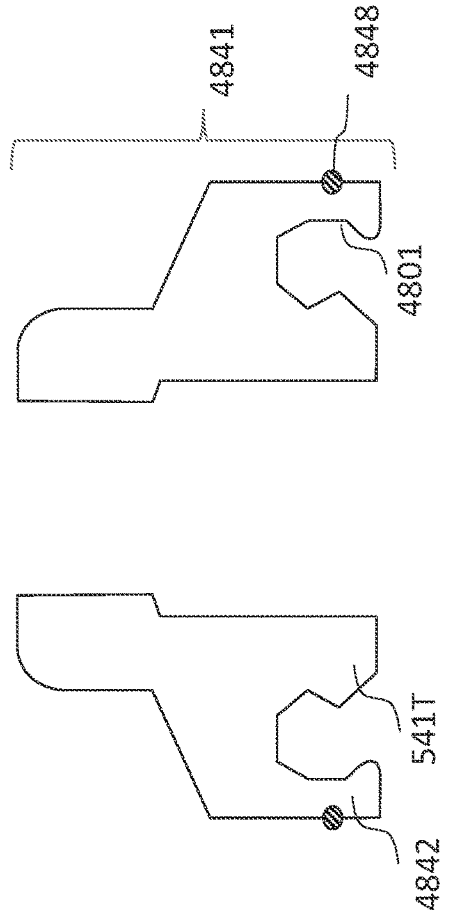

FIG. 48 provides another exemplary embodiment of a coupling, where coupling 4841 is presented with teeth 541T corresponding to the teeth of coupling 541 above, and teeth 4842 correspond to teeth that provide the female coupling features. Note that in this exemplary embodiment, teeth 4842 extends completely and continuously and rotationally symmetrically around the longitudinal axis of coupling 4841 (this, there is in essence one tooth—again, consistent with the statement at the beginning, we use tooth and teeth interchangeably). The embodiment of FIG. 48 is configured to interface with the abutment 620 via teeth 541T, and with abutment 1220 of FIG. 12 (where the backlines are not present for purposes of clarity), in an exemplary manner analogous to that shown in FIG. 13, except using teeth 4842.

Also seen in FIG. 48 that teeth 4842 can be rounded, instead of the “sharper” versions shown herein. Any configuration of teeth (tooth) that can be utilized to implement the teachings herein can be used in some embodiments.

Note that the embodiment of FIG. 48 also includes a spring 4848 that extends about the longitudinal axis. In an exemplary embodiment, the spring is provided to reinforce the teeth 4842 or otherwise provide additional inward force to the coupling.

In an exemplary embodiment, the spring is a circular metal spring. The spring is removably attached to a groove defined on an outside surface of the coupling. In an exemplary embodiment, the coupling 4841 includes a coupling area 4801 protruding inwardly on an inside of the coupling that is also conical with a greater diameter in the lateral direction. In this way, the abutment may be pressed into and against the top inside of the coupling when the spring presses the teeth inwardly against the abutment so that the coupling area of the abutment may be snapped into the coupling area 4801 of the connector.

Figure 49:
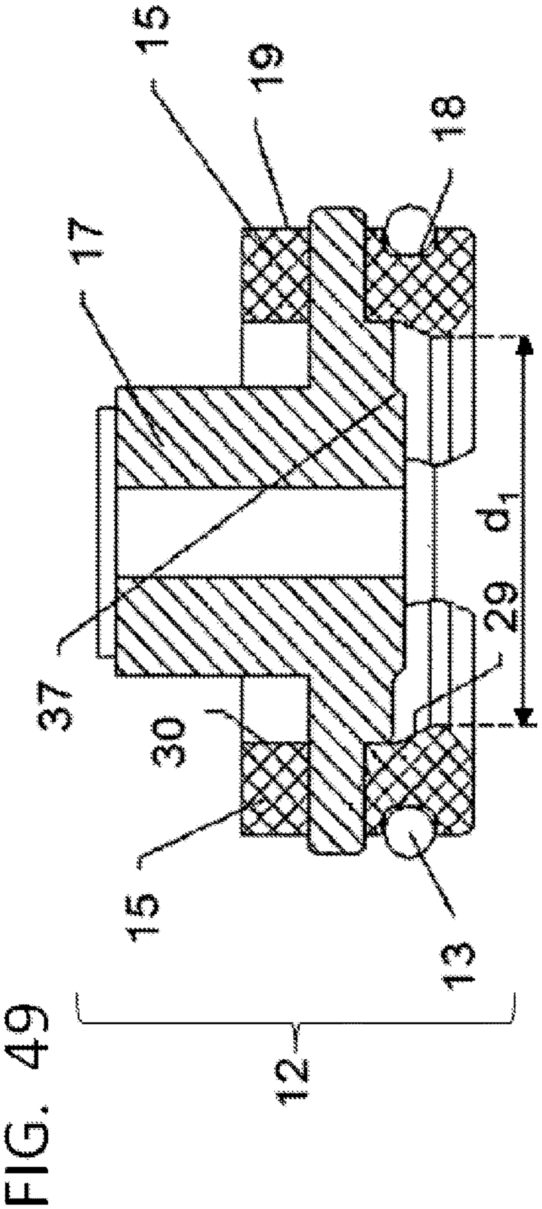

FIG. 49 presents another exemplary embodiment of a coupling that can be used in some embodiments, where element 17 corresponds to element 490 in an exemplary embodiment, except in a solid configuration, or any other component that is in rigid vibrational communication with the bobbin or the like. That is element 17 can be an extension of the bobbin, or any other device that can transmit vibrations to the teeth and/or to the abutment.

Element 17 establishes a connector plate 17 that is connected to the bobbin. The connector 12 includes a circular metal spring 13 and two coupling shoes 15 mounted on the connector plate 17. The spring 13 is removably attached to a groove 18 defined on an outside surface 19 of the shoes 15. The connector plate 17 has a circular connector contact surface 20 that comes into contact with a contact surface of an abutment (a male coupling component thereof). An abutment coupling area on an outer mantle surface of the abutment can be conical with a conical angle relative to a center axis of the abutment and can have increasing diameter in a lateral direction. A coupling area 29 protruding inwardly on an inside 30 of the coupling shoes 15 is also conical with a greater diameter in the lateral direction. Thus, the coupling may be pressed into and against the abutment such that the connector plate 17 comes into contact thereto with the top surface when the spring 13 presses/urges the coupling shoes 15 inwardly against the abutment so that the coupling area of the abutment may be snapped into the coupling area 29 of the connector. The contact surface has a diameter (d1) and the opposite coupling areas 29 are separated by a diameter distance (d2) so that the diameter (d1) is greater than the diameter ("d2"—this is not shown in the figures—this is thus used as shorthand for the text) when the removable component of the percutaneous bone conduction device is not connected to the abutment. In order to snap in the abutment, the coupling areas 29 must be separated against a biasing force of the spring 13. The conical shape of the coupling area 23 in combination with the inwardly protruding coupling area 29 prevents the abutment from disengaging from the connector 8. However, the abutment may be disconnected from the connector by again biasing the shoes 15 against the inward biasing force of the spring 13.

It is noted that in an alternate embodiment, the coupling shoe concept can be utilized in reverse, so that the coupling shoes establish a male component as opposed to a female component. In an exemplary embodiment, the spring 13 can be located on the inside to provide an outward expansion force for the teeth in a manner that operates in reverse of the spring 13 as shown in FIG. 49. Is noted that in some embodiments, there were also be a spring 49 on the outside as well to hold the shoes one to the connector plate 17.

It is noted that the shoes 15 established the teeth, as can be seen. In this exemplary embodiment, there are two shoes, which respectively extend about 150° about the longitudinal axis. Thus, collectively, the shoes can extend about 300° of the 360° that exist to extend about the longitudinal axis. In this exemplary embodiment, there is thus two teeth. In some embodiments, three or four or five or six or more shoes can be utilized to provide a comparable number of teeth, although it is noted that in some embodiments, a single shoe can support two or more teeth. In an alternate embodiment, one single shoe is utilized. Any arrangement that can enable the teachings detailed herein can be utilized at least some exemplary embodiments. As seen, there is an interior surface 30 of the shoes. Plate 17 also includes a face that abuts the surface 30 to stop further inward movement of the shoes. Element 37 is a surface feature.

Figure 50:
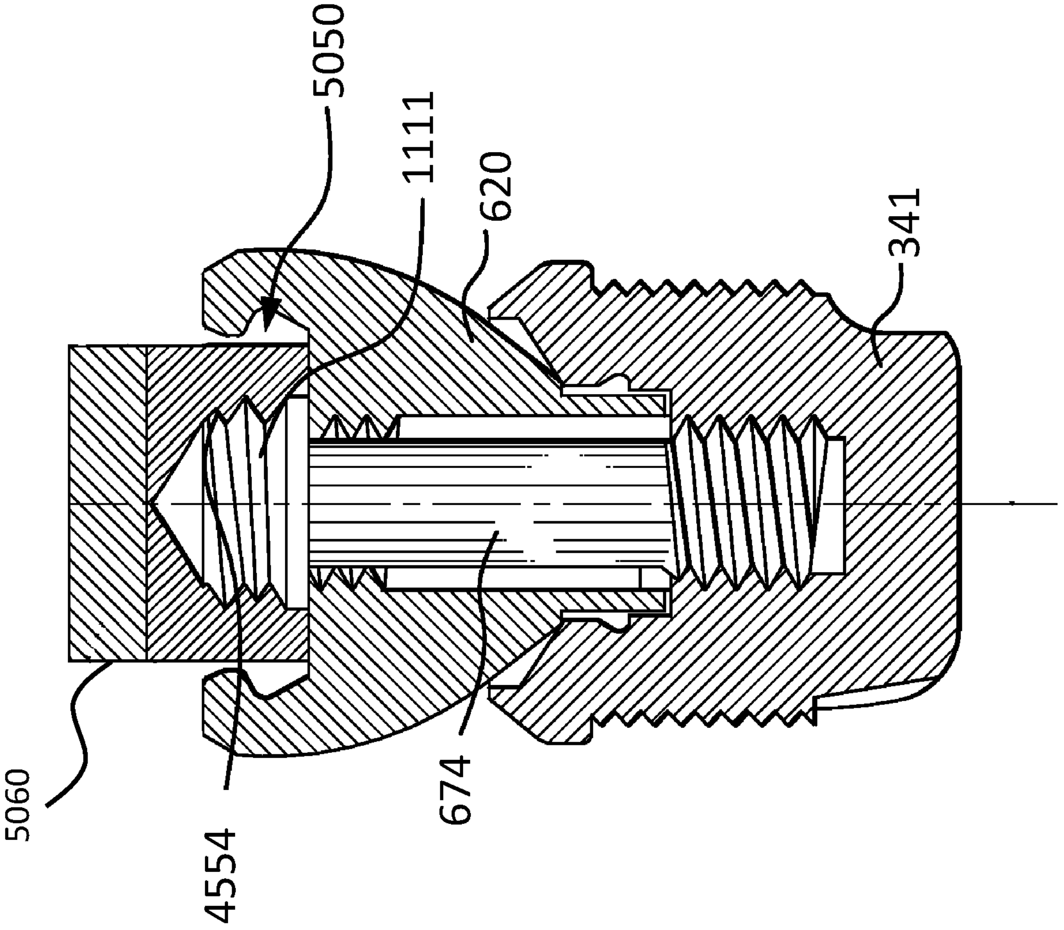

FIG. 50 presents another exemplary embodiment that utilizes an adapter 5050 that screws onto the threads 1111 of the abutment screw 674, although in other embodiments, it can be press fit or even molded about the head, or snap fitted thereto. The adapter 5050 includes female threads 4554 that interface with the male threads 1111 so as to secure or otherwise attach the adapter 5050 to the implanted component. In an exemplary embodiment, the adapter 5050 has utilitarian value with respect to providing an extension or the like above or otherwise outside the confines of the female component of the abutment 620. This can have utilitarian value with respect to providing additional clearance for the couplings detailed herein, which clearance can be obtained, for example, by providing the adapter so that the portions of the adapter that interface with the removable component are proud of the top most portions of the abutment, or otherwise at least raise the coupling locations above that which would otherwise be the case, even if some of the coupling of the removable component extends into the confines of the female component of the abutment 620.

Figure 51:
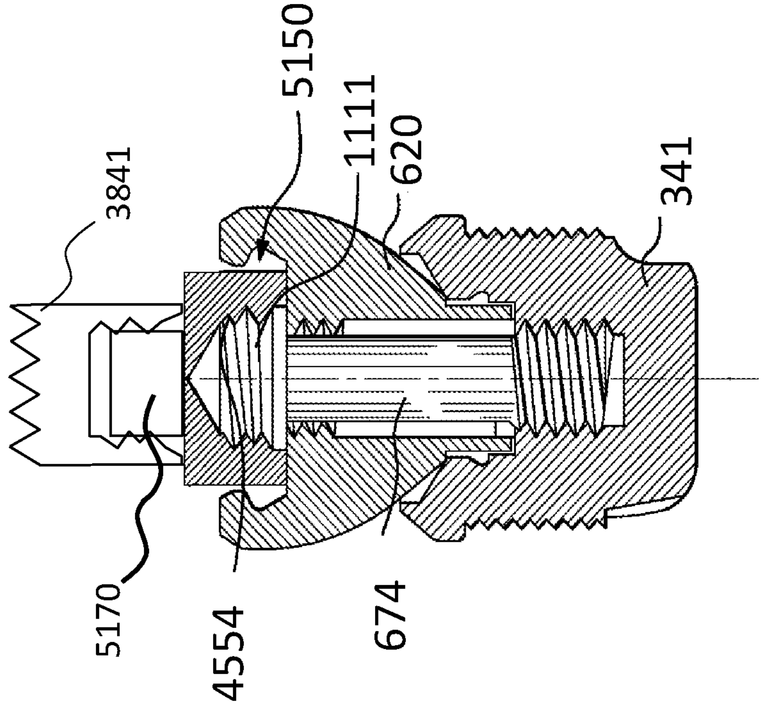

This embodiment shown in FIG. 50 is configured to provide a magnetic coupling via a magnet 5060. FIG. 51 provides an alternate embodiment of the adapter 5150 that includes a coupling component 5170, that can correspond to any of the coupling components (functionally, structurally, etc., as modified for the given size, etc.) detailed herein and/or any other coupling component that can enable the teachings detailed herein, that is glued or otherwise attached to a metal body that establishes the threads of the adapter, although in other embodiments, the adapter is a monolithic component. In the exemplary embodiment shown in FIG. 51, coupling 3841 interference fits with the body 5170. In an exemplary embodiment, body 5170 can correspond to a threaded body having the same dimensions of the threaded head of the abutment screw 674. Thus, the adapter raises the effective location of the threads of the abutment screw. Is also noted that in the embodiment of FIGS. 50 and 51, the adapter does not contact the abutment except at the bottom portions as shown. Still further, in an exemplary embodiment, the adapter can be configured so that the screw thread of the abutment screw 674 stops the downward movement of the adapter when the adapter is screwed onto the threads, and thus in some embodiments, the adapter is configured such that no part of the adapter contacts the abutment 620. Instead, the adapter is entirely supported by the head of the abutment screw 674. Further, it can be seen that in this exemplary embodiment, the outer maximum diameters of the adapter as measured on a plane normal to the longitudinal axis of the adapter are all within the and decide female portions of the abutment 620, or otherwise have diameters that are smaller than the minimum inside diameter of the female portion of the abutment 620.

Figure 52:
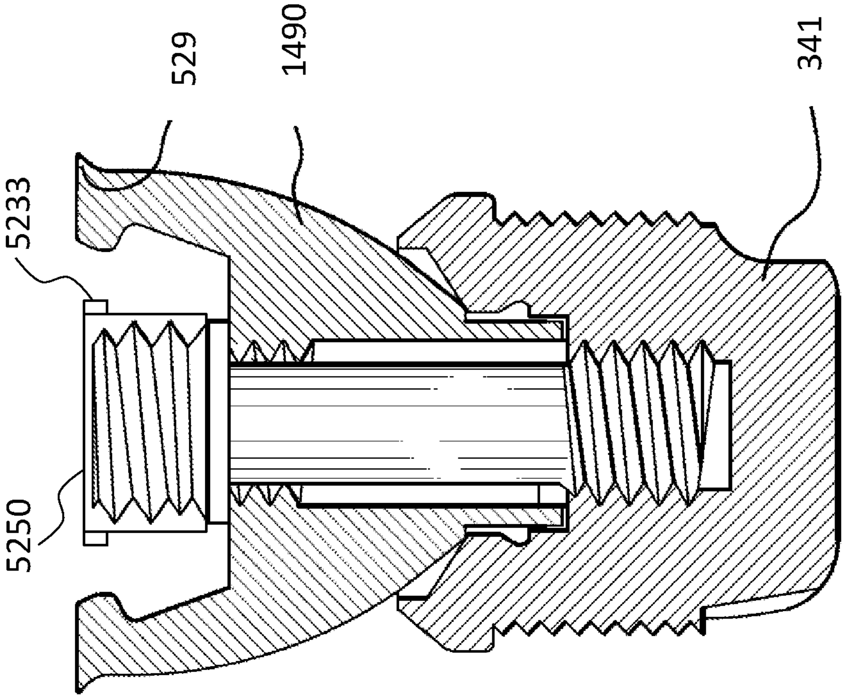
Figure 53:
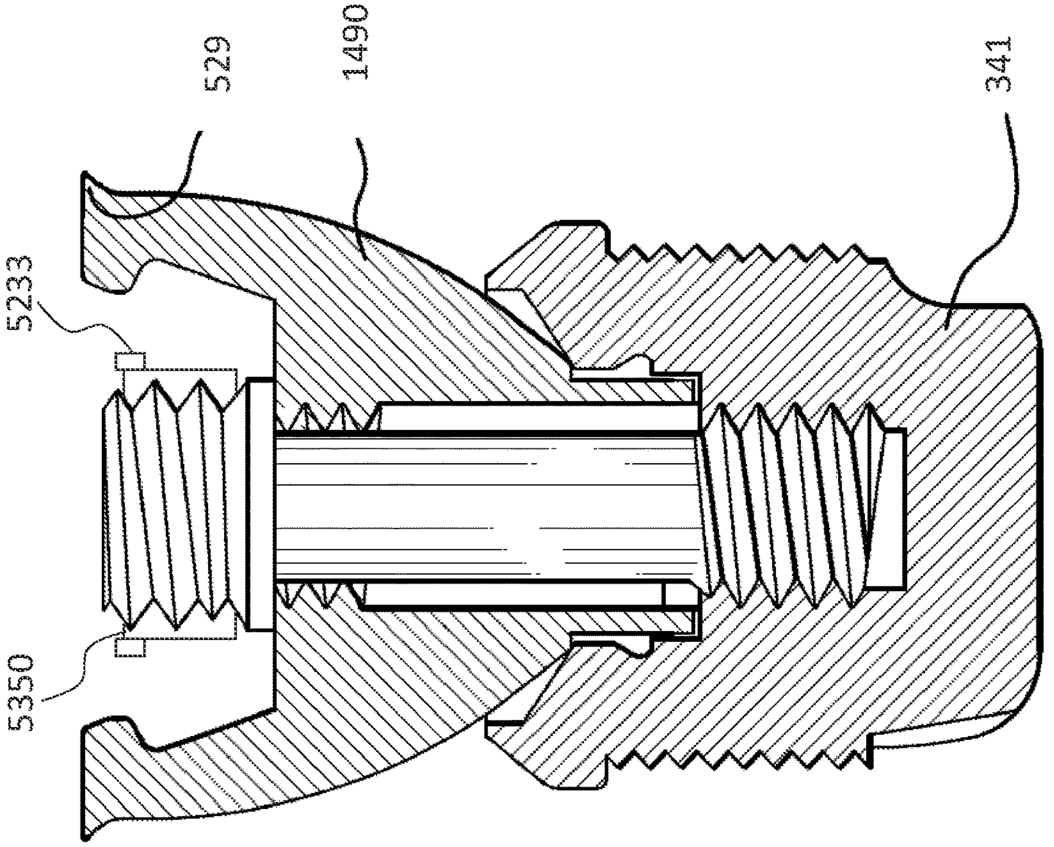
Figure 54:
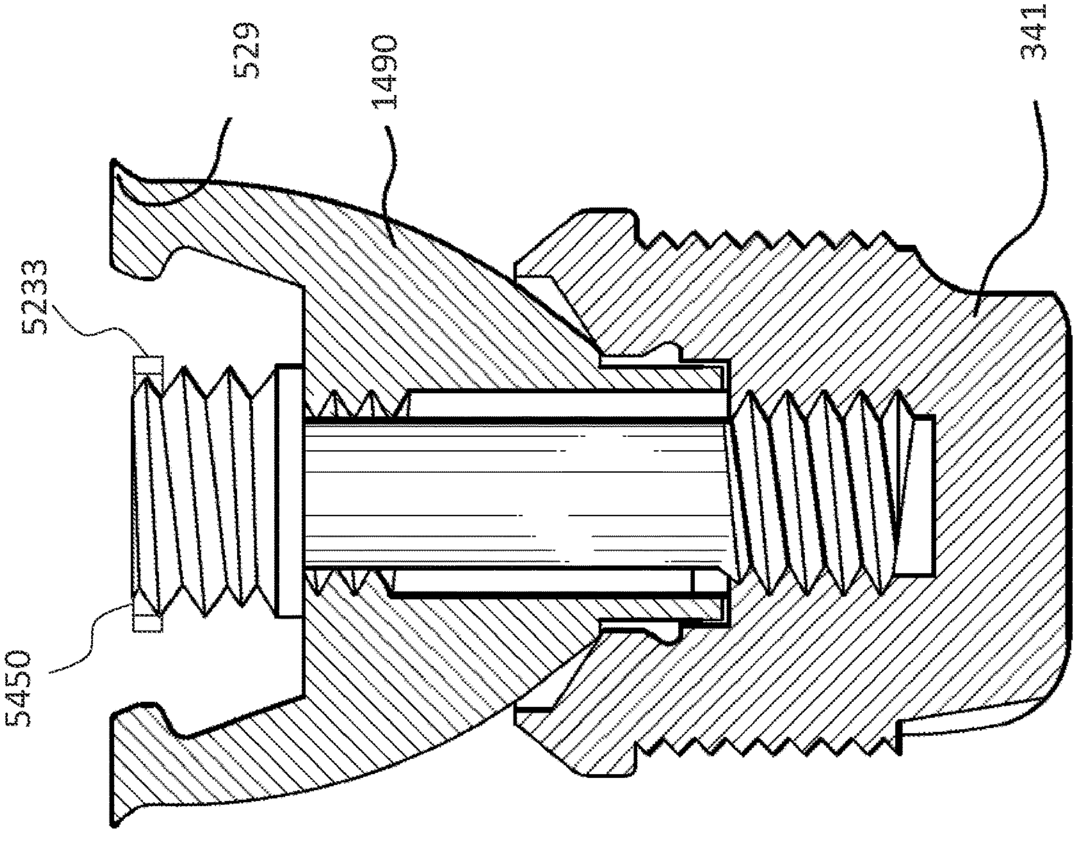

FIG. 52 presents another embodiment of another exemplary adapter, adapter 5250. This adapter has a lower profile than the embodiment of FIG. 51. Indeed, the embodiment of FIG. 51 is to basically provide the same spatial location of coupling positioning as that which would exist with respect to direct coupling one to the threads of the abutment screw, while providing a coupling that is different than coupling one to the threads. In this exemplary embodiment, the adapter 5250 provides a different coupling surface than the threads. In this embodiment, male projection 5233 which can be a ring like component extending about the longitudinal axis of the adapter provides the services to which the removable component of the percutaneous bone conduction device couples. This instead of the threads. FIG. 53 presents another exemplary embodiment of an adapter 5350, which is a cylindrical structure that extends around the threads of the abutment screw, and has a bore that is also threaded, such that the adapter can be screwed down onto the abutment screw with the abutment screw extending through and being proud of the adapter, although in other embodiments, the adapter can be flush with or even above the top of the abutment screw. By the dimensioning the length of the adapter, the heights of the male portion 5233 can be determined or otherwise controlled. FIG. 54 presents an exemplary embodiment where there is a ring 5430 that establishes an adapter that is threaded onto and/or snap fitted onto or otherwise connected to the threads of the abutment screw. As can be seen, this adapter 5430 has a very low profile/is relatively tiny compared to the embodiments detailed above. Accordingly, as can be seen, there are devices systems and/or methods that can be utilized to convert a standard implant with a threaded abutment screw into a snap coupling where the adapter is located completely inside and/or is located below or only slightly above the top of the abutment. This can have utilitarian value with respect to the fact that there is relatively limited space inside the abutment between the walls of the abutment and the head of the abutment screw. An adapter with a tiny profile can converts the abutment screw into a coupling of a snap coupling. Thus, embodiments include methods of converting an implant having an abutment screw into a snap coupling vis-à-vis the abutment screw. In an exemplary embodiment, this method of conversion can be executed while the implant is implanted into a recipient. Note further that in an exemplary embodiment, methods include converting the nonremovable component/implanted component from a single type coupling to a 2 or 3 or more type coupling and/or converting a single coupling having a single size to a coupling that a plurality of couplings of substantially different sizes (2 or 3 or more substantially different sizes). In an embodiment, the adapter can be a cap, that screws onto or snaps onto or otherwise press fits onto the head of the abutment screw. (Note also that in some embodiments, the abutment screw is not threaded, and the adapter can connect to the abutment screw head by interference fit, adhesive connection, snap connection, etc.)

While the embodiments depicted herein have presented the magnet aligned with the longitudinal axis of the coupling, in some other embodiments, the magnets can be off-center.

Note also that in at least some exemplary embodiments, the teeth could potentially be magnetized, or, in some alternate embodiments, magnetic components can be interleaved with the teeth in a manner analogous to some of the teachings with respect to interleaving herein.

It is noted that while the embodiments detailed herein have typically been presented in terms of only one type of snap coupling with respect to one type of abutment, it is noted that in some embodiments, multiple couplings can but combined with the same abutment. By way of example only and not by way of limitation, again with respect to the embodiment of FIG. 9, the male and female teeth features of the coupling 941 can be utilized at the same time with an abutment that has male and female coupling features. By way of example only and not by way of limitation, the male portion of the abutment could be rigid, while the female portion of the abutment could be flexible. The teeth of the coupling 941 are flexible. Thus, during coupling, the teeth of the coupling would be pushed outward by the male portion of the abutment, and the female portion of the abutment would be pushed outward by the teeth of the coupling. That said, in some alternate embodiments, the male portion of the abutment can also be flexible. Indeed, in an exemplary embodiment, the teeth can be rigid—the male portion of the abutment could flex in word and the female portion of the abutment could be configured to flex outward.

It is noted that any method of manufacture described herein constitutes a disclosure of the resulting product, and any description of how a device is made constitutes a disclosure of the corresponding method of manufacture. Also, it is noted that any method detailed herein constitutes a disclosure of a device to practice the method, and any functionality of a device detailed herein constitutes a method of use including that functionality.

More particularly, embodiments include embodiments where any disclosure of any apparatus and/or system herein corresponds to a disclosure of a method and/or process of making that apparatus and/or system. Embodiments include embodiments where any disclosure of any manufacturing process or process of making or providing the apparatus and/or system herein corresponds to a disclosure of an apparatus and/or system resulting from those processes.

Embodiments also include embodiments where disclosure of functionality herein corresponds to an apparatus and/or system that has that functionality. Embodiments also include embodiments where any disclosure of any method action herein corresponds to an apparatus and/or system that is configured to enable and implement that method action. Embodiments also include embodiments where any disclosure of any apparatus and/or system herein corresponds to a disclosure of utilizing that apparatus and/or system.

Embodiments include embodiments where any feature of any embodiment herein are combined with any feature of any other embodiment herein providing that the art enable such unless otherwise specified. Embodiments also include embodiments where any feature of any embodiment herein is explicitly excluded from combination with any feature of any other embodiment herein providing that the art enable such unless otherwise specified.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:

obtaining a removable component of a prosthesis;

attaching the removable component to a first support component of the prosthesis attached to a recipient, wherein during the action of attaching, the removable component is in a configuration such that the removable component is readily attachable to a different type and/or substantially different size support component than the first support component if removed therefrom.

2. The method of claim 1, further comprising:
attaching the removable component to a second support component attached to a recipient, wherein
the second support component corresponds a different type and/or substantially different size support component than the first support component.
3. The method of claim 2, wherein:
the action of attaching the removable component to the first support component is executed without an adapter to interface between the removable component and the first support component;
the removable component includes a transducer; and
the action of attaching the removable component to the second support component is executed without an adapter to interface between the removable component and the second support component.
4. The method of claim 1, wherein:
the removable component was previously attached to a second support component attached to the recipient on a side of the removable component facing the recipient; and
the first support component has a maximum outer diameter that is substantially greater than that of the second support component, the first support component being on the side of the removable component facing the recipient.
5. The method of claim 1, wherein:
the action of attaching is executed such that the removable component couples to the first support component in a male-female relationship, wherein the removable component has the male component; and
during the action of attaching, the removable component is in a configuration such that it is readily attachable, if removed from the first support component, to a second support component in a female-male relationship, where the removable component has the female component.
6. The method of claim 1, further comprising:
prior to the attaching action, removing a coupling apparatus from the removable component and attaching a new coupling apparatus to the removable component, wherein,
the removed coupling apparatus was configured to only attach to a support component of one type and one size, and
the new coupling is the coupling that is used to attach the removable component to the first component.
7. The method of claim 1, wherein:
the first support component is a percutaneous bone conduction implant comprising an abutment and a bone fixture screwed into bone of the recipient, the abutment rigidly secured to the bone fixture via an abutment screw having an abutment screw head; and
the action of attaching the removable component to the first support component comprises snap coupling the removable component directly to the abutment screw head of the percutaneous bone conduction implant.
8. A device, comprising:
a transducer; and
a coupling apparatus configured to couple to at least one of:
at least two different male couplings of substantially different sizes both on a same side of the coupling apparatus;
at least two different female couplings of substantially different sizes; or
at least one mechanical coupling and at least one magnetic coupling.
9. The device of claim 8, wherein:
the coupling apparatus is configured to couple to at least two different male couplings of substantially different sizes both on a same side of the coupling apparatus.
10. The device of claim 8, wherein:
the coupling apparatus is configured to couple to at least two different female couplings of substantially different sizes.
11. The device of claim 8, wherein:
the coupling apparatus is configured to couple to:
at least two different male couplings of substantially different sizes; and
at least one female coupling.
12. The device of claim 8, wherein:
the coupling apparatus is configured to couple to:
at least two different female couplings of substantially different sizes; and
at least one male coupling.
13. The device of claim 8, wherein:
the coupling apparatus is configured to couple to:
at least two different male couplings of substantially different sizes; and
at least two different female couplings of substantially different sizes.
14. The device of claim 8, wherein:
the coupling apparatus is configured to couple to:
at least three different female couplings of substantially different sizes; and
at least one male coupling.
15. The device of claim 8, wherein:
the coupling apparatus includes a first sub-apparatus that couples to one of the male couplings of substantially different size and/or one of the female couplings of substantially different size;
the coupling apparatus includes a second sub-apparatus that couples to another of the male couplings of substantially different size and/or another of the female couplings of substantially different size; and
the device is configured to enable operational movement of at least one of the first sub-component relative to the second-sub component or the second sub-component relative to the first sub component to provide clearance, the clearance enabling the configuration of the coupling to the at least one of:
at least two different male couplings of substantially different sizes; or
at least two different female couplings of substantially different sizes.
16. A device, comprising:
a transducer; and
a coupling apparatus configured to couple to a male mating coupling component and also configured to couple to a female mating coupling component, wherein
at least one of:
(i) the coupling apparatus includes a first sub-apparatus that couples to the male mating component and a second sub-apparatus that couples to the female mating component and the device is configured to enable operational movement of at least one of the first sub-component relative to the second-sub component or the second sub-component relative to the first sub component to provide clearance, the clearance enabling the configuration of the coupling to the male mating component and also the configuration to the female mating component; or (ii) the coupling apparatus includes a plurality of teeth, at least some of the respective teeth of the plurality of teeth are configured to couple to the male mating coupling component and at least some of the respective teeth of the plurality of teeth are configured to couple to the female mating coupling component.

17. The device of claim 16, wherein:

the plurality of teeth includes a first set of teeth including a first plurality of the plurality of teeth;

the plurality of teeth includes a second set of teeth including a second plurality of the plurality of teeth;

the first set of teeth are arrayed about the second set of teeth;

the first set of teeth provide the configuration to snap couple to the male mating component; and the second set of teeth provide the configuration to snap couple to the female mating component.

18. The device of claim 16, wherein:

the coupling apparatus includes the first sub-apparatus that couples to the male mating component and the second sub-apparatus that couples to the female mating component; and the device is configured to enable operational movement of at least one of the first sub-component relative to the second-sub component or the second sub-component relative to the first sub component to provide clearance, the clearance enabling the configuration of the coupling to the male mating component and also the configuration to the female mating component.

19. The device of claim 16, wherein:

at least some of the respective teeth of the plurality of teeth provide the configuration to snap couple to the female mating component;

at least some of the respective teeth of the plurality of teeth provide the configuration to snap couple to the male mating component; and at least some of the respective teeth of the plurality of teeth provide the configuration to snap couple to the female mating component and provide the configuration to snap couple to the male mating component.

20. The device of claim 18, wherein:

at least some of the respective teeth of the plurality of teeth including male projections extending outward away from a longitudinal axis of the coupling apparatus, thereby providing the configuration to snap couple to the female mating component;

at least some of the respective teeth of the plurality of teeth include male projections extending inward towards the longitudinal axis of the coupling apparatus, thereby providing the configuration to snap couple to the female mating component; and with respect to all coupling teeth of the device:

none of the teeth of the plurality of teeth that include the male projections include the female projections; and none of the teeth of the plurality of teeth that include the female projections include the male projections.

* * * * *